(12) United States Patent (10) Patent No.: US 9,070,415 B2
Roberts, Jr. et al. (45) Date of Patent: Jun. 30, 2015

(54) COLLABORATIVE PRODUCTION ASSET MANAGEMENT

(71) Applicant: QWIRE HOLDINGS LLC, Wilmington, DE (US)

(72) Inventors: Leigh B. Roberts, Jr., Altadena, CA (US); Jonathan Louis Ehrlich, Los Angeles, CA (US); Scott Freiman, Irvington, NY (US)

(73) Assignee: QWIRE HOLDING, LLC, Wilmington, DE (US)

( * ) Notice: Subject to any disclaimer, the term of this patent is extended or adjusted under 35 U.S.C. 154(b) by 0 days.

(21) Appl. No.: 14/335,794

(22) Filed: Jul. 18, 2014

(65) Prior Publication Data

US 2014/0328571 A1 Nov. 6, 2014

Related U.S. Application Data

(63) Continuation of application No. 13/931,532, filed on Jun. 28, 2013, now Pat. No. 8,867,905, which is a continuation of application No. 13/896,273, filed on May 16, 2013, now abandoned, which is a (Continued)

(51) Int. Cl.
*H04N 5/93* (2006.01)
*G11B 27/32* (2006.01)
(Continued)

(52) U.S. Cl.
CPC ............ *G11B 27/323* (2013.01); *G11B 27/029* (2013.01); *G11B 27/105* (2013.01); *G11B 27/10* (2013.01)

(58) Field of Classification Search
CPC ...... G11B 27/323; G11B 27/105; G11B 27/10
USPC .......................................... 386/278, 281, 282
See application file for complete search history.

(56) References Cited

U.S. PATENT DOCUMENTS 6,674,955 B2 * 1/2004 Matsui et al. .................. 386/281
7,209,917 B2 * 4/2007 Probst et al. .................. 707/706

(Continued)

OTHER PUBLICATIONS

Anonymous, Watchwith content management system, Watchwith, Inc., San Francisco, California US, downloaded from www.watchwith.com/content_owners/on Feb. 28, 2014, 2 pages.

(Continued)

*Primary Examiner* — David Harvey
(74) *Attorney, Agent, or Firm* — Hickman Palermo Becker Bingham, LLP

(57) ABSTRACT

In an approach, a method of spotting music for a motion picture comprises: receiving music editor (MXE) cue related data defining a plurality of cues each having a start timecode value and an end timecode value; based on the MXE data, creating and storing an MXE timecode path, a composer (CMP) timecode path, and a cue sheet timecode path; copying one or more of the MXE cue related data to CMP cues in the CMP timecode path in a CMP spotting dataset; receiving one or more changes to the CMP cues without also modifying the MXE cue related data; applying an editing lock to the CMP cues; auto-populating the CMP cues to cue sheet cues in the cue sheet timecode path; receiving one or more changes to the cue sheet cues without also modifying the CMP cues; finalizing and distributing a cue sheet based on the cue sheet cues; wherein the method is performed by one or more special-purpose computing devices.

20 Claims, 36 Drawing Sheets

Related U.S. Application Data continuation of application No. PCT/US2013/041469, filed on May 16, 2013.

(60) Provisional application No. 61/648,035, filed on May 16, 2012.

(51) Int. Cl.
*G11B 27/029* (2006.01)
*G11B 27/10* (2006.01)

(56) References Cited

U.S. PATENT DOCUMENTS

| | | | |
|---|---|---|---|
| 7,240,075 B1 | 7/2007 | Nemirofsky et al. | |
| 8,190,604 B2 | 5/2012 | Wen et al. | |
| 8,867,905 B2* | 10/2014 | Roberts et al. | 386/348 |
| 2002/0152095 A1* | 10/2002 | Jordon | 705/1 |
| 2003/0138239 A1 | 7/2003 | Itoi | |
| 2003/0158792 A1 | 8/2003 | Perkowski | |
| 2003/0164844 A1* | 9/2003 | Kravitz et al. | 345/700 |
| 2004/0117255 A1 | 6/2004 | Nemirofsky et al. | |
| 2006/0044957 A1* | 3/2006 | Ellis | 369/30.23 |
| 2008/0077264 A1* | 3/2008 | Irvin et al. | 700/94 |
| 2008/0147558 A1* | 6/2008 | Kraus | 705/59 |
| 2008/0215494 A1* | 9/2008 | Corbett | 705/80 |
| 2008/0288629 A1* | 11/2008 | Fisher et al. | 709/224 |
| 2009/0100013 A1* | 4/2009 | Fein et al. | 707/3 |
| 2009/0202220 A1* | 8/2009 | Sarig | 386/55 |
| 2010/0070522 A1* | 3/2010 | Nazar et al. | 707/769 |
| 2010/0077212 A1 | 3/2010 | Mc Reynolds et al. | |
| 2010/0088716 A1* | 4/2010 | Ellanti et al. | 725/32 |
| 2010/0103325 A1* | 4/2010 | Maegawa et al. | 348/705 |
| 2010/0114715 A1* | 5/2010 | Schuster et al. | 705/14.69 |
| 2010/0154065 A1 | 6/2010 | Cohen et al. | |
| 2011/0093329 A1 | 4/2011 | Bodor et al. | |
| 2012/0033948 A1 | 2/2012 | Rodriguez et al. | |
| 2012/0201517 A1* | 8/2012 | Sakuragi et al. | 386/278 |
| 2013/0282526 A1 | 10/2013 | Cummins et al. | |
| 2013/0311522 A1* | 11/2013 | Hodgkinson et al. | 707/821 |
| 2014/0082657 A1 | 3/2014 | Mc Reynolds et al. | |
| 2014/0233918 A1* | 8/2014 | Roberts et al. | 386/285 |
| 2014/0328577 A1 | 11/2014 | Roberts, Jr. | |

OTHER PUBLICATIONS

Anonymous, RAMP Consumer Media, RAMP, Inc., Boston, Massachusetts US, downloaded from www.ramp.com/applications/consumer-media on Feb. 28, 2014, 4 pages.

* cited by examiner

Quote Request Letter – Sync/Master Combined Template
Combined ▼

Select Header
Liza ▼

Introduction:
Series# #Episode# #MasterOwner# #MasterOwnerFee#
MasterPercent# #Writers# #Publishers# #TotalFee#

Lead Line
Please Confirm the Following Information:

Rights 1:
All Media (excluding theatrical) – now known or hereafter devised, worldwide Perpetuity: #totalFee# (Pro Rata). Your Percentage of ownership is #MasteOwnerFee#, or #MasterPercent#.

Rights 2:
5 Years – All TV Media now known or hereafter devised, including internet streaming (linear only)

Rights 3:
Perpetuity – All TV Media now known or hereafter devised, including internet streaming (linear only)

Rights 4:
Digital Downloads – Unless or Until All Media option is exercised an option for Digital downloads of the entire episode (linear only) for sale or promotion.

Rights 5:
OPTION: All Media (excluding theatrical and All TV Media

Preview (Auto-Fill data appears in blue)

Liza Richardson
Music Supervisor
851 S. Westgate Ave. #303
Los Angeles, CA 90049
(310) 820-4103 / lizarich@earthlink.net (Date)

(PUBLISHER)
(Publisher Address)
(City, State, Zip)

TOUCH/(Ep#) "(Ep Title)"                                    Air Date: (Date)

Dear (Recipient),

Series# #Episode# #MasterOwner# #MasterOwnerFee#
MasterPercent# #Writers# #Publishers# #TotalFee#

Please confirm the following information:

SONG/RECORDING:   (Song)
PUBLISHER(S):            (Cue Sheet Publisher)
WRITER(S):                   (Cue Sheet Writers)
LABEL:                          (Label)
ARTIST:                        (Artist)
USE/DESCRIPTION: (Use/Description)

All Media (excluding theatrical) – now known or hereafter

Insert Autofill ▼

Done

Musician Assignment Tool

Series Name    Cut/Edit Description    Mix Date
Episode Name    Version    Air Date
Episode Number    Date

| Instrument | Performer | Union? | Group |
|---|---|---|---|
| Flute 1 ▽ | Jane Doe | X | A |
| Flute 2 ▽ | Linda Doe | X | A |
| Flute 3 ▽ | Carol Doe | X | A |
| Guitar ▽ | Jack Smith |  | B |
| Bass ▽ | John Smith |  | A |
| Bag Pipe ▽ | Jason Smith |  | B |
| Fren▽ | Peter Smith | X | C |

Dropdown: Flute / Oboe / Clarinet / French H / Bass / ... / Other

Total # of Musicians: 7
Total # of Groups: 3

Musician Group A

| Instrument | Qty | Notes/Doubles | Performer(s) |
|---|---|---|---|
| Flute | 3 | 1st Flute Doubles on Piccolo | Jane Doe, Linda Doe, ... |
| [etc] |  | [etc] | [etc] |

Total: 3

Musician Group B

| Instrument | Qty | Notes/Doubles | Performer(s) |
|---|---|---|---|
| Guitar | 1 |  | Jack Smith |
| Bag Pipe | 1 |  | Jason Smith |
| [etc] |  | [etc] | [etc] |

Total: 2

Musician Group C

| Instrument | Qty | Notes/Doubles | Performer(s) |
|---|---|---|---|
| French Horn | 1 |  | Peter Smith |
| [etc] |  | [etc] | [etc] |

Total: 1

FIG. 34

COLLABORATIVE PRODUCTION ASSET MANAGEMENT

CROSS REFERENCE TO RELATED APPLICATIONS; BENEFIT CLAIM

The present application claims the benefit as a Continuation of application Ser. No. 13/931,532, filed Jun. 28, 2013, which claims benefit under 35 U.S.C. §120 as a Continuation of application Ser. No. 13/896,273, filed May 16, 2013 and as a Continuation of international application PCT/US13/41469, filed May 16, 2013 which both claim benefit under 35 U.S.C. 119(e) of priority to provisional application 61/648,035, filed May 16, 2012, the entire contents of the aforementioned applications are hereby incorporated by reference for all purposes as though fully set forth herein.

FIELD OF THE DISCLOSURE

The present disclosure generally relates to obtaining, during processes of producing an audiovisual program, production-related data from a plurality of separate parties who are involved in the production, authoritatively binding the production-related data to timecode data of the audiovisual program, and providing data output that integrates the production-related data in ways that have been previously unavailable. The present disclosure relates more specifically to computer-based techniques supporting processes involved in managing data and assets related to music, original and licensed, for audiovisual programs.

BACKGROUND

Every film and television show presents numerous opportunities for commerce. For example, a viewer watching his/her favorite show may be interested in purchasing music from the episode being viewed before the show has even ended. As another example, a viewer may want to buy a pair of shoes or other product that a character is wearing in a particular scene. In yet another example, a viewer may be interested in staying at a hotel where a certain scene was filmed.

Although many exciting consumer devices and applications are currently being introduced to enable these types of transactions, they all lack the most important ingredient—specific and detailed information about the program and its elements. In order for these transactional engines to operate they need accurate data as fuel.

An abundant wealth of information is produced during the making of a TV show or film. Composers, music editors, music supervisors and picture editors generate essential information about the music created or licensed for a TV show or film. The location manager must track each location where the filming takes place, costume designers have detailed information about each piece of clothing, and picture editors know precisely where each of these elements appears in the program. Yet, much of this detail-rich data is discarded during the process of creating the show or film. What does survive is often stored in isolated and poorly designed systems—or worse, on paper, where the critical information is notoriously difficult to retrieve and easily lost.

BRIEF DESCRIPTION OF THE DRAWINGS

FIG. 3A illustrates a general layout for the user interface provided by a client unit according to an embodiment.

FIG. 14 illustrates a letter template layout according to an embodiment.

FIG. 15 illustrates a MSP worksheet layout according to an embodiment.

FIG. 25 illustrates a hybrid spotting layout according to an embodiment.

FIG. 27 illustrates an alternative cue review layout according to an embodiment.

FIG. 28 illustrates an alternative billing & expenses layout according to an embodiment.

FIG. 30 illustrates an alternative cue sheet layout according to an embodiment.

FIG. 31 illustrates an alternative continuity layout according to an embodiment.

FIG. 32 illustrates an alternative MSP worksheet layout according to an embodiment.

FIG. 33 illustrates an alternative extended track worksheet layout according to an embodiment.

FIG. 34 illustrates a musicians group tool layout according to an embodiment.

DESCRIPTION OF EXAMPLE EMBODIMENTS

Figure 1:
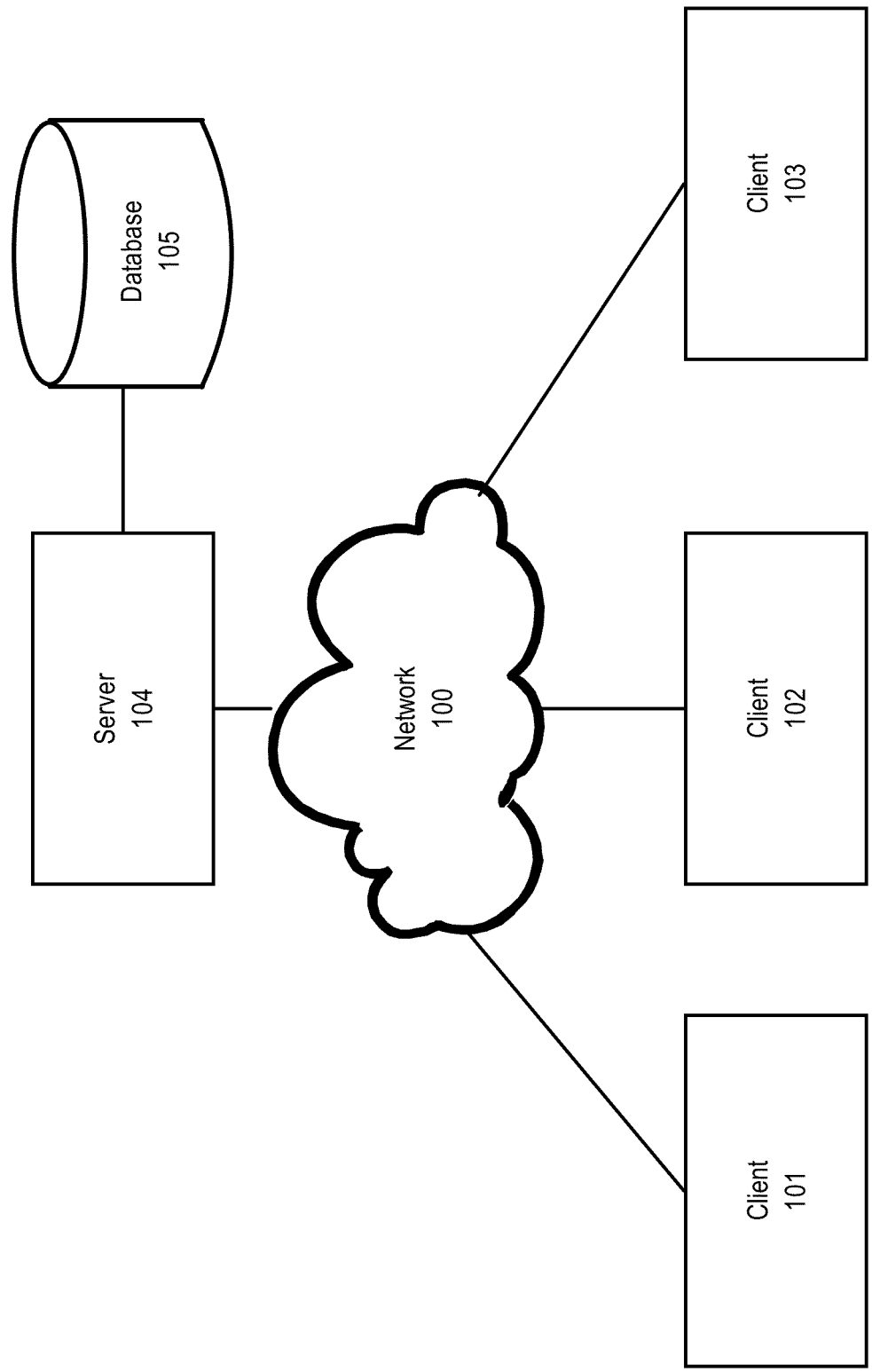
FIG. 1 illustrates a computer-networking environment upon which an embodiment may be implemented.

In the description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
    1.0 General Overview
    2.0 Abbreviations
    3.0 Definitions
    4.0 Structural Overview
    5.0 Database Overview
    6.0 Security
    7.0 System Wide Assumptions and Tools
    8.0 Layout Overview
    9.0 Series Setup Layout
    10.0 Series Overview Layout
    11.0 Episode Setup Layout
    12.0 Spotting Overview
    13.0 Spotting Layout
    14.0 Timecode Offset Layout
    15.0 Cue Review Layout
    16.0 Billing and Expenses Layout
    17.0 Cue Sheet layout
    18.0 Scene Assignment Layout
    19.0 Continuity Layout
    20.0 MSP Series and Template Layout
    21.0 MSP Worksheet Layout
    22.0 Product Placement Layout
    23.0 Music Search Portal
    24.0 Alternative Layouts
    25.0 Live Session Tools
    26.0 Hardware Overview
    27.0 Additional Disclosure 1.0 GENERAL OVERVIEW Techniques are provided for obtaining, during processes of producing an audiovisual program, production-related data from a plurality of separate parties who are involved in the production, authoritatively binding the production-related data to timecode data of the audiovisual program, and providing data output that integrates the production-related data in ways that have been previously unavailable. Using these techniques, a data processing system can integrate data from various parties who are typically associated with different companies that do not ordinarily share production-related data. Further, production-related abstract labels such as acts, scenes and shots, or other values that relate to other production trades, may be bound to specific timecode points in the audiovisual program and used to generate output such as reports that include production-related data from a plurality of parties who typically do not share such data in ordinary production processes.

Techniques are provided for collaborative product asset management. In an embodiment, a cloud-based data processing platform provides data and media management features to improve workflow, from inception to delivery, for people involved in selecting, creating, recording, manipulating, placing, producing, managing, licensing, delivering, and administering music for film and television programs (or any medium where music accompanies a moving image). By creating value for everyone connected to the production, including production studios, music publishers, performance rights organizations (PROs) and record labels, the platform helps streamline the collection and management of music rights, enabling quicker and more accurate royalty payments.

For purposes of illustrating clear examples, certain description herein refer to specific roles such as MXE and CMP, but in other embodiments different persons not actually having those roles may perform the specified steps. Further, the responsibilities and features associated with the roles may, in other embodiments, be merged or overlapped with other roles in many various combinations.

In some cases, for convenience, specific examples of audiovisual programs will be described in reference to particular features. In such cases, the features apply to audiovisual programs generally, in addition to the specific examples provided. In this context, audiovisual programs includes television, film, movies, video games, steaming media, commercials, and all other forms of visual media.

Every film and television show utilizes music—from Hollywood blockbusters to low-budget reality TV series. Billions are paid annually in licensing fees and royalties for this music. Yet, the current tools for managing this process tend to be antiquated, disjointed, labor intensive, and manual. This creates redundant work for many individuals and business entities involved, and results in lost and delayed revenue for the major production studios and for composers, music publishers, and record labels. It can even lead to costly litigation due to inefficiencies in tracking music rights.

In an embodiment, the platform provides a comprehensive tool for tracking music rights by embracing the entire audiovisual program ecosystem. For example, by collecting information from the content creators themselves during production, rather than hastily assembling the information after the audiovisual program has been fully completed from many scattered and hard to access sources. As a result, the platform is able to collect the highest quality and most accurate information for a television/film production directly from the users responsible for coordinating that content in the production. The platform provides content creators with a wide array of user-specific workflow improvement tools. For example, a utility to convert scenes into music cues can be provided. Further, each user may be provided with permissions and tools corresponding to their specific job (composer, music supervisor, music editor, wardrobe manager, assistants, etc.) and the ability to share information needed to coordinate their efforts. The platform thus encourages collaboration and sharing of jointly-used data, while using secure encryption (or other security techniques) to keep each user's sensitive information safe. Thus, the platform encourages the content creators to take advantage of its services by providing convenient tools to assist in the production, and as a result, collects valuable music scoring and product placement information. This information can then be used for other purposes, such as obtaining or tracking rights to the music, paying royalties, or providing advertisers with accurate timings for when certain music tracks (original or licensed) or products appear in the production.

The information collected by the platform's users can be used to enable impulse purchases—consumer purchases made as a direct result of watching a TV show or film. One example is music. Studies have shown that 49% of consumers discover music through television, yet there is currently no easy way for consumers to instantly identify a specific song in a TV show and purchase it. Since users are far more likely to purchase music at the moment of impulse, the opportunities to boost music sales are significant. For example, the music rights information captured from the various users, and the music media itself via the platform during the creation of the TV show/film may be provided to advertisers. The advertisers are then able to provide targeted advertisements to consumers watching the production, enabling them to purchase tracks associated with a scene they are currently viewing or had previously viewed. In some embodiments, the target advertisements may also be extended into non-music purchases as well, such as clothes, vehicles, hotel stays, or other products or services depicted in the production. For example, a costume manager may use the platform to coordinate which scene a character will be wearing a particular jacket. That information may then be exported to advertisers, who can provide advertising associated with those scenes to offer users the opportunity to purchase the jacket while the impulse is still fresh in their minds.

In an embodiment, a method of spotting music for a motion picture comprises: receiving music editor (MXE) cue related data defining a plurality of cues each having a start timecode value and an end timecode value; based on the MXE data, creating and storing an MXE timecode path, a composer (CMP) timecode path, and a cue sheet timecode path; copying one or more of the MXE cue related data to CMP cues in the CMP timecode path in a CMP spotting dataset; receiving one or more changes to the CMP cues without also modifying the MXE cue related data; applying an editing lock to the CMP cues; auto-populating the CMP cues to cue sheet cues in the cue sheet timecode path; receiving one or more changes to the cue sheet cues without also modifying the CMP cues; finalizing and distributing a cue sheet based on the cue sheet cues; wherein the method is performed by one or more special-purpose computing devices.

In an embodiment, a method of licensing music for a motion picture comprises: receiving music related data defining a plurality of music events each having a start timecode value and an end timecode value, wherein the music related data is one or more of: MXE data, CMP data, or VDE data; based on the music related data, creating and storing an MSP timecode path; based on the MSP timecode path displaying information related to the music events; receiving MSP user input defining one or more request letter templates; generating one or more request letters based on the one or more request letter templates, wherein the one or more request letters contain at least a portion of the information related to the music events; sending the one or more request letters to one or more recipients; wherein the method is performed by one or more special-purpose computing devices.

Embodiments may be implemented in a variety of distributed systems or systems that provide high availability. An example is Qwire, commercially available from Qwire Holdings LLC, Irvington, N.Y., which provides a cloud-based platform and collaborative editing tools for managing cue, scene, and other information related to an audiovisual production.

2.0 ABBREVIATIONS

The following abbreviations are used throughout the following description:
CMP—Composer
MXE—Music Editor
MSP—Music Supervisor
VDE—Video Editor/Picture Editor
PRO—Performing Rights Societies
PUB—Music publisher, production music library, record label, or other music rights holder
CS—Cue Sheet

3.0 DEFINITIONS

The following terms appear numerously in the following description:

Series—A collection of TV episodes under a singular title, often airing one week apart from one another. Examples include "Seinfeld" and "24". Series are broken down into seasons, reflecting a package of shows bought by a distributor. A single season of a series can contain a widely different number of episodes. For example, some seasons may contain as few as 4-5 episodes and as many as 30-40 or more.

Act—For TV episodes, acts are defined as where commercial breaks appear. Act 0 refers to anything prior to the opening titles. Acts contain scenes. Scenes contain music cues. Music cues may span more than one scene. In the context of films, the reels are often used in place of acts.

Scene—Within a given production, scene refers to one or more locations in which a unit of dramatic action occurs. Scenes have scene numbers, scene locations, and scene descriptions. A scene can be either interior (INT) or exterior (EXT). For example, a scene appearing on a continuity report might read "EXT-Night Parking Lot" with the description "Bob's van pulls up and 3 gunmen get out. An altercation with police ensues".

Cue—A single piece of music occurring over a particular time range in the episode, either within a specific scene, or bridging 2 or more scenes. Cues refer to either an original composition, or a licensed piece of existing music. Cues can be assigned both numbers and names. In some contexts, the cue numbers often follow the act number or reel number in the naming schema, with an 'm' in between standing for music. For example, 3m4 means act 3, cue 4.

Starts—Another name for cues, often refers to the number of cues in a given act or scene. For example, Act 3 may have 12 starts (meaning 12 cues).

Timecode—The timing convention used to mark each frame of a production with a number representing time, such as by hours, minutes, seconds, and frames, e.g. 1:05:23:11.

Offset—When timecode values need to be adjusted to accommodate a change in the production's video edit. For example, scenes may be shortened or extended resulting in other scenes needing to be moved forward or back in time. Thus, there may be an updated edit of an episode where everything after act 3 scene 4 needs to be moved forward by 16 seconds and 23 frames.

Temp—Stands for temporary music. Temp is often inserted by the video editor during the video editing process, to be replaced later with a combination of original score by the composer and licensed pre-existing music.

Spotting (or Spot)—The process of viewing a production's video and deciding where music needs to be. Cues are created during spotting, and each cue is given a start timecode and an end timecode.

Cue Sheet—A report required by the PROs in order to pay royalties to its composer and publisher members. The report often contains cue numbers, cue titles, cue lengths, composers, and publishers who wrote and own the cue, and their respective percentage splits. In TV, each episode generally requires a corresponding cue sheet. In film, only one cue sheet is typically provided for the whole film.

Publishers—Refers to entities that own the rights to a song or track's composition (but not necessarily the recording of the track).

Master Owners—Refers to entities that own the recording of a particular song (but not necessarily the composition of said song).

Track—A piece of music, either pre-existing or composed.

Assignee—A person who composes original music, or otherwise creates music via editing or some other process for a given series or episode.

Composer—A member of the production team whose responsibilities typically go beyond composing original music and may include matching assignees to cues, reviewing an assignees progress, revising spotting, managing a music budget, hiring musicians, orchestrating music, and other managerial tasks for a series or episode.

Music Editor—A member of the production team whose responsibilities typically include performing the initial spotting and finalizing the cue sheet. His duties may also include helping to choose temp music, keeping track of critical data during live recording sessions, and assembling all of the final music assets for delivery.

Music Supervisor—A member of the production team whose responsibilities typically include determining those cues which require licenses and negotiating with licensors. The music supervisor may also recommend licensable songs to be used in a production.

Video Editor—A member of the production team whose responsibilities typically include combining and assembling raw footage into scenes to tell a story. In some cases, the role of the video editor is also referred to as "picture editor" since the VDE is not necessarily limited to editing video and can edit still pictures as well.

Option Cell—a widget that pertains to a particular piece of pre-existing music in consideration for licensing. The option cell is used by the MSP to bring up fields pertaining to a particular song and track its licensing progress.

Hybrid Layout—a composer layout where both the CMP and MXE timings and notes are conveniently presented simultaneously for easy comparison and copying.

CueLinks—a unique tool that allows certain descriptors, icons, and colors to be attached to cues based on story, location, character, and other user-defined tags.

4.0 STRUCTURAL OVERVIEW

FIG. 1 illustrates a computer-networking environment upon which an embodiment may be implemented. In FIG. 1, one or more client computers (clients) 101, 102, 103 are communicatively coupled with a server computer (server) 104 over network 100. The server 104 is additionally communicatively coupled with database 105. Although only a particular number of each element is depicted in FIG. 1, a practical environment may contain many more, even thousands or millions, of each of the elements depicted in FIG. 1. In addition, the arrangement of the computer-networking environment may differ from embodiment to embodiment. For example, the database 105 may be located offsite and available to the server 104 via network 100.

In an embodiment, client 101, 102, 103 represent software being hosted on a host computing device (not depicted). For example, desktop or mobile computing devices may execute instructions that perform the functions attributed to the client 101, 102, 103. As another example, client 101, 102, 103 may represent a mobile application executing on a smartphone. In other embodiments, client 101, 102, 103 may themselves represent host computing devices containing hardware components that perform the aforementioned functions. In an embodiment, client 101, 102, 103 represent computing devices, such as the computing devices described below in the section titled "Hardware Overview". The client 101, 102, 103 provides user interfaces or "layouts" to assist users to in collaboratively developing TV/film productions. In addition, the client 101, 102, 103 collects information from the users regarding the production which is then sent over network 100 to server 104 or to other external destinations. In some embodiments, the client 101, 102, 103 is a "thin" client designed to run the user interfaces, but is otherwise configured to perform minimal processing and instead delegate tasks such as retrieving and analyzing information to the server 104.

In an embodiment, network 100 represents any combination of one or more local networks, wide area networks, internetworks, or service provider networks. Data exchanged over network 100, may be transferred using any number of network layer protocols, transportation layer protocols, and/ or application layer protocols. In some embodiments, network 100 represents one or more interconnected internetworks such as the public internet.

In an embodiment, server 104 represents software being hosted on a server computing device (not depicted). For example, the server 104 may be executing within a data center or a cloud storage/service system. In another embodiment, server 104 represents a host server containing hardware components for performing the functions attributed to the server 104. In yet another embodiment, server 104 represents a computing device, such as the computing device described below in the section titled "Hardware Overview". The server 104 collects information regarding a TV/film production from users via the client 101, 102, 103. The server 104 then uses the collected information to analyze the information and share certain information between different users, while maintaining the security of less public information. In addition, the server 104 may use the information provided by the client 101, 102, 103 to produce specialized reports and template emails to assist the users of the client 101, 102, 103 with tasks related to TV/film production.

For the purpose of convenience, the term "client" without a particular reference numeral will refer to any of client 101, 102, or 103. Furthermore, the term "production management system" refers to the collection of client 101, 102, 103, server 104, and database 105. Thus, if the production management system is described as performing a task, the task may be performed by any or all of the components comprising the production management system, depending on the embodiment. Thus, for example, if the production management system is described as calculating total expenses for a production, the step of calculating may be performed by the client in one embodiment, the server 104 in another embodiment, or a combination of both in yet another embodiment.

In this arrangement, embodiments provide an integrated data collection system that is configured to receive data values directly from production personnel as production tasks are performed without the need for personnel to record data on paper sheets for re-entry by other staff at another time. Consequently, important data relating to production tasks becomes available in the database 105 far earlier in the production process and normally before the airdate or release date of the production. As a specific benefit, music cue sheets may be produced on or before the air date or a show or the release of a film—typically weeks or months earlier than with prior approaches—and may include data that has been previously unavailable, such as start and stop times of each cue. The early availability of this data enables technical processes that have not been previously possible, as detailed in subsequent sections, such as customization of advertisements in a television program based on the substantive content of a scene or other scene detail, and offering sales of products, including music or other products, based upon the specific placement of the products at a particular start and end time in the program, the identity of performers in that scene at that particular start time and end time, and other data.

Embodiments further enhance the operating efficiency of a networked computer system by permitting communication of data among various parties to a production who are in independent organizations that do not normally share data orally or via paper processes.

Embodiments can provide frame-based, accurate metadata about a production that is authoritatively tied to the timecode values of the production recording. Metadata may be obtained from production professionals involved in any of music, costumes, props, casting, and other trades or professions. The metadata may be obtained during the process of production rather than after the airdate or release and may be supplemented with frame-accurate timecode values to produce an authoritative binding of timecode values to production values, qualities or abstractions.

5.0 DATABASE OVERVIEW

The database 105 stores information received by the server 104 for use in various features such as collaborative editing, reporting to various users or agencies, billing, automatic email generation, etc. The information may be received from users of the client, but in other cases may be automatically obtained from one or more other external data repositories. For example, a PRO or PUB may make licensing information and member lists available on an external database, which the server 104 can query to extract and transform the information for insertion into the database 105.

In an embodiment, the server 104 includes database software that manages access to the information stored in the database 105. For example, the server 104 may execute software for managing relational or object oriented databases, such as SQL, MySQL, FileMaker, etc. or software custom designed in languages such as C++, Ruby on Rails, Java, Visual Basic, etc. The server 104 may also implement some functions in web-based languages such as HTML and PHP for communicating with the client. In other embodiments, the tasks performed by the server 104 may be shared or divided among multiple specialized servers, such as a server for authenticating the client, a server for managing the database 105, a server for communicating information to the client, etc.

For the purpose of illustrating clear examples, the database 105 will be assumed to be a relational database. However, in other embodiments the database 105 may also be an object oriented database, an object-relational database, or other type of database.

In an embodiment, the database 105 includes a relationship graph that follows an 'anchor/buoy' method of connectivity, but may use a 'spider web approach' when appropriate. The naming conventions used in the relationship graph on the table occurrences (the buoy) are to first define what the table occurrence is used for and then to define the master table it references (the anchor). For example, table Offset_CUE means that the table occurrence 'offset' uses the table 'CUE' for its subset of data. Table occurrences are generally used to collect and filter a subset of information.

In an embodiment, the information depicted in the relationship graph is organized into tables as follows:

GLOBALS: The GLOBALS table contains all the default values that users can enter and the program can reference. The database 105 uses global fields and global variables in cases where the data does not need to be saved or shared among multiple users.

EPISODE: At the center of the relationship graph 200 is the table EPISODE" In the database 105, EPISODE is the primary table and can contain data for a TV series' individual episode, or a feature film, web episode, made-for-TV movie, or any moving picture production.

ACT: The ACT table holds act or reel numbers as records for use by various layouts.

USE: The USE table holds cue attributes and marks a cue as having certain attributes such as "Underscore", "Source", "Song", and whether or not the cue contains vocals.

ASSIGNEE: The ASSIGNEE table holds contact information for composers (and others who supply or create original music). The ASSIGNEE table also includes how an assignee (assuming he is a composer) would have his information appear on a cue sheet. In many cases, assignees are assigned cues by the CMP.

NOTES: The NOTES table holds fields containing notes for the 'Cue Review" layout as will be described more fully in a later section.

CS_COMPOSERS: The CS_COMPOSERS table contains the composer information for the CS layouts.

CS_PUBLISHERS: The CS_PUBLISHERS table contains the publisher information for the CS layouts.

MUSICIANS: Holds series-wide (default) musician contact data and an individual's union number and instrument played—for population in the "EP_MUSICIAN" tables.

EP_MUSICIANS_UNION: The EP_MUSICIANS_UNION table holds union musician contact data pulled from the MUSICIANS table, and session information entered by users on a per episode basis.

EP_MUSICIANS_NON: The EP_MUSICIANS_NON table holds non-union musician contact data pulled from the MUSICIANS table, and session information entered by users on a per episode basis.

MISC_EXPENSE: The MISC_EXPENSE table contains user-defined expenses within an episode.

SCENE: The SCENE table is used for the MSP and VDE layouts as will be described more fully in later sections. The SCENE table contains all the fields for scene information.

SCENECUE_JOIN: The SCENECUE_JOIN table is a join-table to assist in converting scene numbers into cue numbers.

TRK_OPT_CELLS: The TRK_OPT_CELLS table contains all data relating to a song/track (including the actual audio file) and is used to implement option cells in the MSP layout as will be described more fully in a later section.

TRK_COMPOSERS: The TRK_COMPOSERS table contains the cue sheet data for composers of licensed (non-scored) music tracks, as entered by the MSP or imported automatically from metadata or external sources.

MSTR_QUOTE_LETTERS: The MSTR_QUOTE_LETTERS table contains data and percentage splits of the master owners of licensed music, as entered by the MSP, imported from metadata, or obtained from an external source. The information in the MSTR_QUOTE_LETTERS table is used to generate quote request letters for the MSP.

PUB_QUOTE_LETTERS: The PUB_QUOTE_LETTERS table contains data and percentage splits of the publisher of licensed music, as entered by the MSP, imported from metadata, or obtained from an external source. The information in the PUB_QUOTE_LETTERS table is used to generate quote request letters for the MSP.

CMB_QUOTE_LETTERS: The CMB_QUOTE_LETTERS stores the same information as the MST_QUOTE_LETTERS and PUB_QUOTE_LETTERS tables, but is used for the specific situation where the master owner and publisher are the same entity.

MSTR_CONFIRMATION_LETTERS: Contains the same type of information as the "MSTR_QUOTE_LETTERS" table, but is used to generate confirmation letters for the MSP after a quote has been approved.

PUB_CONFIRMATION_LETTERS: Contains the same type of information as the "PUB_QUOTE_LETTERS" table, but is used to generate confirmation letters for the MSP after a quote has been approved.

CMB_CONFIRMATION_LETTERS: Contains the same type of information as the "CMB_QUOTE_LETTERS" table, but is used to generate confirmation letters for the MSP after a quote has been approved.

CNTCT_MASTERS: "The CNCT_MASTERS table contains contact information for the master owner and ownership splits for licensed (non-scored) music tracks, as entered by the MSP, automatically from metadata, or obtained from an external source.

CNTCT_PUBLISHERS: "The CNCT_PUBLISHERS table contains contact information for the publisher and ownership splits for licensed (non-scored) music tracks, as entered by the MSP, automatically from metadata, or obtained from an external source.

6.0 SECURITY

In an embodiment, the production management system is designed to let collaborators share data that is common, while keeping secure their confidential data. The following is one example of how the users may be grouped and privilege sets defined:

CMP_RW: Composer-level access, read and write privileges. This privilege grants full access to all CMP and MXE layouts and data.

CMP_R: Composer-level access, read only privileges. This privilege grants read-only access to all CMP and MXE layouts.

CMP_RW/CMP_R (No Money): Composer-level access with the exception of monetary data and layouts. This permission may be suitable for a composer's assistant who is tasked to help with job tracking, but is not allowed to have access to financial information.

MXE_RW: Music Editor-level access, read, and write privileges. The user is restricted to MXE specific layouts, but can view and edit some shared data (as other users can view and edit some of the MXE's shared data).

MXE_R: Music Editor-level access, read only privileges. This privilege may be suited for a MXE's assistant.

MSP_RW: Music Supervisor-level access, read and write privileges. This privilege grants full access to all MSP layouts.

MSP_R: Music Supervisor-level access, read only privileges. This privilege may be suited for a MSP's assistant.

EDR_RW: Video Editor-level access, read and write privileges. This privilege grants full access, read, and write privileges to all VDE specific layouts including continuity reports.

EDR_R: Video editor-level access, read only privileges. This privilege may be suitable for a VDE's assistant.

Figure 20:
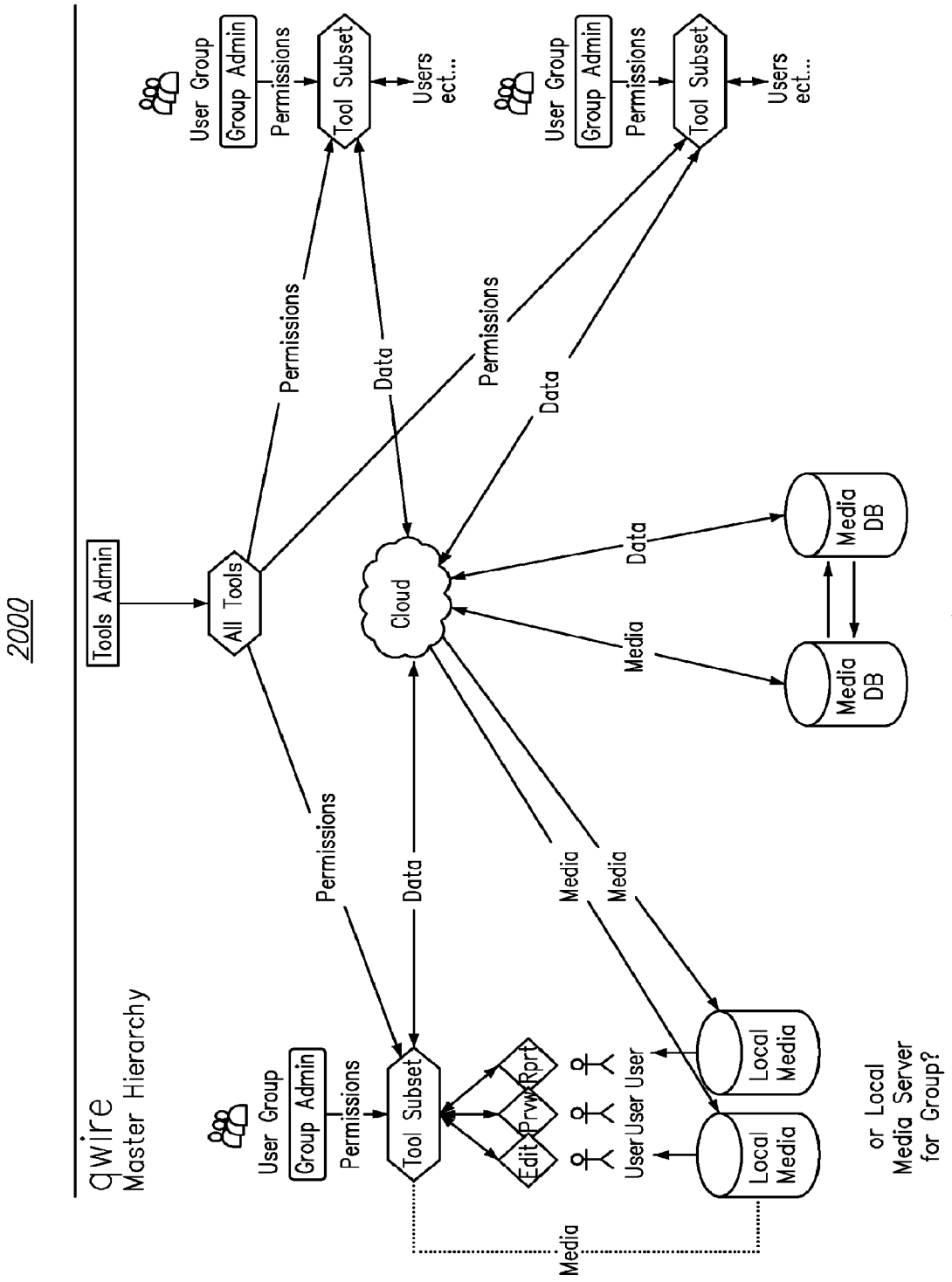
FIG. 20 illustrates an example user group master hierarchy according to an embodiment.

In some embodiments, users are divided into various user groups for the production. FIG. 20 illustrates an example user group master hierarchy 2000 according to an embodiment. As depicted in FIG. 20, members falling into different user groups receive different permissions, and thus may have access to different sets of tools (e.g. layouts) and data. For example, the user groups may include wardrobe, $1^{st}$ assistant director ($1^{st}$ AD), Hair/Makeup, Prop Master etc. The users in user groups may extend beyond those individuals which are specifically involved in music/video and can provide frame-accurate metadata and time stamping for virtually any kind of product that may eventually be involved in the production process.

7.0 SYSTEM WIDE ASSUMPTIONS AND TOOLS

In some embodiments, versioning and simultaneous managing of multiple picture/video edits in the production management system, as well as layouts, can be linked to an identifier such as an episode number. In the case of a film or a single-episode TV production (not a series), the production may be divided into various stages with edits associated with them (e.g. 'rough cut,' 'director's cut,' 'locked cut,' etc). In an embodiment, each tool and layout provided by the production management system supports versioning and archiving, with the ability for a user (e.g. an administrator) to switch between versions. For example, when timecode values are used, the timecode values can be version-aware and will update or change when the production management system switches from version to version. Similarly, scene orders (and scene inclusion itself) may be different as versions change, and the production management system adapts accordingly. The same also holds for cue order and inclusion. The versions may be explicitly set by the user (e.g. via a widget) or may be set automatically, such as by an automatic backup tool that records a new version every set period of time or after specified events.

In some embodiments, each user group has its own home page layout and custom navigation. Each group adheres to a permissions schema whereby there is a single group admin role and multiple group users—all flowing down from the Master Admin for the production management system. A Master Admin assigns the various group admins; a group admin assigns roles and permissions for members of that group.

In an embodiment, throughout the production management system, there are one or more communication tools that provide users various ways to communicate among one another (a instant message application, chat window, review notes, auto-email, etc). In some cases, the communication tools will be context-aware (keeping track of which scenes, cues, etc. has focus, who gave a particular note or posted a particular comment, etc.) The production management system may also utilize time-stamping and/or archival of communications as needed.

8.0 LAYOUT OVERVIEW

In an embodiment, the client follows a visual design paradigm whereby layouts are used to limit the information provided to a user based on the job or task that the user needs to perform. For example, the layout may be based on the user's level of permission or on the user's job (CMP, MSP, MXE, etc.). For clarity, the user interacting with a layout may be described with reference to the role to which the layout caters in practice. For example, the MSP worksheet layout may be described as being utilized by the MSP. However, the layouts are not necessarily restricted to being used by any particular user.

Keeping the layouts relatively free of superfluous data helps keep the user interface cleaner and easier to read. Furthermore, data descriptions can be visually distinguished from the data itself (e.g. by shading or coloring) to make it easier for the user to read the data provided by the layouts. The layouts may also include various widgets, such as drop-down menus, to help the user to enter information when a select number of valid choices can be entered for a given field.

In an embodiment, the production management system aids users by automatically entering redundant information and default values, which the user can then use as a starting point to begin the editing process. In some embodiments, the production management system follows a data entry paradigm whereby once data is entered (e.g. for a particular episode) that data remains fixed, even if the default values for that data is later modified.

Figure 3A:
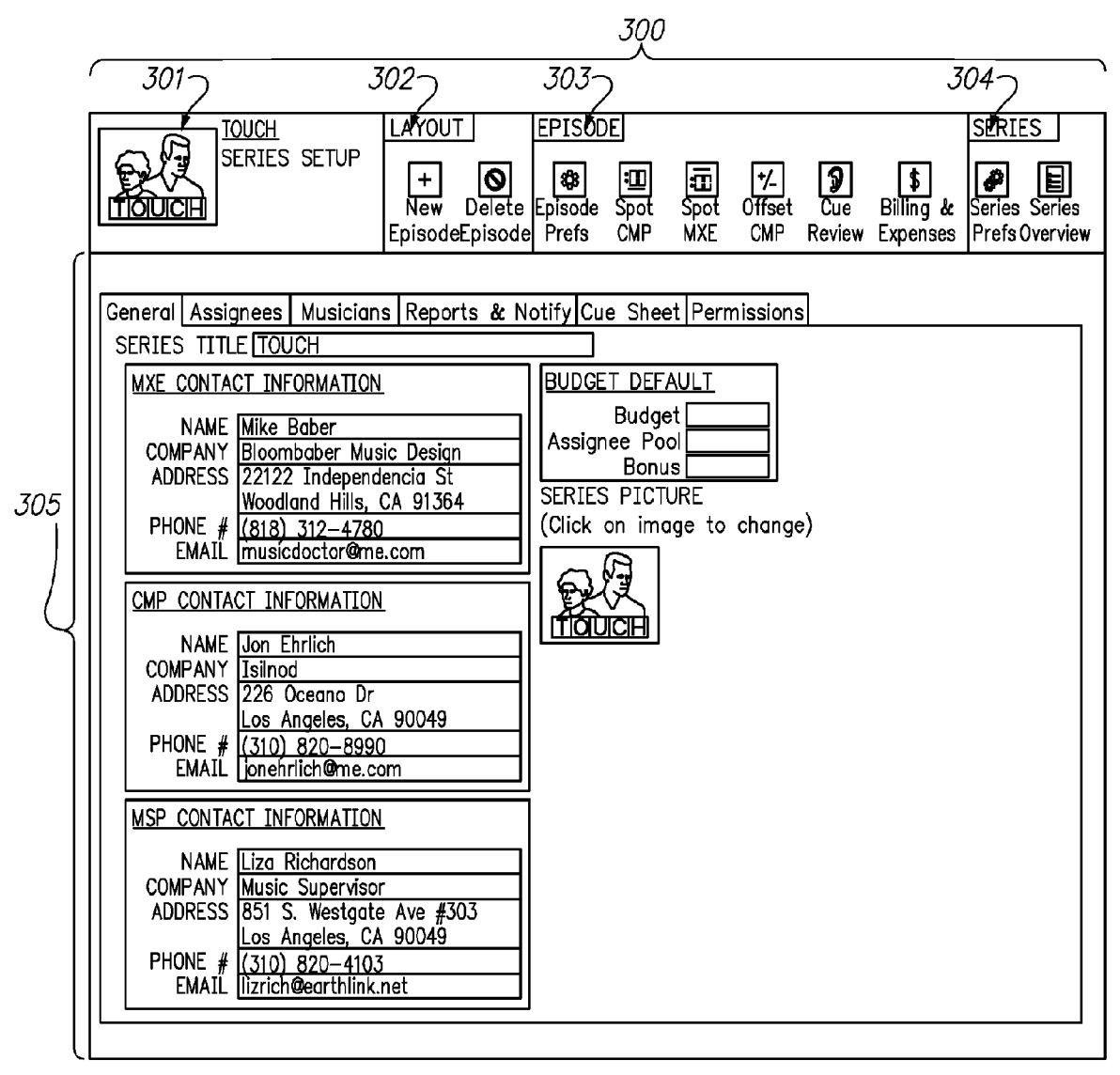

FIG. 3A illustrates a general layout 300 for a user interface provided by the client according to an embodiment. The general layout 300 includes title information 301, layout widgets 302, episode widgets 303, series widgets 304, and layout content area 305. In other embodiments, the general layout 300 may contain different widgets than those depicted in FIG. 3A or may include the same widgets in a different order than they appear in FIG. 3A. For example, different users may be provided with different widgets (linking to different options or layouts) depending on the user's job or permissions level.

The title information 301 displays information regarding the production, such as the series title and an icon (or image) identifying the series. However, in some embodiments, the title information 301 may also display the name of the layout currently being shown in the layout content area 305.

In an embodiment, the episode widgets 303 and series widgets 304 can be selected by the user to cause the client to present a corresponding layout in the layout content area 305. For example, the episode widgets 303 may provide access to layouts pertaining to a particular episode, whereas series widgets 304 may provide access to layouts pertaining to the series generally. As the user selects a new widget, the client updates the layout content area 305 to display the layout associated with the newly selected widget. In some embodiments, the user may be presented with a particular layout by default and may then navigate (via the episode widgets 303 and series widgets 304) to a new layout. In some embodiments, the client provides the user with an option to modify which layout is shown by default.

The layout widgets 302 contain widgets which control functionality related to the currently selected layout, such as uploading/exporting data, adding/deleting episodes, etc. Since the layout widgets 302 are specific to a given layout, the layout widgets 302 may be updated by the client depending on the layout selected by the user. In some cases, the selected layout may not have any functionality linked to the layout widgets 302. In such cases, the client may display the layout widgets 302 as blank or may not display the layout widgets 302 at all.

In some embodiments, the layout widgets 302, episode widgets 303, and series widgets 304 form a banner that is displayed at the top of the user interface regardless of the layout currently selected for display in the layout content area 305. Thus, the banner serves as a tool for the user to navigate the various displays and options provided by the production management system.

In some embodiments, the production management system associates certain users or layouts with a particular color. For example, the layouts for the MXE may be displayed as tinted one color, and the layouts for the CMP may be tinted another color. As a result, the color provides a quick visual marker to help the user understand where they are when navigating the layouts of the production management system. Furthermore, data entered by a user may be displayed with the user's associated color when imported into another user's layout. As a result, users can intuitively grasp the source of the data without further inquiry.

9.0 SERIES SETUP LAYOUT

Figure 3B:
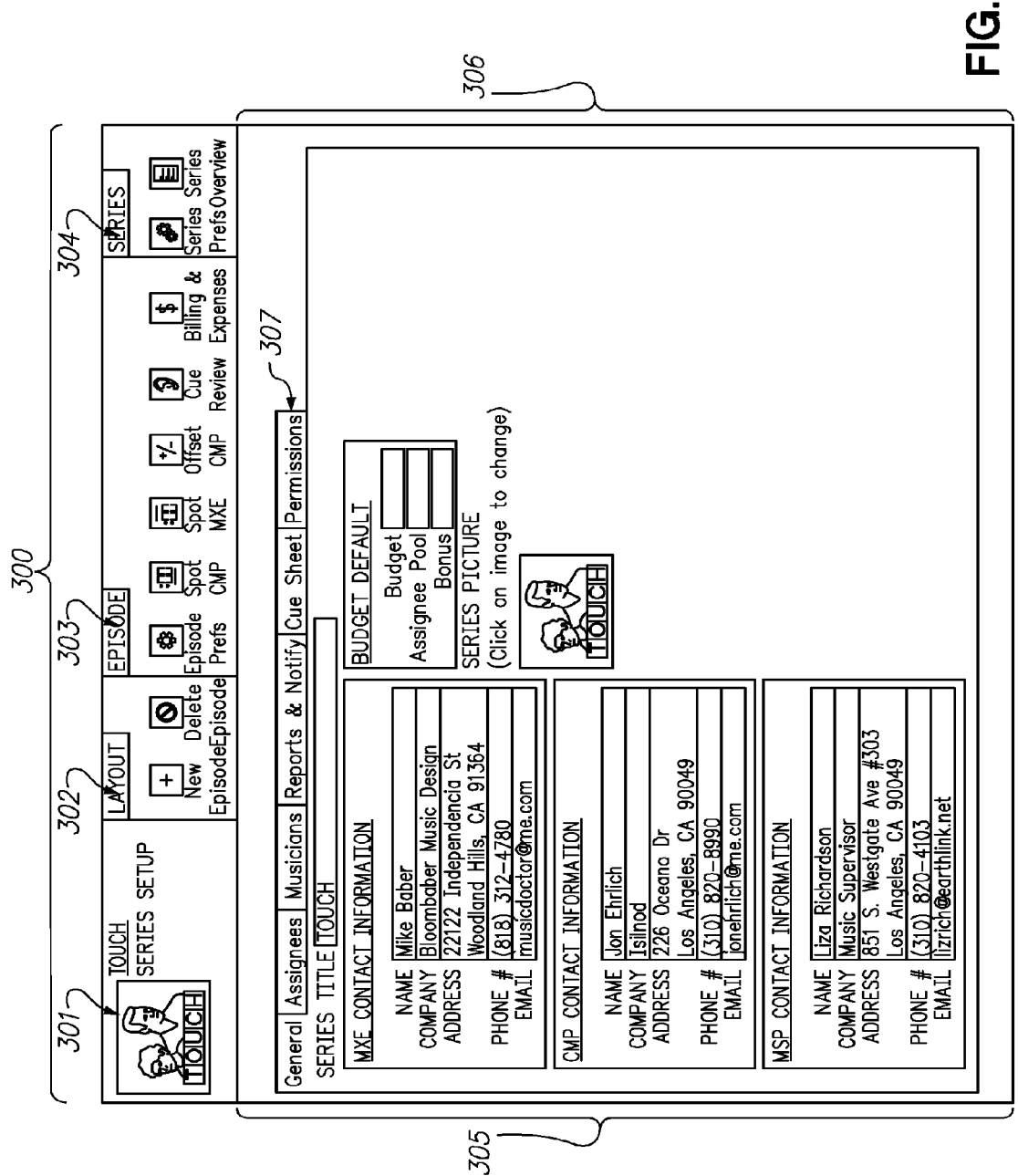
FIG. 3B illustrates the general layout when the widget associated with the series setup layout has been selected according to an embodiment.

FIG. 3B illustrates the general layout 300 when the widget associated with the series setup layout 306 has been selected according to an embodiment. In an embodiment, the series setup layout 306 is a CMP specific layout and thus is only available to the CMP or a user with appropriate permissions. The series setup layout 306 includes multiple tabs 307 which can be used to access different sets of information fields. When a particular tab is selected, the client updates to display the fields associated with the selected tab.

In an embodiment, the series setup layout 306 is where the default values that the client uses to automatically populate other layouts are set. For example, the data filled out in the series setup layout 306 may be used to fill in default values for the fields in episode specific layouts. In some embodiments, editing a default value field within the series setup layout 306 changes the defaults for any newly created episodes, but does not change the fields for episodes which have already been created. In addition, information that is automatically populated into layouts as defaults act as a starting point for users working on the episode, which may be customized as needed.

In an embodiment, when a user enters information into the fields of the series setup layout 306, the client sends that information to the server 104 for storage in the database 105. Thus, when auto-populating fields, the client can contact the server 104 to retrieve the information stored in the database 105. In some embodiments, the process of saving the information to the database 105 may occur dynamically after each field has been entered. However, in other embodiments the process may be batched, such as by saving entered information to the database 105 every set period of time or in response to a user selecting an option to save the information. Although the aforementioned saving techniques are described in reference to series setup layout 306, the saving techniques are applicable to information entered into any layout described herein.

In an embodiment, the tabs 307 grant access to one or more of the following sets of information:

General: In the general tab the user can set up a variety of information, including series title, and the names/addresses of people working on the production (CMP, MXE, MSP, VDE, etc.). The general tab also allows the user to upload and select the icon displayed within the title information 301, such as a logo representing the series or film being produced. The general tab also includes fields where the user can input series-wide budgetary information.

Assignees: In the assignee tab the user is able to enter information for assignees, such as name, nickname (for use in other layouts), SS# or EIN#, company (if applicable), function (e.g. 'composer', 'track editor', etc.), billing rate per-minute of original music to be paid, etc. In some embodiments the number of assignees that a user is able to enter may be limited to a specific number, such as ten or twenty. However, in other embodiments the number of assignees allowed to be entered may be unlimited. In an embodiment, the assignee tab allows the user to associate an assignee with a particular color. The client then uses the color to distinguish information or comments related to the assignee in other layouts. The assignee tab also allows the user to define how the assignee should appear on a cue sheet. In some cases, the assignee tab allows the user to associate multiple names with a single assignee, such as the case where a team of composers market themselves as a single entity. In addition, the assignee tab also allows the user to assign percentage splits for each member since each member may belong to a different PRO and need to be compensated separately or in varying amounts.

Musicians: In the musicians tab the user may define any number of musicians that are to appear in each episode of the series. For example, the user may define musicians by contact info, SS# or EIN#, company (if applicable), and instrument(s). In addition, the musicians tab allows the user to designate a musician as union or non-union. If the musician is a member of a union, the musicians tab displays additional fields for union # and local # which can be populated by default or filled in by the user. In an embodiment, each musician is displayed with an 'all-episode' checkbox (or other widget) that allows the user to set whether the musician is to be automatically included in episode specific layouts when a new episode is created. Furthermore, the user may enter a default amount that the musician is to be paid for each episode, which will also be exported to the appropriate fields of episode specific layouts upon the creation of a new episode.

Reports & Notify: In the reports & notify tab the user can define names, email addresses, and titles for people who should be notified when certain events happen (e.g. closing of an episode). Individuals defined in the reports & notify tab may receive any or all of the following: payout reports, union reports, episode is closed notifications, episode is ready to be invoiced notifications, payment received notifications, etc. Additionally, the user can customize the language in the email body for each type of notification, and has the option to define CCs to be included on the report outs and notifications.

Cue Sheet: In the cue sheet tab the user can define defaults for data on the cue sheet that is unlikely to change from episode to episode. For example, the user may enter writer/publisher names, PRO affiliations, and splits for the 'main title', 'end credits' and 'logo'. The user may also enter default publishers for all underscore cues. As a result, the production management system saves the user from the labor intensive task of manually entering the data for each episode for cases where a particular assignee or assignees will repeatedly be responsible for cues in the series. In some embodiments, the information entered by the user in the cue sheet tab appears in a dropdown list in the spotting layout (described later) which allows the user to associate a cue with an assignee and automatically fill in the pertinent fields.

Permissions: In the permissions tab the CMP is able to create, modify, or delete users as well as set the permission level available to each user. For example, a new user may be created by specifying a user name, a password, and permission set for the new user.

10.0 SERIES OVERVIEW LAYOUT

Figure 4:
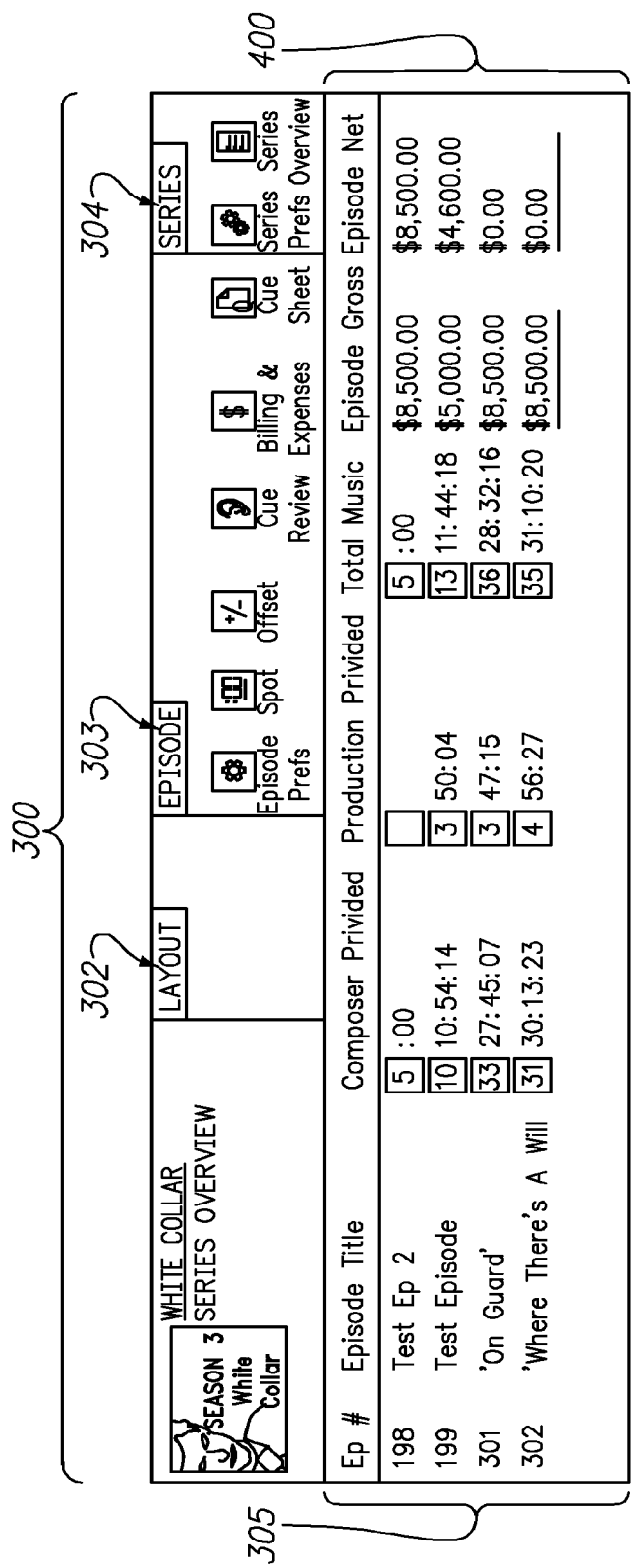
FIG. 4 illustrates the general layout when the widget associated with the series overview layout has been selected according to an embodiment.

FIG. 4 illustrates the general layout 300 when the widget associated with the series overview layout 400 has been selected according to an embodiment. In FIG. 4, the series overview layout 400 includes a list of all episodes for the series and information related to each episode. For example, the information for each episode may include the number and length of composer-provided or production-provided cues, episode gross, episode net, and subtotals. In the embodiment depicted in FIG. 4, the information is provided in column format, where each row represents an episode and each column represents a feature of the episode. However, in other embodiments the information presented in the series overview layout 400 may be displayed in a different format. In an embodiment, the series overview layout 400 is a composer-specific view.

11.0 EPISODE SETUP LAYOUT

Figure 5:
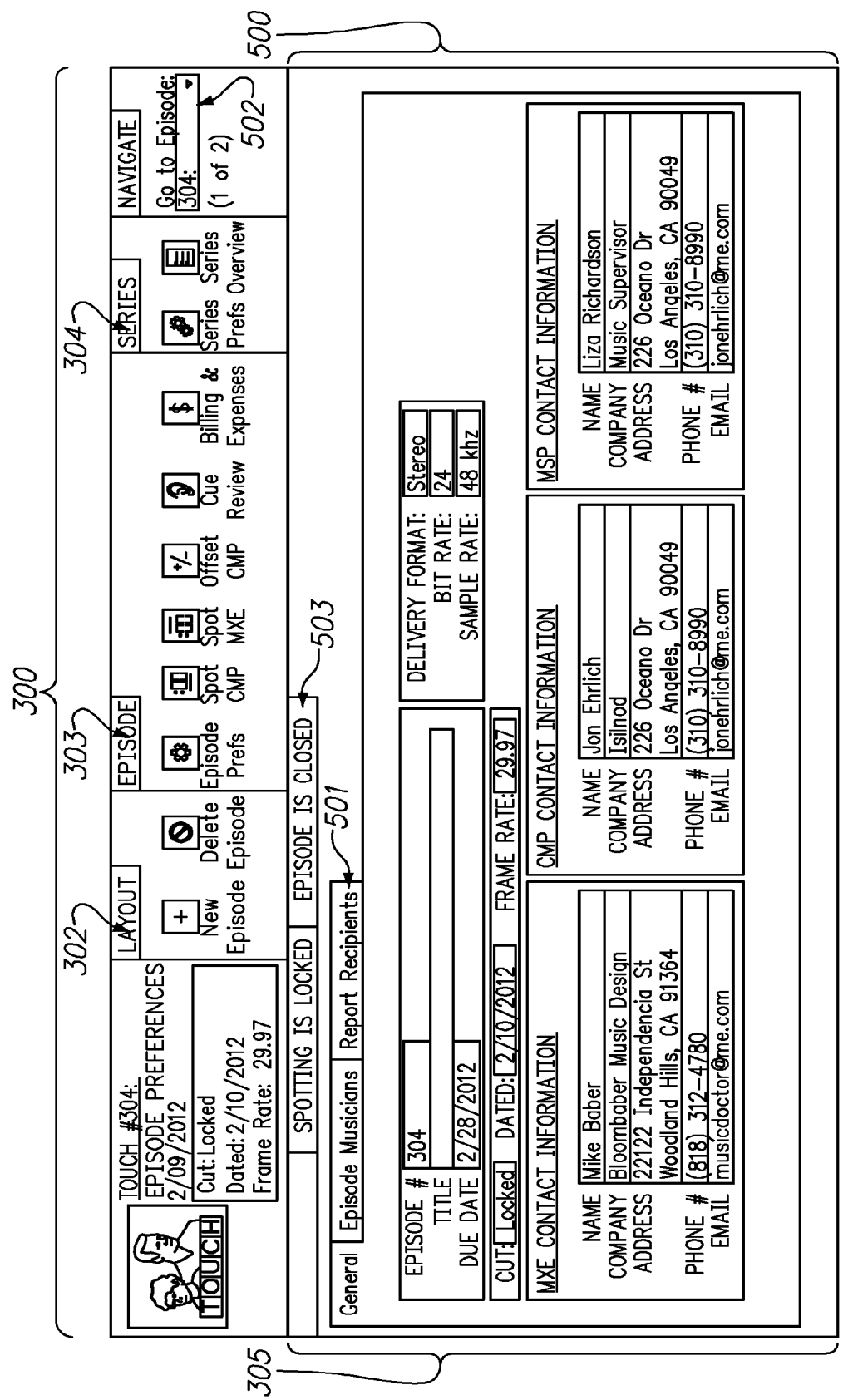
FIG. 5 illustrates the general layout when the widget associated with the episode setup layout has been selected according to an embodiment.

FIG. 5 illustrates the general layout 300 when the widget associated with the episode setup layout 500 has been selected according to an embodiment. In FIG. 5 the episode setup layout 500 includes a number of tabs 501 (or other widgets or views) associated with different sets of fields. In an embodiment, the information included within the tabs 501 of the episode setup layout 500 may be filled in automatically with default values provided in corresponding fields of the series setup layout 306. In some embodiments, when one of the episode widgets 303 is selected, the client adds an episode navigation widget 502, which the user can utilize to select an episode for which the episode setup layout 500 should display information. Furthermore, when the episode setup layout 500 has been selected, the layout widgets 302 update to include options for deleting and adding an episode.

In some embodiments, the episode setup layout 500 (and potentially other episode-specific layouts) includes an episode closing widget 503 for closing/reopening an episode. The collaborative nature of the production management system creates the potential for one user to modify information for an episode after another user has already assumed that the information has been finalized. As a result, in some embodiments, the production management system offers a safeguard to protect the integrity of the information. Thus, the episode closing widget 503 locks users from being able to change the fields of closed episodes and also causes the production management system to generate one or more reports or notifications. In some embodiments, the episode closing widget 503 is restricted to only be accessible the CMP.

In an embodiment, the tabs 501 provide the user with the option of accessing one or more of the following sets of fields:

General: In the general tab the user can set up a variety of information including episode title, due dates, and the names/addresses of people working on the episode. The contact information for certain people, such as the CMP, MXE, MSP, etc. may be copied from the series setup layout 306 to save the user from having to manually enter the contact information. In addition, the general tab also includes fields where the user can input episode-specific information such as the technical specifications pertaining to the video and to the deliverables.

Episode Musicians: In the episode musicians tab the user can choose to add union or non-union musicians as defined in the series setup layout 306 (e.g. via a drop-down list) or the user may enter musicians manually. If the 'all-episode' checkbox had been selected in the series setup layout 306 for a particular musician, that musician is automatically imported into the episode musician tab when the episode is created. The episode musicians tab also provides additional fields for musicians, such as number of hours worked on the episode, the instrument the musician played, or any other notes that a user may want to add.

Report Recipients: In the report recipients tab the user can define names, email addresses, and titles for people who should be notified when certain events happen (e.g. closing of an episode). Individuals defined in the reports & notify tab may receive any or all of the following: payout reports, union reports, episode is closed notifications, episode is ready to be invoiced notifications, payment received notifications, etc. Additionally, the user can customize the language in the email body for each type of notification, and has the option to define CCs to be included in the reports and notifications. If any of the aforementioned information had been defined in the Report & Notify tab of the series setup layout 306, the client imports that information into the Report Recipients tab when the episode is created. In addition, the report recipients tab provides users with the ability to enter general notes that are then included in layouts or generated reports. For example, the notes may be included in the vicinity of the Assignee's cue assignments in the spotting layout, or may be included in cue sheets produced by the user who created the note. The report recipients tab also tracks how many times an episode has been 'closed' and whether or not notification emails have been sent. If the user reopens the episode, makes a change, and then closes the episode again, a dialog box lets the user know that the episode had been closed before and how many (if any) reports and notifications have already been sent. The user may then use that information to manually alert recipients that there may be an update or the client can provide the option of automatically sending out an alert to those on the recipients list.

In an embodiment, the episode setup layout 500 is available to both the MXE and the CMP, but provides different functionality for each role. For example, the episode closing widget 503 may be reserved for the CMP and not available on the MXE's version of the episode setup layout 500. Furthermore, the MXE's version may be restricted from modifying particular fields in the episode setup layout 500 or may be restricted from making modifications altogether (read-only).

12.0 SPOTTING OVERVIEW

Spotting is the process of viewing a production and determining where music needs to be included. Timecode refers to a stamp that marks each frame of video with a number representing a point in time, such as hours, minutes, seconds, and frames (hh:mm:ss:ff).

In an embodiment, the spotting process begins with the VDE creating a continuity report specifying the scenes that will be included in the episode. In some cases, the VDE may indicate temporary music at scenes and times where the CMP/MXE should include music. The continuity report is then provided to the MXE who performs the initial spotting by numbering and naming cues, along with start and end timecode values. Data, as recorded in the continuity layout throughout the editing process, then flows to the spotting layout to populate fields in the spotting notes. The MXE provides the initial spotting notes to the CMP, who reviews and edits the MXE's spotting notes. During the closing of an episode, the MXE performs a final editing revision to the CMP's revised spotting notes to reflect how the cues actually appear in the final production. This final spotting information can then be used by the production management system to generate cue sheets and other reports.

When numbering the cues, the production management system allows for the traditional cue numbering industry standard, whereby "2m3" means "act 2, scene 3" (the 'm' stands for music). For sorting purposes, the production management system assigns a unique, calculated value to each cue, whose calculation is based on the traditional numbering schema. This value is typically hidden from the user. For example, the production management system may associate the cue "1m4" with "104.052", specifying a unique cue in act 1, scene 4. In this way, the production management system can sort cues based on either creation order, or numerical order by act/scene. In some embodiments, the cue numbering may be calculated differently depending on the type of video production.

In an embodiment, once the MXE is finished with spotting, the MXE can select an option which auto-informs (e.g. via email) both the CMP and the MSP (and attaches forms where appropriate) so that both parties may begin their respective work on the production. Notifications or informing, as described herein, may occur via email, instant messaging, or via software-implemented communication processes. Further, when a specific example of an electronic communication mechanism is described in relation to a feature (e.g. email), the feature can also utilize other electronic communication mechanisms in other embodiments.

In an embodiment, the production management system incorporates a timecode calculator. Once timecode start and end times are entered, the production management system automatically calculates the cue length based on the difference between the start time and the end time. However, although a production may have one "primary" set of timecodes ("timecode path") for the cues of a TV episode/film, the production management system may maintain separate but related timecode paths for different users or functions. For example, the production management system may maintain a timecode path for the MXE, a timecode path for the CMP, and a timecode path for the cue sheet. The different timecode paths may be edited independently of one another, but the default values for each path are based on the path that preceded it. For example, the default CMP timecode path may be based on the MXE timecode path and the default cue sheet timecode path may be based on the CMP timecode path.

In practice, the independent timecode paths allow the MXE to enter spotting timecode information for cues in the MXE spotting layout, with the CMP having the option to copy some or all of those cue timecodes into the CMP spotting layout. The CMP can then change the values as needed, without changing the MXE's original values. The CMP further has the option of sending the new values back to the MXE. Since the MXE often works for the CMP, the power to change values (and choose if the MXE layout should include those revised values) rests with the CMP. Once the CMP is satisfied with the spotting notes, the CMP can "lock" the spotting, which means that the MXE can no longer alter the spotting data for the episode in the MXE spotting layout. An indicator on the MXE layout specifies when spotting is locked, and if the MXE attempts to make a change the client displays a warning dialog which informs the MXE that the CMP must be contacted to unlock spotting before changes can be made.

When it comes time to finalize the cue sheet at the end of a production, that job often falls back to the MXE. In an embodiment, the cue sheet timecode is auto-populated by the CMP's timecode path. The production management system then allows the MXE to make alterations to the timecode values during the final mix of a production to reflect the cues which actually made it into the final mix. In practice, the CMP is often not aware of these last-minute changes performed to the cue sheet timecode values. However, the MXE's editing does not affect the CMP's timecode path or the MXE's original timecode path. As a result, the MXE's and CMP's timecode paths remain stored in the production management system for archival purposes in case review of those paths is needed at a later time. As a result, the production management system maintains data related to the MXE's original spotting, the CMP's revision to the spotting, and the final spotting that appears on the cue sheet for the production.

13.0 SPOTTING LAYOUT

Figure 6:
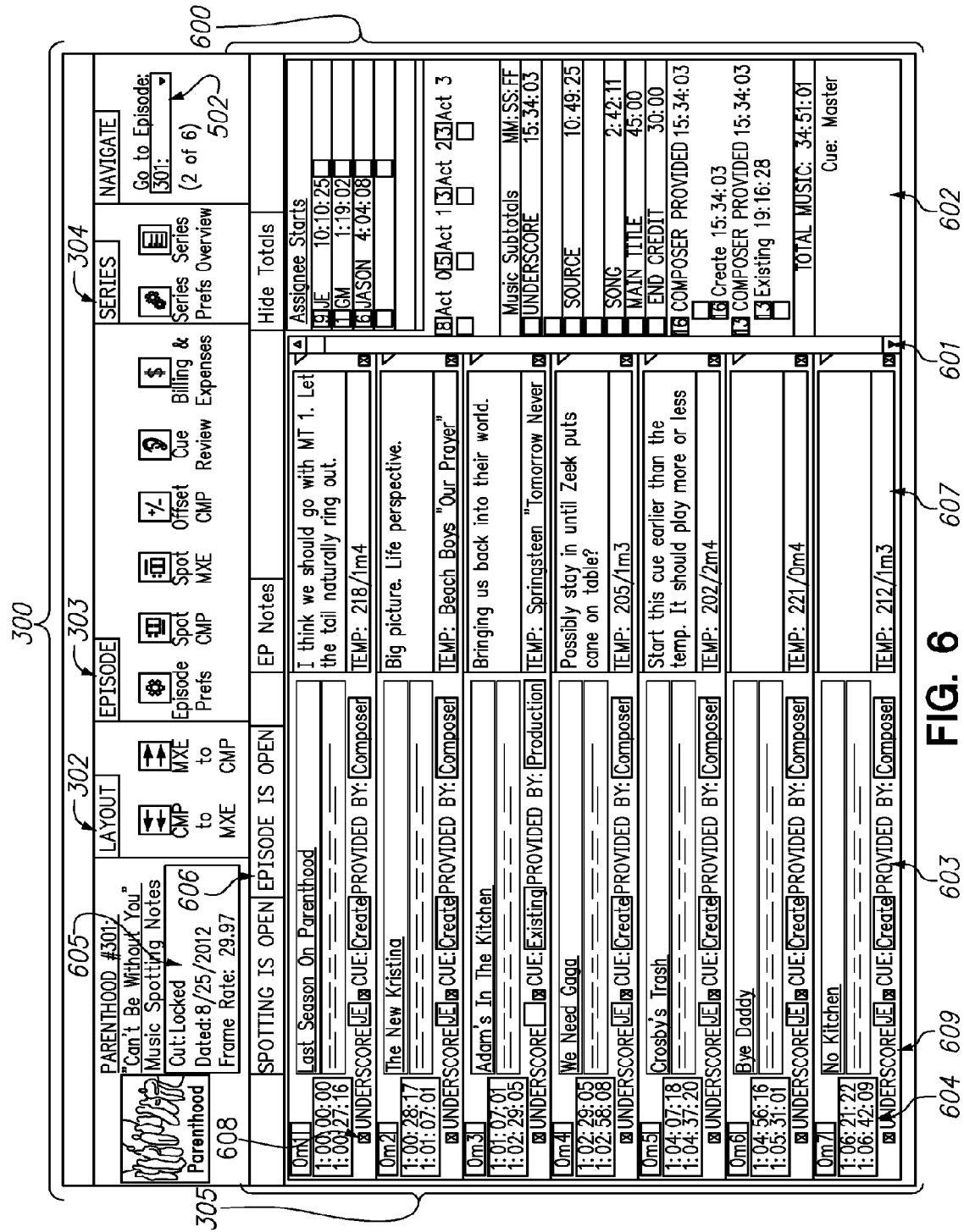
FIG. 6 illustrates the general layout when the widget associated with the spotting layout has been selected according to an embodiment.

FIG. 6 illustrates the general layout 300 when the widget associated with the spotting layout 600 has been selected according to an embodiment.

The spotting layout 600 contains timing information for the cues of a production. In an embodiment, the cues are displayed with a scroll bar 601 (or other widget) that can be selected by the user to scroll through the cues. The spotting layout 600 also includes a cue summary area 602, where the client provides summary information, totals, and data associated with the cues defined in the spotting layout 600. In an embodiment, the cue information area 603 contains data pertaining to the cues such as the cue numbers, cue names, start/end notes, uses information, vocal information, 'provided by' and 'existing or created' dropdowns, etc. The timecode information area 604 contains the start time, end time, length, and use attributes (e.g. "underscore", "song", "underscore (tracked)", "Source", "Source (On Camera)", "Song", "Main Title", "End Credits", "Logo", etc.) related to a cue.

In an embodiment, both the CMP and MXE (or user's with appropriate permissions) have access to the spotting layout 600. However, the options available to each user and the functionality of the spotting layout 600 may differ depending on the user's role. For example, the CMP version of the spotting layout 600 may contain a spot locking widget 605 and an episode closing widget 606 that may not be available to the MXE version of the spotting layout 600. The spot locking widget 605 can be selected by the CMP to lock or unlock the spotting of the current episode. The episode closing widget 606 can be selected by the CMP to close or reopen the current episode.

In an embodiment, when values in the cue information area 603 are modified by the CMP, the changes are automatically propagated to the MXE's version of the spotting layout 600. For example, the data stored in the cue information area 603 for both versions of the spotting layout 600 may reference the same "CUE" table in the database 105. Thus, modifying the fields in the CMP layout automatically causes the MXE's version to incorporate the same values for those fields. However, the information stored in the timecode information area 604 is maintained separately for both the CMP and the MXE. For example, the fields of the timecode information area 604 for each user may be stored in a separate table in the database 105. Thus, modifying the fields in the timecode information area 604 in one user's layout does not automatically affect the data displayed by the other user's layout. Similarly, the data contained in the note information area 607 may be maintained separately for each user.

In an embodiment, when the CMP initially accesses the spotting layout 600 for an episode the client provides blank fields for the cue information area 603 and timecode information area 604. However, the spotting layout 600 provides the CMP with layout widgets 302 for importing/exporting data between the CMP's layout and the MXE's layout for non-shared information areas, such as the timecode information area 604 and the note information area 607. Thus, the CMP can automatically populate the fields in the timecode information area 604 and/or cue information area 603 by copying over the corresponding fields from the MXE's version of the spotting layout 600. The CMP is then free to modify those fields without risk of overwriting the MXE's work. Once the CMP has finished editing the fields, the CMP can then use the layout widgets 302 to automatically export the data back to the MXE's version of the spotting layout 600.

In some cases, the MXE and the CMP may be working on the spotting layout 600 concurrently. Thus, in an embodiment, the production management system implements a conflict resolution mechanism to ensure the integrity of the data. As the CMP and MXE work on their respective layouts (and before spotting is locked by the CMP), if there exists a difference between the MXE timecode values (and/or notes) and the CMP timecode values (and/or notes) for a particular cue, the client 104 provides two arrow widgets to the CMP that appear on the right hand side of the row representing the affected cue. In the event that the CMP selects the first arrow widget, the production management system copies the CMPs timecode information area 604 and/or cue information area 603 for the cue to the MXE's version of the spotting layout 600. In the event that the CMP selects the second arrow widget, the production management system replace the CMP's timecode information area 604 and/or note information area 607 for the cue with the corresponding fields from the MXE's version of the spotting layout 600.

When the CMP closes an episode via the episode closing widget 606, the fields in the spotting layout 600 are used to auto-populate fields for the cue sheet. For example, the timecode start time, end time, and length may be exported automatically to the cue sheet.

In an embodiment, the timecode information area 604 includes a vocal checkbox 608, which when checked indicates that the cue has a vocal component. When the vocal checkbox 608 is checked, the client displays the cue on the CS along with a "By" (background-vocal) or "VV" (visual-vocal marker). In addition, the timecode information area 604 also includes a use attribute dropdown menu 609 that allows a user to designate how the cue will be used. The use attributes and/or vocal markers selected by the user are then represented on the cue sheet in the vicinity of the associated cue.

In an embodiment, the cue information area 603 includes a drop-down list of assignees that may be assigned to the cue. For example, the client may include an entry in the drop-down list for each assignee defined in the series setup layout 306. For cases where the cue is an already-existing piece of music provided by the MXE or MSP, an assignee may not be required and the field can be left blank. As an added visual aid, the client displays each assignee in a unique color defined in the series setup layout 306. In an embodiment, the client displays the color as a flag on the cue (e.g. on the right or left-hand side of the cue's column) once an assignee selection has been made. In an embodiment, the cue information area 603 also includes a "create/existing" dropdown menu that indicates whether the composer needs to compose an original piece of music or the cue is an already-existing track. Furthermore, the cue information area 603 includes a "provided by" dropdown menu that indicates whether a cue needs to be provided by the producer (as in the case with licensed music not provided by the composer) or if the cue needs to be provided by the composer (whether or not it is existing and licensed or originally composed). In an embodiment, the client displays any cue that is marked both with "create" and "composer" with a border box to provide a visual sign that the CMP needs to supply newly-created original music for that cue.

In some embodiments, the user can select a cue number to visually flag the cue (e.g. with a border box or other visually distinguishable marker) for later work or review.

In an embodiment, the cue summary area 602 contains information that summarizes the cues. Information included in the cue summary area may include: assignee starts, music starts per act (counts), "uses" subtotals, composer provided cues (further distilled into 'create' or 'existing'), production-provided (further distilled into 'create' or 'existing'), grand total, etc.

In an embodiment, the client allows a user to select the name of an assignee in the "assignee starts" section of the cue summary area 602 to automatically generate an email to that assignee with a PDF (Portable Document Format) of the assignee's cues for that assignee to address. The client automatically populates the subject of the email with the series name, episode name, and episode number.

In an embodiment, the spotting layout 600 provides a "Master PDF" button (or other widget) that will generate a PDF containing all cues for a particular episode, with the option of displaying assignees for each cue, which can then be printed or emailed or otherwise communicated.

In an embodiment, the spotting layout 600 provides an option to the user to mark and group cues according to user-definable text, such as a character name or a reoccurring theme. In another embodiment, the client enables users to view the video of the TV/film production within the spotting layout 600. For instance, an additional column may be added to the spotting layout 600 containing clips of the production to assist the MXE/CMP when performing spotting. Furthermore, the client may allow a user to select a given cue and have the video automatically locate to the timecode value of that cue in that specific version of the video or edit.

In an embodiment, the client provides alternative views for the spotting layout 600. For example, the client may provide an option or widget that allows the user to view the spotting layout 600 without the cue summary area 602 and/or without the cues being displayed in a tab, but rather in a standard list format. As another example, the client may provide a hybrid layout that contains information from both the CMP and the MXE simultaneously. As a result, the user is able to review his/her own timings and notes alongside the other user's timing and notes. Particularly for the CMP, this option can be useful when choosing which timings and notes should be exported to the MXE's version of the spotting layout 600. Thus, during a spotting session, the CMP and MXE can each be at their own workstation, with the CMP being able to view a continuously updated cue list from the MXE, thus streamlining the spotting process.

In an embodiment, the MXE's version of the spotting layout 600 differs from the CMP's version in the following ways: 1) The MXE is prevented from viewing and selecting assignees, 2) The MXE is prevented from copying data from the CMP, or sending data to the CMP (this type of transfer has to be initiated by the CMP), 3) If the CMP has locked spotting or closed the episode, the MXE cannot make further changes in the spotting layout 600, 4) When the MXE has finished providing spotting notes, an option is available to notify the CMP via email, 5) The MXE has no access to the hybrid layout discussed earlier, and 6) The MXE may not have permission to lock or close an episode.

In an embodiment, the MXE's version (or the CMP's version) of the spotting layout 600 includes an option for automatically converting the VDE's continuity report (discussed later) into an initial set of cues. For example, the VDE may indicate in the continuity report one or more places where temporary or placeholder music has been entered. Thus, when the MXE selects the option to automatically populate cues, the production management system can inspect the continuity layout and add a cue for each place where temporary music has been indicated. The production management system may also automatically fill in default names (e.g. the name of the temporary song), start time, end time, cue number and other fields for the automatically generated cue. In some embodiments, the production management system may provide the MXE with an option to view a scene assignment layout (described more fully in a later section) that displays the cues and the scenes indicated by the VDE in the continuity layout side by side. Thus, allowing the user to discern which cues are included in which scenes. In some embodiments, the VDEs continuity report may specify whether temporary music needs to be scored or licensed and the cues generated from the report may be displayed with a marker indicating the requirements (e.g. a cue that needs scoring may be displayed in blue and a cue that needs licensing may be displayed in red). In some embodiments, the spotting layout 600 provides an option to the MXE to specify how multiple occurrences of temporary music is to be handled. For example, multiple tracks of temporary music can be aggregated into one cue, or each can be added as a separate cue. In another embodiment, the MXE is provided the option of either performing the temporary music to cue conversion via a batch convert for the entire episode, or may specify to perform the conversion on a scene by scene basis.

Figure 17:
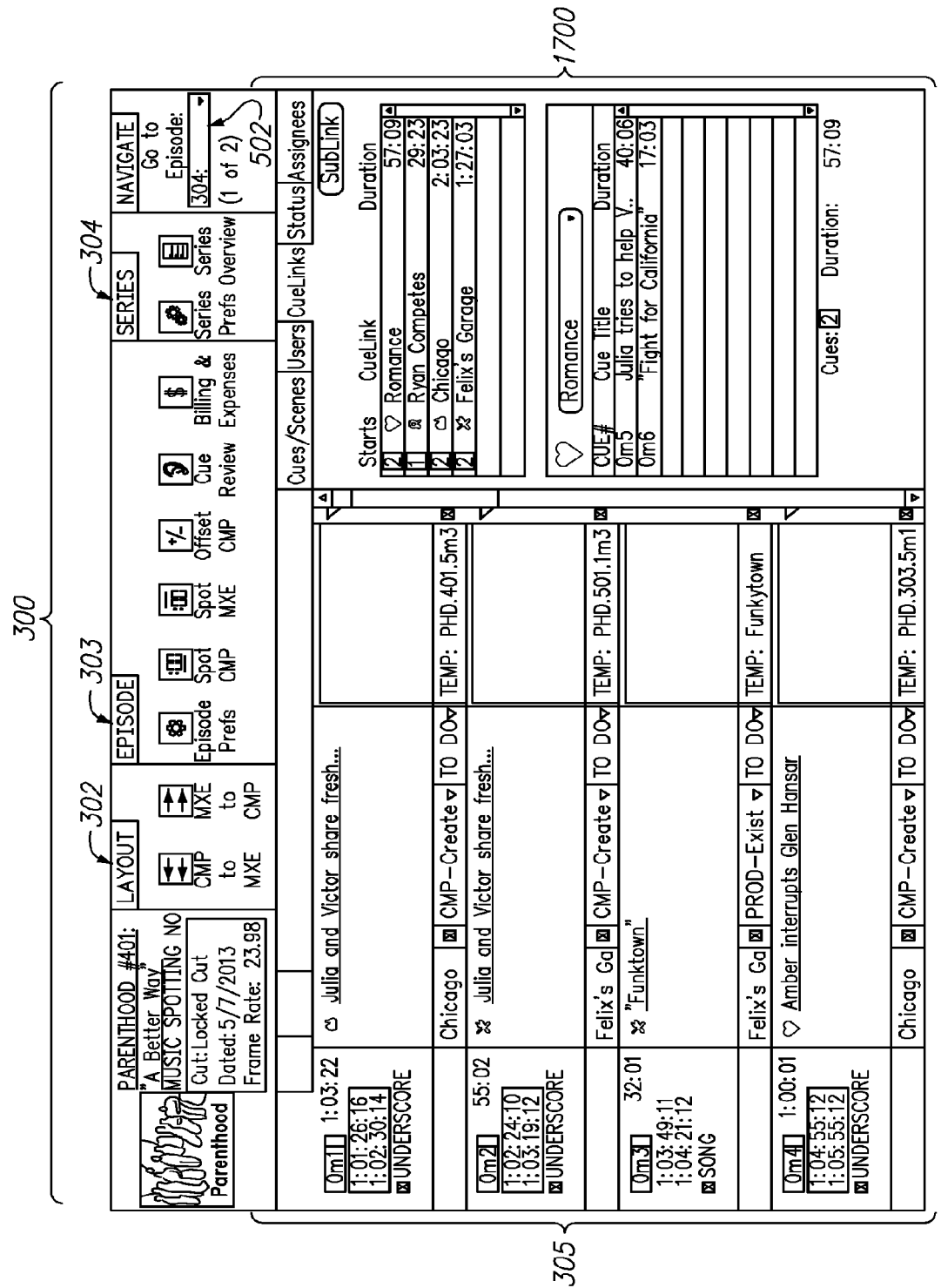
FIG. 17 illustrates a CueLinks layout according to an embodiment.

In some embodiments, the spotting layout 600 provides an option to bring up a CueLinks layout that allows certain descriptors, icons and colors to be attached to cues based on story, location, character, and other user-defined tags. FIG. 17 illustrates a CueLinks layout 1700 according to an embodiment. In the CueLinks layout 1700 there is a main link and many sublinks are definable for each cue. This provides additional context for each music cue that helps the composer create the architecture for the score and also has subsequent value for other purposes for users. For example, the CueLinks layout 1700 is valuable for archival purposes, particularly when production studios want to repurpose music they own at a future time and need a way to search tracks they have created, used, and/or licensed previously. Furthermore, the information provided by the CueLinks layout 1700 can help give further context to music marketed to consumers, and thus may be included in a report directed towards product placement advertisers. For example, a consumer could buy music associated with a particular character, location, or story point. The CueLinks layout 1700 can also be displayed in MSP layouts to provide context to licensed music or music to be licensed.

In some embodiments, the production management system tracks how close the end of one cue entered into the spotting layout 600 is to the start of another cue. If the start of one cue is within a user-defined threshold of the end of another cue, the user is informed. For example, when sending assignments to assignees, each assignee could be notified in emails or reports generated by the production management system of cues that fall within the threshold so they can perform checks on key, tempo, length of fadeout, etc.

14.0 TIMECODE OFFSET LAYOUT

Figure 7:
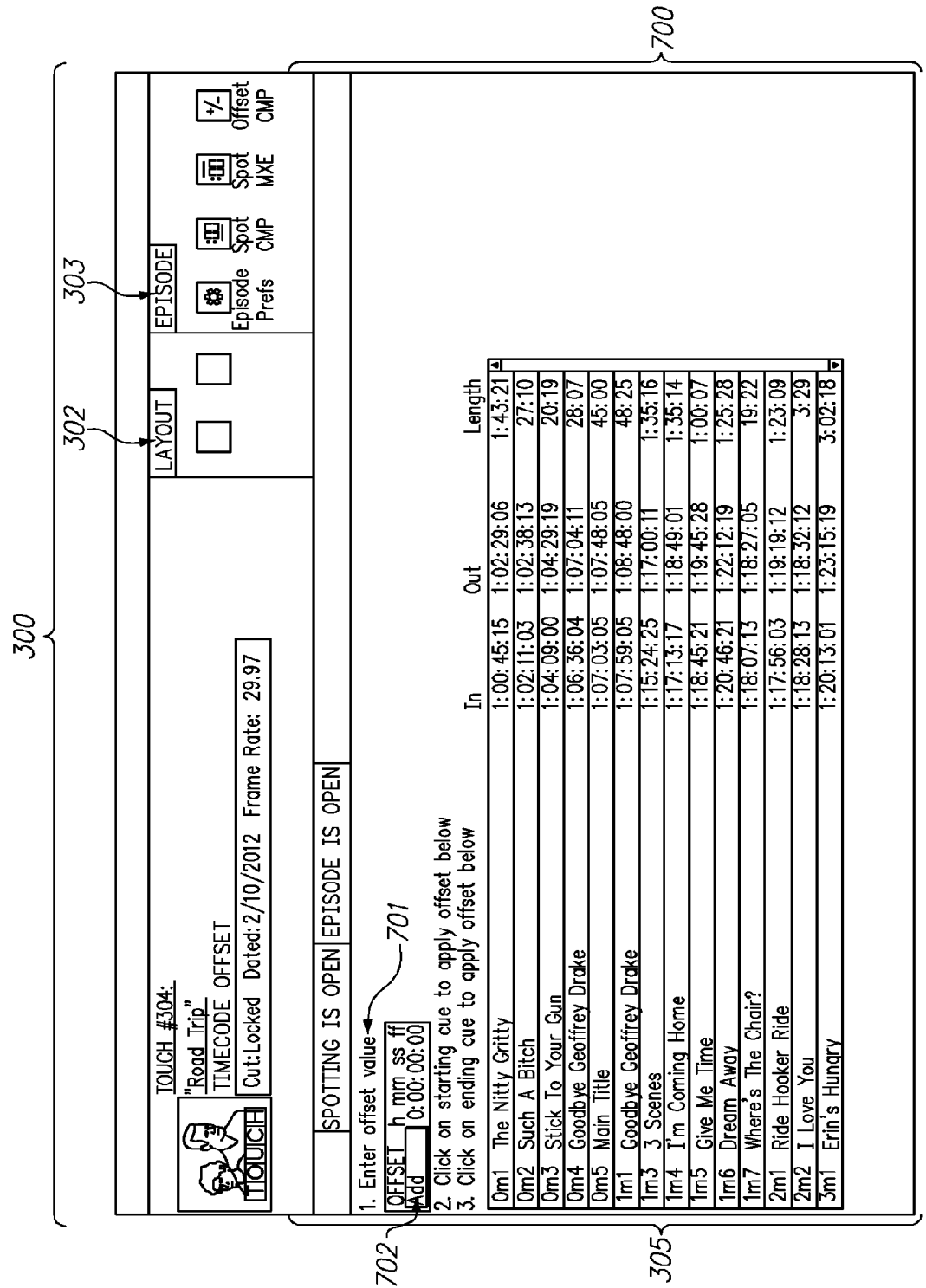
FIG. 7 illustrates the general layout when the widget associated with the offset layout has been selected according to an embodiment.

FIG. 7 illustrates the general layout 300 when the widget associated with the offset layout 700 has been selected according to an embodiment.

In many cases, a video edit (the 'cut') may change after a composer has finished spotting and has begun his work. With timecode values no longer matching the previous cut, the composer has traditionally been forced to manually go through the cut to calculate the new timings. This process would sometimes take hours to complete and even then would provide no guarantee that the timings would not change yet again. As a result, the composer might be required to stop his work until such details have been resolved.

In an embodiment, the production management system helps to alleviate such issues via the offset layout 700. For example, one or two scenes may be lengthened or shortened. The offset layout 700 includes an offset modifier widget 701 that allows a user to choose a timecode value to add or subtract from the current spotted time. In an embodiment, the user inputs the timecode value into the offset modifier widget 701, selects whether to add or subtract from the dropdown menu 702, and selects (e.g. highlights) the cues for which the offset should apply. In response, the client presents the user with a confirmation dialog to confirm the change. If the user chooses to execute the change, the production management system adjusts the selected cues' timecode by the offset amount.

15.0 CUE REVIEW LAYOUT

Figure 8:
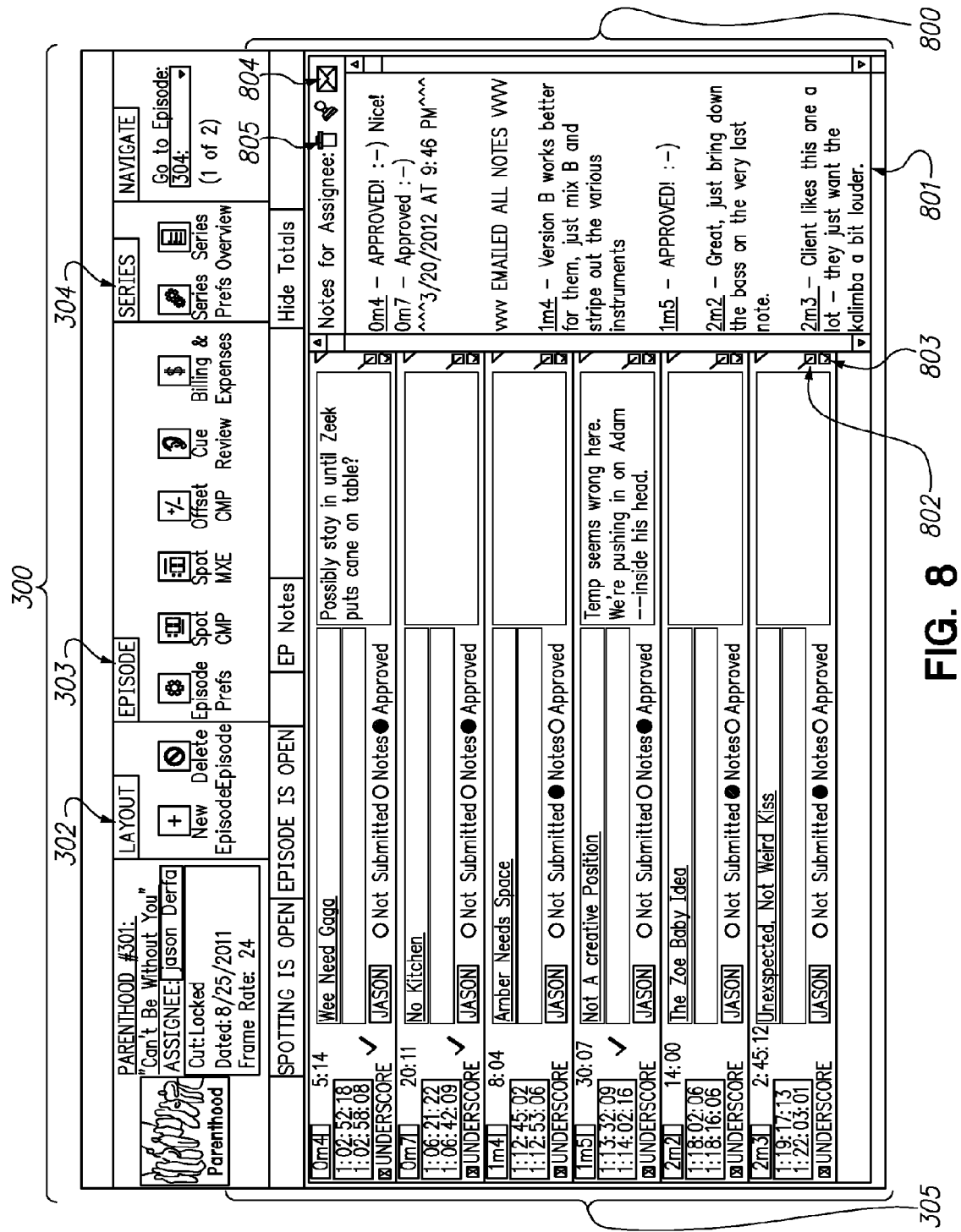
FIG. 8 illustrates the general layout when the widget associated with the cue review layout has been selected according to an embodiment.

FIG. 8 illustrates the general layout 300 when the widget associated with the cue review layout 800 has been selected according to an embodiment.

The cue review layout 800 allows users to keep track of review notes, cue approvals, and cue completions. In an embodiment, the cue review layout 800 maintains an individual set of review notes for each session that is then distributable to individual assignees (e.g. composers, musicians, assistants, orchestrators, or others defined by the user).

In an embodiment, the user selects, via a drop box (or other widget), which assignee's cues to review. In response, the client displays that assignee's cues in the cue review layout 800. The cue review layout 800 indicates how many cues there are for the selected assignee and displays each cue with a number of radio buttons (or other widgets) that may include (for example):
  "Not Submitted"—A radio button indicating that the CMP has yet to review the cue.
  "Notes"—A radio button indicating that the CMP is in the process of giving notes on the cue.
  "Approved"—A radio button indicating that the CMP has marked the cue as approved and finished.

In an embodiment, the right side of the cue review layout 800 displays a notes area 801 for the user to submit notes related to a given assignee. The notes area 801 is a continually-scrollable field able to hold any number of notes, displayed in the order of creation with the most current note at the top.

Within a given cue, the user is able to select the notes icon 802 to begin the review process. In response, the client switches the radio buttons to indicate 'notes' and places a timestamp in the notes field with the cue number in the vicinity. In addition, the client parks the user's curser to the right of the cue number to ready the user to begin typing their review notes.

To approve the notes, the user can select a checkmark widget 803 next to the given cue. In response, the client adds a cue number and a short sentence or word indicating that the cue has been approved to the notes area 801 for the cue. In addition, the client adds a graphic or indicator, such as a large green checkmark, to the row representing the cue.

Once the user has completed entering notes, the user can choose to email the notes to the assignee by selecting a mail icon 804 in the notes area 801. When the mail icon 804 is selected by the user, the client presents a dialog to the user asking if the user wants to send all the notes for the assignee, or just the notes that have not previously been sent to the assignee. After obtaining this information from the user, the client opens the user's email, creates a new message, and populates the body of the message with the appropriate notes. In addition, the client also adds a timestamp to the top of the notes area 801 indicating when this round of notes has been completed and if the email contained all the notes below or just the most recent notes. In other embodiments, the assignee can view the notes via a client of the production management system or can access the notes via external software.

In an embodiment, the notes area 801 includes a trash can icon 805 to delete all notes for the assignee and a stamp icon 806 to manually place a timestamp in the notes area 801 at any time.

16.0 BILLING AND EXPENSES LAYOUT

Figure 9:
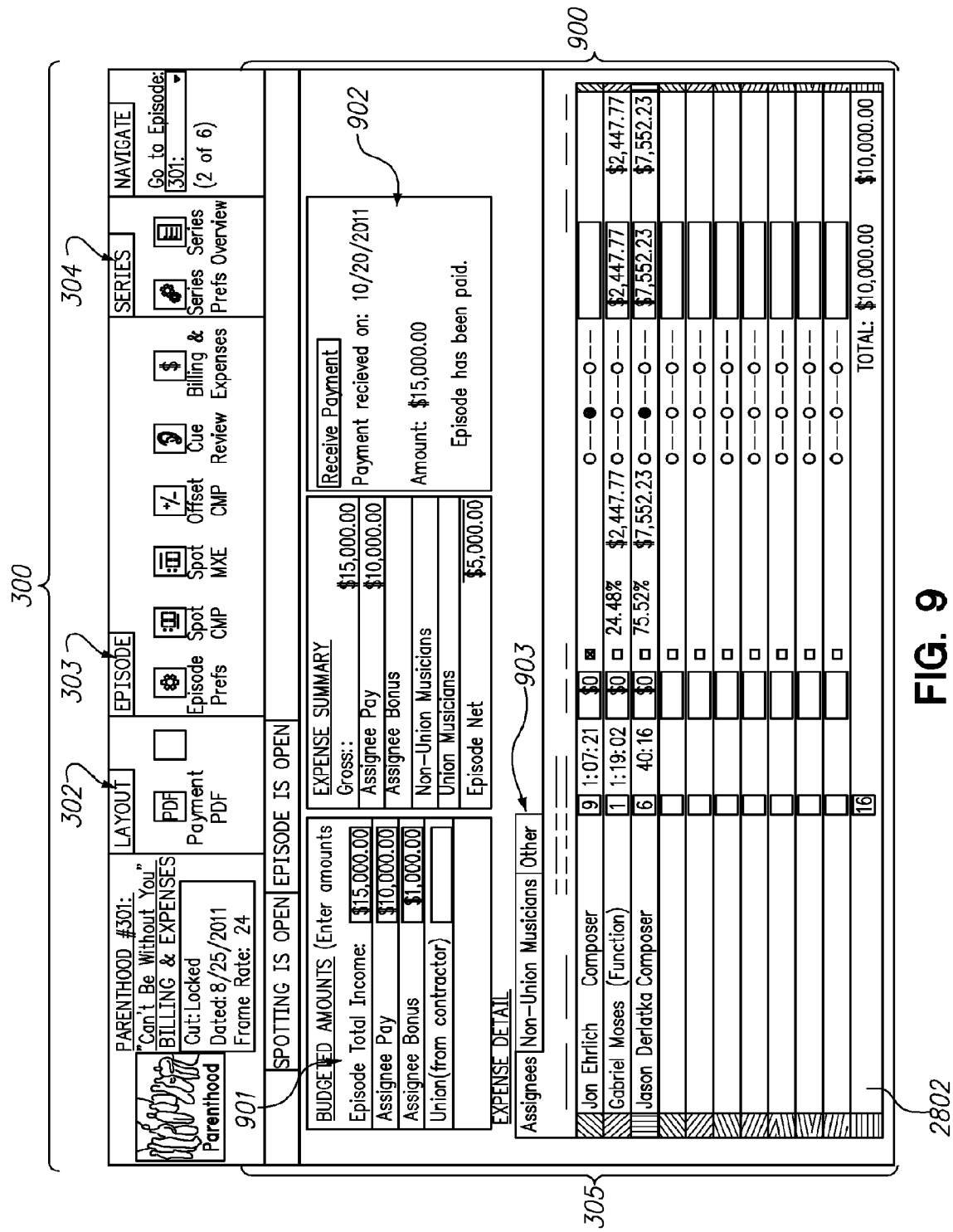
FIG. 9 illustrates the general layout when the widget associated with the billing and expenses layout has been selected according to an embodiment.

FIG. 9 illustrates the general layout 300 when the widget associated with the billing and expenses layout 900 has been selected according to an embodiment.

In an embodiment, the billing and expenses layout 900 tracks expenses relating to the production. In some cases, the user may have independent software, such as Quicken or Quickbooks, for managing invoicing and expenses. Thus, the expense information may be inserted manually into the billing and expenses layout 900 or may be imported automatically from or exported to an external software program via inter-application communication mechanisms such as APIs (Application Programming Interfaces).

The billing and expenses layout 900 includes fields for the total budgeted amount for the current episode. The user may enter the 'total income' that is being received for the episode, and may also enter some subsets of that amount: assignee pay, bonus pay, and the pay for union musicians (e.g. provided by the musician contractor, if available). The production management system uses these amounts to perform calculations for the rest of the billing and expenses layout 900 and for generating reports in other layouts.

The billing and expenses layout 900 includes a summary area 901 which displays a summary of expenses entered by the user, imported from an external source, or calculated by the production management system. In an embodiment, the summary area 901 includes the expenses mentioned previously (assignee pay, bonus pay, and union musicians) and calculated amounts for non-union musicians and 'other' expenses. In addition, the summary area 901 may display the total income for the episode minus all expenses. The billing and expenses layout 900 also includes a workflow area 902 for indicating when the episode has been paid and the date of payment, should the user need to track that information within the production management system.

In the billing and expenses layout 900, the expenses are divided by category into one or more expense tabs 903. In an embodiment, the expense tabs 903 contain the following categories:

Assignees: In the assignee tab, the client displays each assignee in a color-coded list. The assignee tab describes each assignee's function (e.g. 'composer', 'editor', etc.), the number of cues they worked on, and the sum time of those cues. The assignee tab also calculates an 'average' cue length (total sum cue time divided by the number of cues). The assignee tab may also indicate the 'rate per minute' (meaning pay per cue minute) from the assignee information provided in the series setup layout 306. From the cue time and the rate per minute, the production management system can calculate and display the assignee's pay based on the per-minute fees multiplied by the total sum cue time.

In an embodiment, the production management system calculates optional pay via an assignee-weighting algorithm that calculates the assignee's workload based on the percentage of music contributed (weighted against the other assignees). In some embodiments, billing and expenses layout 900 provides an option to the user to exclude specified assignees from the percentage calculation. The production management system calculates the dollar amount by starting with the budgeted amount for all assignees and divides by each assignee's percentage.

In the assignee tab, the billing and expense layout 900 displays a subtotal area 904 where the user can select how each assignee's pay should be calculated. For example, the user may select to pay based on percent of music contributed (weighted against the other assignees), per minute of music written/supplied, or may enter a custom value. The assignee tab also allows a user to define 'bonus' pay for an assignee, which could be any additional amount provided for the particular episode. This bonus amount is added to the subtotal and the grand total ('total payout') displayed for each assignee within the billing and expense layout 900. Furthermore, the client may display in the assignee tab the grand total sum of all the assignees amounts: the subtotal, the bonus, and the total payout.

Non-Union Musicians: The non-union musicians tab lists each non-union musicians used in the episode, along with the instrument played and pay as defined in the episode setup layout 500. In the non-union musicians tab, the production management system calculates and displays the total fee for all of the non-union musicians. In an embodiment, the non-union musicians tab includes an 'edit list' button (or other widget) which acts as a shortcut to the episode setup layout 500 where this data may be changed by the user.

Other: The other tab is where a user can enter expenses that do not fit into the previously mentioned categories, such as studio time, equipment rental, lunches, taxi receipts, etc. In an embodiment, the expenses listed in the other tab is displayed with a checkbox which can be selected by the user to indicate whether the expense should be included in the expense report when the episode is closed. In addition, the client may provide a delete button (or other widget) for removing an expense from the other tab. The production management system calculates the sum total for all of the 'other expenses' and displays the total in the summary area 901.

17.0 CUE SHEET LAYOUT

Figure 10:
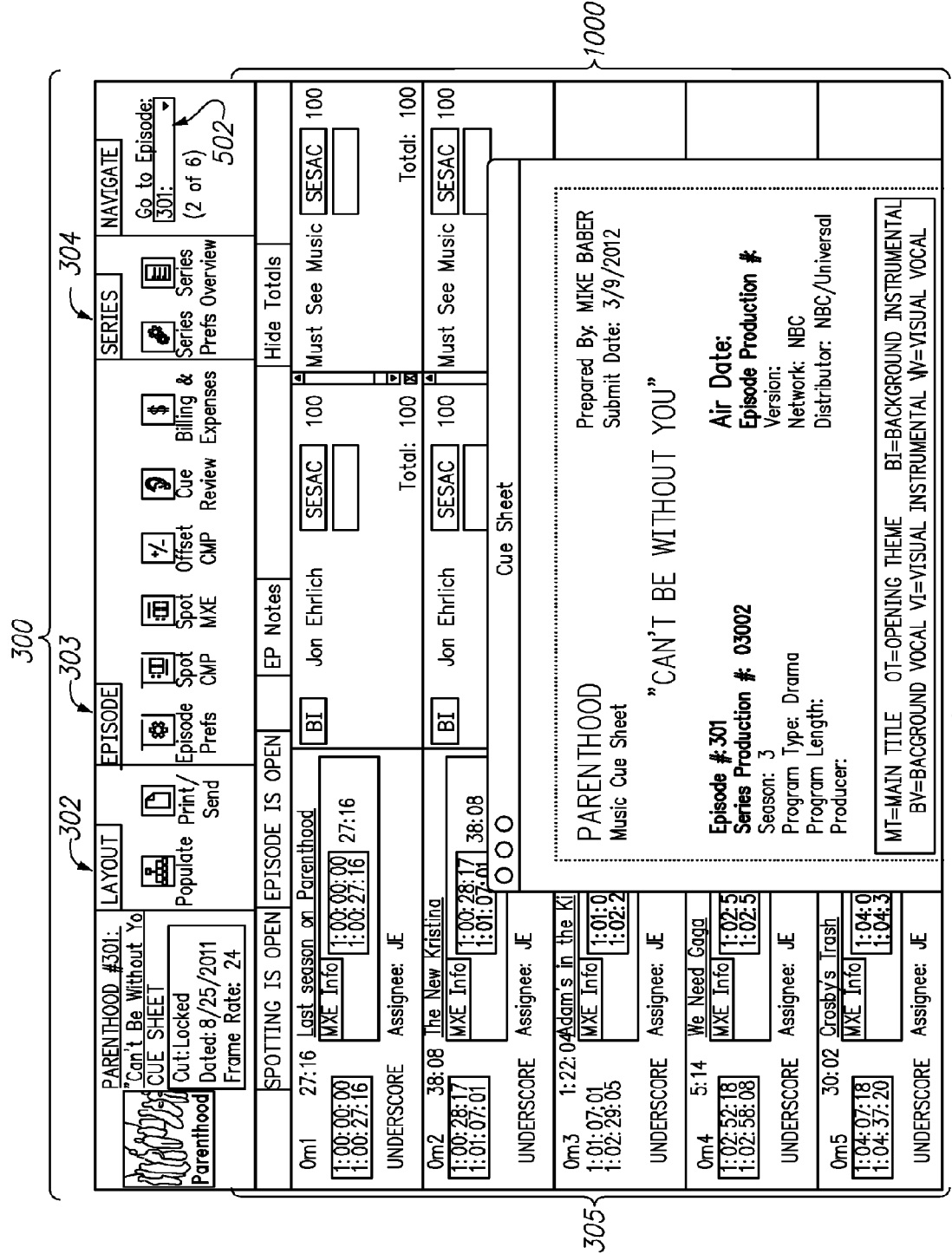
FIG. 10 illustrates the general layout when the widget associated with the cue sheet layout has been selected according to an embodiment.

FIG. 10 illustrates the general layout 300 when the widget associated with the cue sheet layout 1000 has been selected according to an embodiment.

In many cases, the MXE is ultimately responsible for preparing the final cue sheet data for the production. The cue sheet layout 1000 brings together data from the other layouts and takes away the burdensome and repetitive tasks traditionally associated with cue sheet creation. When the production management system is utilized across all users, nearly all of the cue sheet data is already available for auto-population when the MXE arrives at the cue sheet layout 1000 to finalize the cue sheet. In other embodiments, the cue sheet layout provides a populate widget in the layout widgets 302 that auto-populates the appropriate fields. For example, the production management system may populate fields pertaining to cue numbers, names, assignees, use attributes, start and end times, cue lengths, etc. from the spotting layout 600. However, in other embodiments the fields of the cue sheet layout 1000 may be filled in automatically when the CMP closes the episode.

In an embodiment, the MXE cannot enter the cue sheet layout 1000 until the CMP has closed the episode, thus preventing other users from changing the data that is populated into the fields of the cue sheet layout 1000. These timings are further editable by the MXE to reflect any last minute changes to the production.

To populate the writer/publisher splits, the user selects the 'populate' widget in the layout widgets 302. In response, the production management system runs a detailed script to gather all the relevant data from database 105. The production management system then correlates the assignee assigned by the CMP for each cue with the assignee information entered into the series setup layout 306 and fills the writer/publisher info, percentage splits, and PROs into the corresponding fields of the cue sheet layout 1000. In the event that an underscore cue has no assignee, the production management system looks for the default as defined in the 'cue sheet' tab of the series setup layout 306. In the event that any percentage splits do not add up to 100%, the cue's writer or publisher percentage subtotal is visually distinguished (e.g. displayed as red) to alert the MXE. The production management system allows each cue to have a virtually unlimited number of writers/publishers.

For licensed music provided by the MSP, the production management system grabs the writer/publisher data from the MSP's layouts (described in more detail later). In addition, the production management system also changes the cue names entered into the fields of the cue sheet layout 1000 to the licensed song names so that proper attribution can be made on the cue sheet.

In an embodiment, when the information for certain fields of the cue sheet layout 1000 is not available for auto-population, the production management system leaves the fields blank for manual entry by the MXE.

In an embodiment, the cue sheet layout 1000 provides a 'print/send' widget in the layout widgets 302 that the MXE can select to generate a printed cue sheet or PDF suitable for submission to PROs or other entities requiring the cue sheet such as product placement advertisers.

In an embodiment, the cue sheet layout 1000 provides an option for the MXE to indicate that the final cue sheet has been submitted. In the event that the CMP tries to reopen a closed episode, the CMP is presented with a warning dialog indicating that the cue sheet has already been submitted and any additional changes will required a revised cue sheet to be generated and sent to applicable parties.

In an embodiment, the production management system allows for more than one logo default to be entered and added to the generated cue sheet.

In an embodiment, the production management system allows the MXE to automatically send the cue sheet electronically to the PRO's for the assignees who worked on the cues, potentially negating the need for manual re-entry in the PRO's production management systems. In an embodiment, the production management system is configured to display information indicating the electronic submission of the cue sheet, including information provided by the PRO such as the date/time received or a confirmation number.

18.0 SCENE ASSIGNMENT LAYOUT

One potential breakdown in communication that occurs between members of the production is that the VDE and the MSPs often refer to cues in terms of 'scene numbers', whereas the MXE and CMP refer to cues in terms of 'cue numbers'. Since there is no direct correlation between scene numbers and cue numbers, one member may have difficulty pinpointing exactly which scene the other member is attempting to reference. Thus, the job of converting scene numbers often falls to the MXE. In an embodiment, the production management system provides an interface which allows for automatic conversion between the various numbering schemes, as further described herein in connection with FIG. 29.

Figure 11:
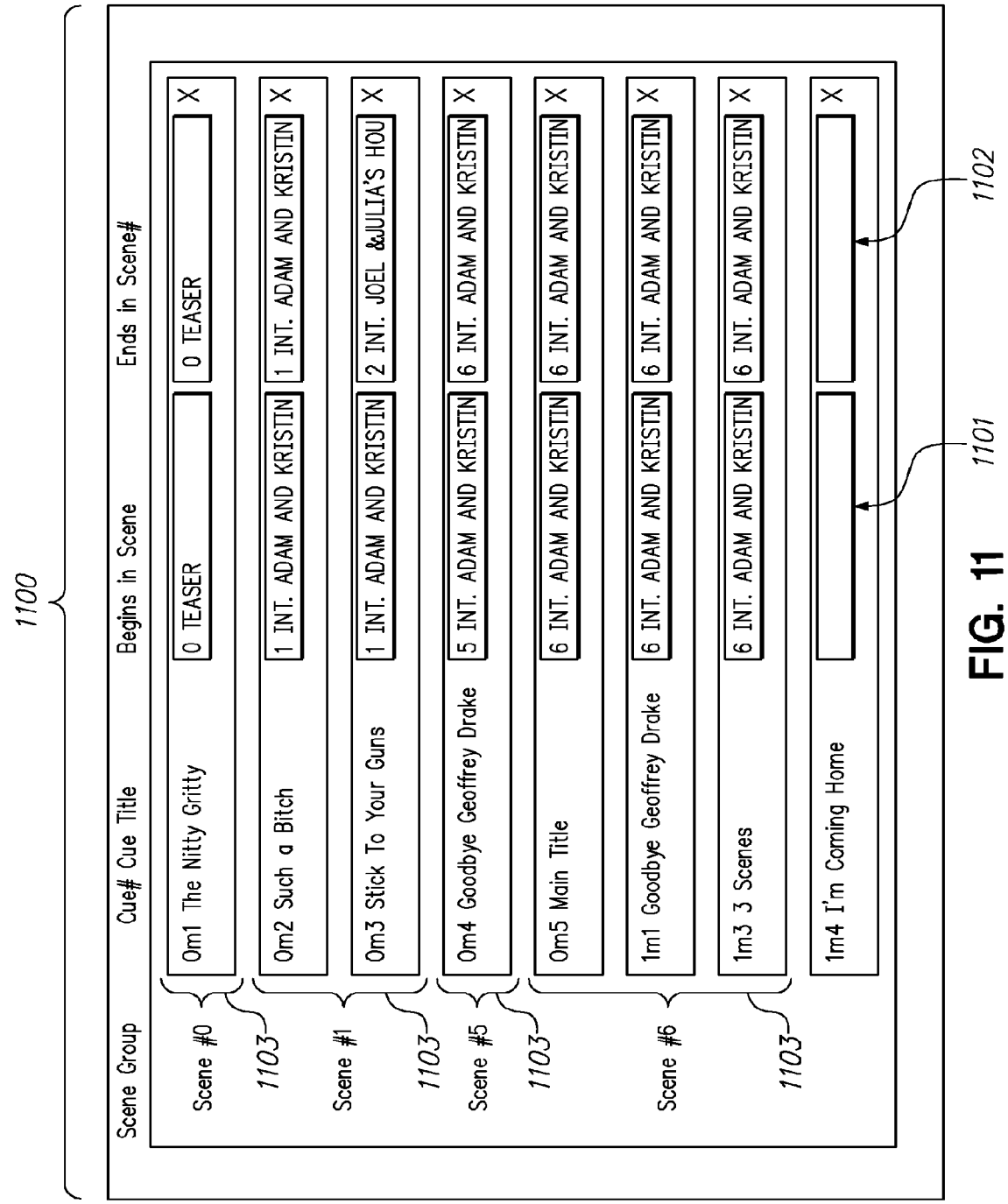
FIG. 11 illustrates a scene assignment layout according to an embodiment.

FIG. 11 illustrates a scene assignment layout 1100 according to an embodiment. The scene assignment layout 1100 allows the user (e.g. the MXE) to assign scenes to cues and vice-versa, resulting in an easily understandable visual representation of how the cues and scenes are tied together.

In in embodiment, the scene assignment layout 1100 displays a list of cues either auto-populated from the spotting layout 600 or as created within the scene assignment layout 1100. Each cue is displayed with a begin scene dropdown menu 1101 and an end scene dropdown menu 1102. The user uses the menus to determine which scene the cue starts in and which scene the cue ends in. In an embodiment, the end scene by default is updated to the scene selected in the begin scene dropdown menu 1101. Since many cues both begin and end in only one scene this default may save the user from entering unnecessary information. However, if a cue spans two or more scenes, the user can edit the end scene dropdown menu 1102 to change the default.

In an embodiment, the scene assignment layout 1100 includes a number of brackets 1103 depicting the scene number that the cue starts in. Thus, the cues may be ordered based on the begin scene dropdown menu 1101 to ensure a clean display for the brackets 1103. If more than one consecutively displayed cue start in the same scene, the client lengthens the brackets to include those cues. As a result, the user has a quick, visual way to determine which scenes contain which cues. In another embodiment, the scene assignment layout 1100 may contain another set of brackets on the opposite side from brackets 1103 distinguishing cues that end in a different scene than the cue began. Thus, providing the user with a convenient and visual way to determine the scenes that a cue spans.

In some embodiments, the production management system automatically populates cues into scenes by utilizing data from the spotting layout 600 in addition to data from the continuity layout. Since the spotting layout 600 specifies the start and end timecode for each cue and the continuity layout specifies information from which the production management system can derive start and end timecodes (order of the scenes and scene length), the production management system can automatically discover which cues intersect with which scenes and automatically populate the scene assignment layout 1100 accordingly. In cases where the VDE has assigned temporary music in the continuity, the production management system may add default cue information for the corresponding scenes representing the temp music. The default cues may include a default name (e.g. based on the name of the episode or series) and given a cue number in accordance with the cue numbering scheme (e.g. based on order of cue creation).

19.0 CONTINUITY LAYOUT

Figure 12:
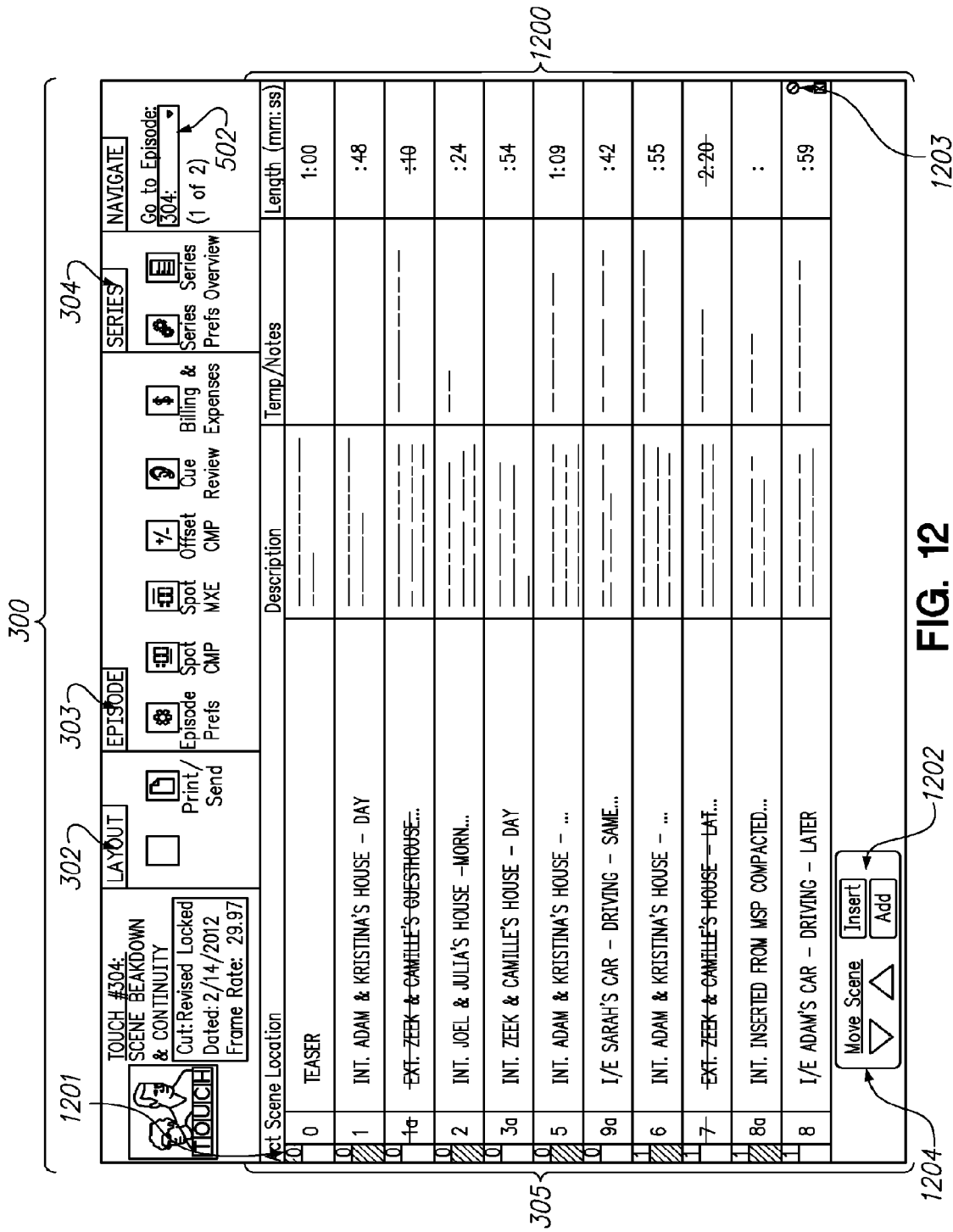
FIG. 12 illustrates the general layout when the widget associated with the continuity layout has been selected according to an embodiment.

FIG. 12 illustrates the general layout 300 when the widget associated with the continuity layout 1200 has been selected according to an embodiment. In an embodiment, the continuity layout 1200 is modeled to cater to tasks traditionally performed by the VDE.

In an embodiment, the continuity layout 1200 includes act numbers, scene numbers, scene locations, scene description, and any music-related or other notes. The VDE may flag any scene as needing licensed music via one or more widgets 1201 associated with a given scene. Once the continuity is complete, the information displayed by the continuity layout 1200 becomes the basis for the MSP's scene layout and the MXE's scene assignment layout.

In an embodiment, the VDE enters scene information in any preferred order. To add a new scene, the VDE selects one of the new scene widget 1202 associated with a particular scene. In response, the client inserts a new scene before or after the currently selected scene, depending on which widget had been selected. In addition, the VDE can select a scene delete widget 1203 to erase an associated scene or can move scenes around (e.g. via drag and drop, increment/decrement buttons 1204, etc.) to change the order in which the scenes appear. In some embodiments, the continuity layout 1200 also allows the VDE to set temporary music (e.g. with start and end timecodes) representing windows of time where the VDE believes the MXE/CMP should create a music cue. In some embodiments, the continuity layout 1200 provides the VDE with the option of uploading the temporary music to the database 105, which the production management system uses to create a playback icon associated with a generated cue in the spotting layout 600, scene assignment layout 1100, or MSP layouts. The icon when selected by a user causes the production management system to begin playback of the uploaded temporary music. For example, the VDE may have a general idea of the music that should be included at a particular scene and provide temporary music that has a similar mood so that the MXE/CMP/MSP know what type of music to obtain/score.

In some embodiments, a scene can be rendered inactive via a scene toggle widget 1205, causing the production management system to consider the scene as deleted for the purpose of generating reports or exporting data to other layouts, but retaining it in case the scene needs to be added back at a later time. When a scene is deactivated, the scene is visually distinguished, such as being tinted red or displayed with a text strikethrough.

When the VDE is finished with the continuity, the VDE can select a 'print/send' button 1206 (or other widget) to generate a PDF to be emailed or printed. In an embodiment, the client arranges the PDF into acts with each act's running time and the scenes/temporary music specified for each act. Further, the continuity layout 1200 may provide the option to include the inactive (but not removed) scenes in the PDF while marking the inactive scenes as such (e.g. with strikethrough). In some embodiments, the continuity layout 1200 provides the option for the VDE to mark temporary music as either needing a license (pre-existing) or needing to be scored (originally composed), or covered under a pre-negotiated blanket license. Thus, when the VDE has finished with the continuity the production management system sends a notification (e.g. email) to the MSP specifying the music that needs to be licensed and/or a notification to the CMP specifying the music that needs to be originally scored. However, in other embodiments, any cues automatically generated in the spotting layout 600 or MSP layouts may be displayed with the aforementioned notifications to inform the MXE/CMP/MSP of the status of the temporary music.

In an embodiment, the VDE has a button (or other widget) that can be selected to signal that the continuity is complete and automatically notify the MSP and MXE to begin their respective tasks using the newly created continuity.

In an embodiment, the VDE, instead of working within the production management system, works to create the continuity using external software/databases. As a result, the production management system may automatically interface with the external software/database (e.g. via the external source's API), to extract the continuity data to populate the MSP and MXE layouts.

In an embodiment, the production management system interfaces with a video editing platform (e.g., Avid Media Composer, Final Cut Pro, Adobe Premiere, or any other video editing platform) whereby scene information and temp music info with metadata can be input directly into the production management system from external software used to edit the video.

20.0 MSP SERIES AND TEMPLATE LAYOUTS

Figure 13:
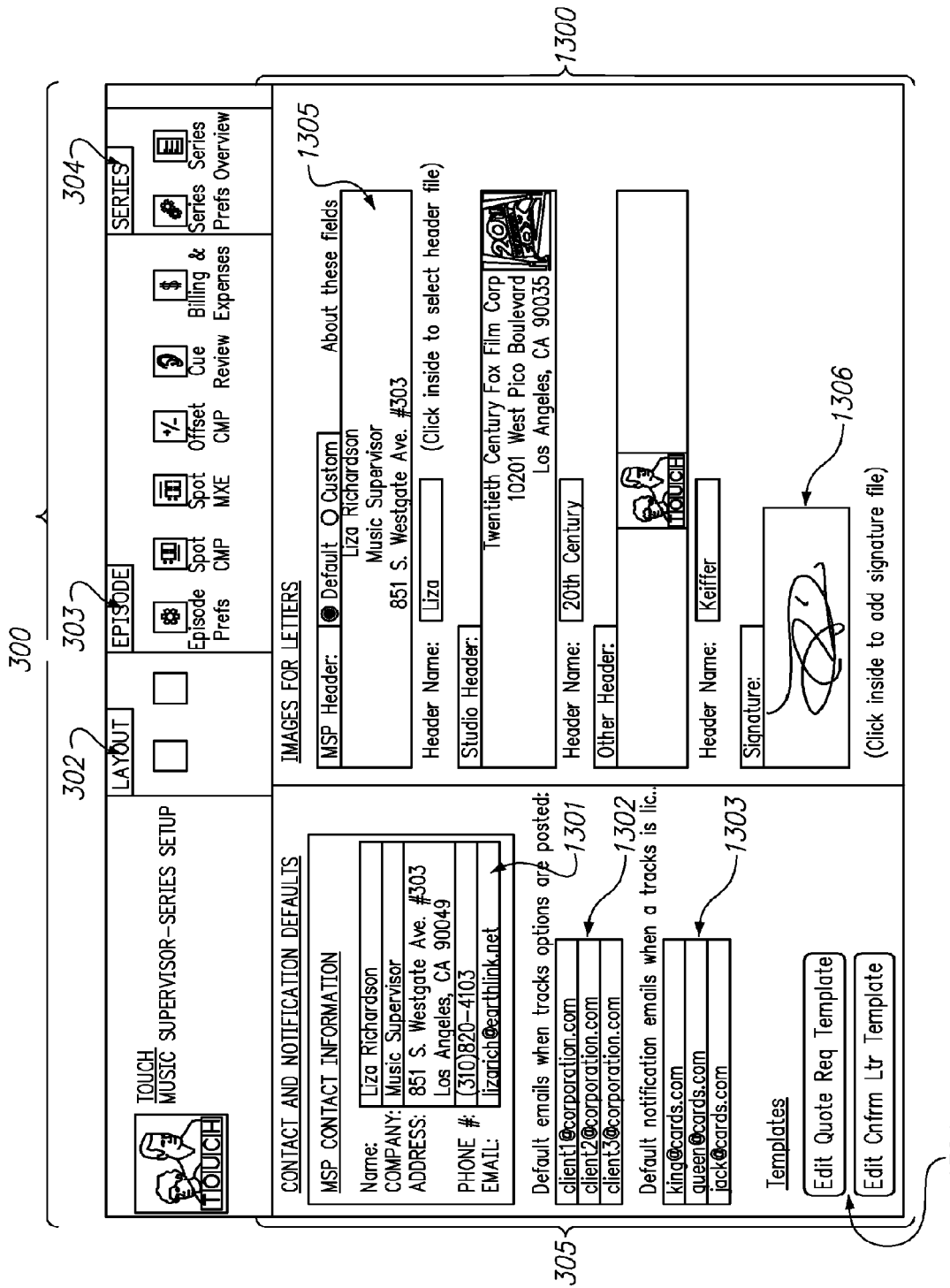
FIG. 13 illustrates a MSP series setup layout according to an embodiment.

FIG. 13 illustrates a MSP series setup layout 1300 according to an embodiment. In an embodiment, the MSP series setup layout 1300 includes options to define MSP contact information 1301, define review emails 1302 of those who should be contacted to review song options, define license emails 1303 of those who should be notified when a song is licensed, define links 1304 to quote request letter or confirmation letter templates, customize letterhead 1305 for use in the quote request letter or confirmation letter emails/PDFs, and customize a digital signature 1306 for use in auto-signing the quote request and confirmation letters.

FIG. 14 illustrates a letter template layout 1400 according to an embodiment. In an embodiment, the letter template layout 1400 is accessed via the links 1304 in the MSP series setup layout 1300 of FIG. 13. However, depending on the link selected, the letter template layout 1400 may contain stored templates for quote request letters or confirmation letters.

Sending quote request and confirmation letters are often a very large portion of the MSP's duties. For example, in many cases, the MSP needs to contact each master owner and each publisher of every licensed track and (at some point) will need to provide both these letters. For an ordinary production, this could potentially result in hundreds of emails. To make matters more difficult, each studio will often have their own language and format that needs to be included in the letters. Thus, the letter template layout 1400 allows the MSP to customize letters for repeated use. In this context, the content of the letters may be communicated electronically or provided through a layout generated using the platform.

In an embodiment, the MSP can use the templates to dictate the language each potential licensed letter will use, what data is included, and what entity is sending the letter. In addition, the MSP can add a digital signature and optional countersignature line. The information provided in the templates then become a default for quote request and confirmation letters generated for a track via the MSP's various layouts. Thus, when generating a letter the production management system auto-fills the MSP's template information into the letter. Furthermore, after the defaults have been entered, the MSP is provided the opportunity to perform additional editing before the letter is finalized and emailed to the respective entities listed in review emails 1302 or license emails 1303 as defined in the MSP series setup layout 1300.

In practice there are three different types of licenses that a MSP may need to procure for a track:

Master Owner: A license from the entity(s) that own the recording of a particular track.

Publisher: A license from the entity(s) that own the composition of a particular track.

Master/Sync: A license from an entity that owns both the recording and the composition on a particular track.

Pre-existing songs (e.g. hit songs) tend to require the first two above. Alternatively, the third can sometimes be used for special cases (e.g. library/stock music where both rights are owned by the same entity).

In an embodiment, since each kind of license requires both a quote request and a confirmation letter, each template layout allows for at least three customizable templates covering Master Owner, Publisher, and Master/Sync letters respectively. In some embodiments, different templates having different content or form may be provided for specific publishers. Thus, in an embodiment, both template layouts provide buttons, tabs, or other widgets for selecting the exact template to modify.

In some cases, the letters may need to appear as having come from the MSP, while in other cases the letters may need to appear as coming from the production studio. Thus, in an embodiment, the template layouts maintain multiple letterhead options that the user can customize separately. For example, the letterhead options may include one or more of the MSP's letterhead, the studio's letterhead, the production's letterhead, or a text based letterhead that pulls information from the MSP's contact information 1301. Furthermore, the letterhead images chosen, named, and added to the templates can be pulled from the data previously entered into the MSP series setup layout 1300.

In an embodiment, the template layouts contain fields for paragraphs that would be common in letters, such as the opening statement, a few different rights, warranty, and a closing line. In addition, there are also fields for default subject and body language of the email as well as who should be cc' d.

In some embodiments, the template layouts support a tagging production management system for certain variable information. Thus, template layouts allow the MSP to create a template in plain English, with variable data tags inserted into regular sentences which refer to information/fields collected by other layouts. The data tags may be identified by markers, such as two hash tags surrounding the data tag. For example, take the following sentence:

The following license is for the song Trouble by Dusty Sands for use in the series TOUCH, episode number 304.

In the template layouts, the formatting the MSP may enter the sentence, for example, as:

> The following license is for the song #Song# by #Artist# for use in the series #Series#, episode number #EpNum#.

The above sentence references and combines information derived from the production management system. As a result, the production management system swaps out the tags for the actual track and scene data from the database 105 when the actual letter is generated from the template. Tags that can be supported include (but are not limited to): Song/Track, Artist, Album, Series, Episode, Master owner, Master Owner Fee, Master Percent, Publisher, Publisher Fee, Publisher Percent, Cue Sheet Writers, Cue Sheet Publishers, Use, Description, Mix Date, Air Date, Total Fee, etc.

In some embodiments, the production management system provides a 'collection bin' where the MSP may store all the tracks for consideration and the different means of obtaining them (local hard drive, iTunes, Internet, CD, etc.). The bins act as a playlist from which the MSP can select music to listen for playback and/or obtain timing information for other features of the production management system. In an embodiment, multiple bins may be maintained with each bin corresponding to a particular category such as series-wide, scene, style of music, vocal/non-vocal, etc. In an embodiment, the platform may be configured with a search facility to enable searching for items in the bins.

21.0 MSP WORKSHEET LAYOUT

Figure 15:
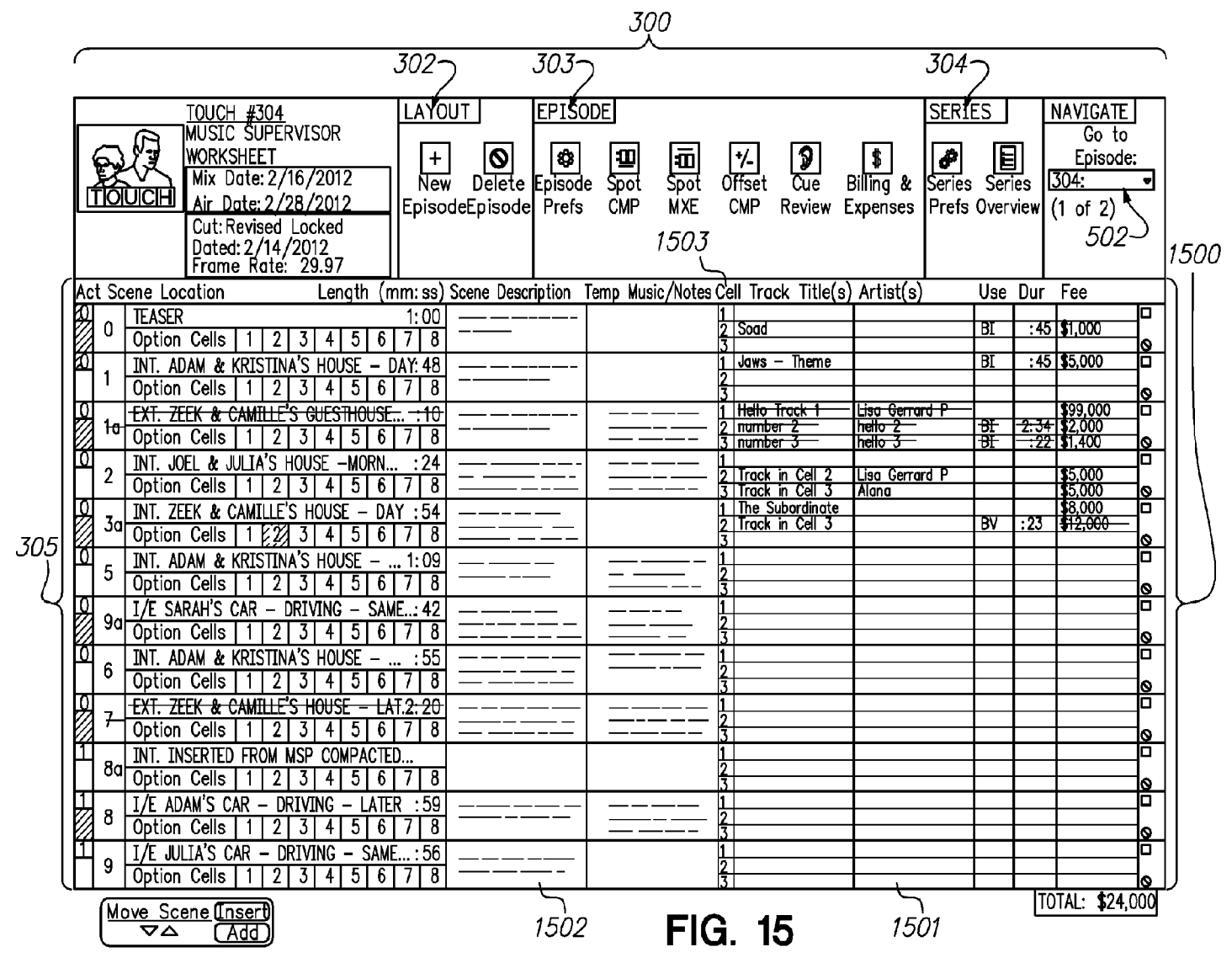

FIG. 15 illustrates a MSP worksheet layout 1500 according to an embodiment.

The MSP worksheet layout 1500 provides the MSP with an overview of each scene in an episode and the possible tracks associated with the scene in the compact track information area 1501. The MSP worksheet layout 1500 is auto-populated with data from the VDE's continuity layout 1200 and includes act numbers, scene numbers, scene locations, scene descriptions, and any music-related or other notes in the information area 1502. After auto-population, the production management system provides the VDE with the option of modifying this information as needed. However, in cases where the VDE did not participate in creating a continuity report (or has yet to create the continuity report) the VDE may enter the pertinent information manually. In some embodiments, the MSP worksheet layout 1500 imports data for the information area 1502 from an external source, such as via an API or other communication mechanism.

In the MSP worksheet layout 1500, the MSP can flag scenes as needing licensed music via one or more widgets. In some embodiments, the MSP worksheet layout 1500 provides an option for the MSP to filter the scenes displayed in the information area 1502 to only those scenes flagged as requiring licensed music. Furthermore, a scene can be deactivated or reactivated without being removed from the list via the toggle widgets. The deactivation may be visually represented, such as by tinting the scene red, displaying a strikethrough, or via any other distinguishing marker. In some cases, after a continuity report has been completed by the VDE, the edit may change and scenes can be moved around or deleted. Since deleted scenes may be added back in a final cut, deactivation without removal prevents the MSP from needing to add the information back in at a later time. In some embodiments, if the VDE has modified scenes in the continuity layout 1200 after the MSP has already begun work, the production management system notifies the MSP (e.g. via a dialog box) and provides the MSP with the option of viewing and importing the VDE's modifications.

The compact track information area 1501 also allows the MSP to enter tracks to process for licensing. In the fee section of the compact track information area 1501, the MSP can enter a dollar amount or type 'l' to indicate thousands, which the production management system will automatically convert to the appropriate dollar amount. For example, 3 k will translate into $3000, 7.5 k will translate into $7500, etc. The fee section also provides a summary at the bottom to show the total license fees for the episode. In an embodiment, the fee section does not include the fees for deactivated scenes in the total. However, the scene itself may still appear in the fee area with strikethrough, color, shading, or other marker.

In some embodiments the production management system may limit the number of tracks that can be entered in the compact track information area 1501 for a scene to a particular number, such as three tracks. However, in other embodiments the number of tracks can be virtually unlimited. The fields in which tracks are entered in the compact track information area 1501 correspond with the option cells 1503 in the MSP worksheet layout 1500. In an embodiment, when a field (row) of the licensed track information area 1502 for a scene is filled in, the corresponding cell in the option cells 1503 lights up to indicate a track has been entered for that cell. The option cells 1503 when selected bring up extended track information, which includes the information in the compact track information area 1501 in addition to further details about the track.

Figure 16:
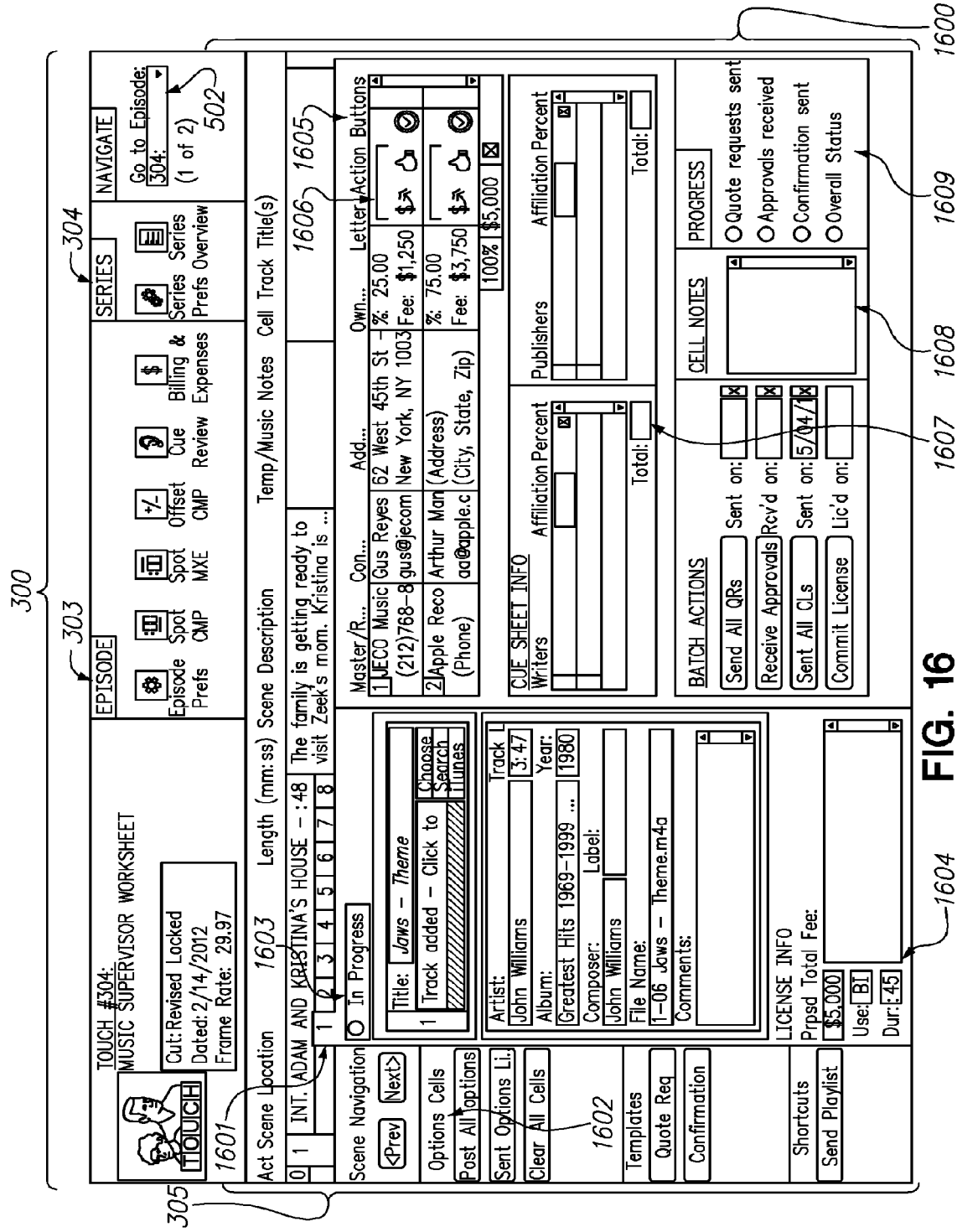
FIG. 16 illustrates an expanded track information layout according to an embodiment.

FIG. 16 illustrates an expanded track information layout 1600 according to an embodiment. In an embodiment, the production management system presents the expanded track information layout 1600 for a track in response to the user selecting one of the option cells 1504 in the MSP worksheet layout 1500 corresponding to that track.

In the extended track information layout 1600, the user can view and manage various aspects of the track's licensing process. In the industry, each track considered for license follows a particular workflow—a quote request letter is sent to the master owners and publishers offering the proposed fee and terms, a quote is accepted (or changes requested), and then once an agreement is reached a confirmation letter is sent with the terms of the license. To provide perspective, a series with 24 episodes will often have upwards to 10 tracks that require licensing. Performing the workflow for each track requires a massive amount of coordination and effort. In an embodiment, the production management system handles the workflow process by automating the generation of a significant portion of the letters and automatically tracks the process for the MSP. Furthermore, since the letters and track information is stored in the database 105, the MSP can review and edit the letters or track information at any time and from anywhere. In this context, the content of the letters may be communicated electronically using software.

In an embodiment, the extended track information layout 1600 contains cell tabs 1601 that allow the user to switch which track's information is being displayed for the currently selected scene.

In an embodiment, the extended track information layout 1600 shares fields with the compact track information area 1501. As a result, modifying a shared field in the extended track information layout 1600 also changes the corresponding field in the compact track information area 1501 and vice versa. Thus, the compact track information area 1501 serves as a shortcut to certain fields (track information, descriptions, etc.) within the extended track information layout 1600. In some embodiments, the extended track information layout 1600 maintains many of the same functions as the compact track information area 1501, such as the ability to deactivate tracks.

In an embodiment, option cell widgets 1602 in the leftmost column of FIG. 16 perform functionality common to all option cells. For example, the option cell widgets 1602 may provide links to the letter templates. In addition, the option cell widgets 1602 may provide options to clear data relating to a particular (or all) option cells, post and email data pertaining to option cells associated with active tracks, and the ability to switch scenes (e.g. to previous or next) without the need to leave the extended track information layout 1600. In such case, the cell displayed will remain the same, but will be adjusted to display that cell for the scene to which the user navigated. In the event that the scene does not have an enabled cell in the corresponding position, the next closest cell may be chosen for display or the fields of the extended information layout 1600 may be left blank.

In an embodiment, each option cell contains data pertaining to licensing the track represented by the cell. In some cases, the option cell may also contain a link or option to display the track itself. In some embodiments, status icons 1603 under the option cells present the user with a visual depiction of the status of licensing for the corresponding track. For example, red may mean that the track is unlicensed, yellow may mean that the license is currently being negotiated, and green may mean that licensing for the track had completed.

In an embodiment, the production management system provides multiple ways the user can add a track to a cell. In one embodiment, the extended track information layout 1600 provides an option to read metadata from the media containing the track and import information into the fields automatically. For example, the media may be located on the user's hard drive, located over the internet, or discovered via a third party software platform (e.g. iTunes). In another embodiment, the user can add the information manually by filling in the corresponding fields.

The license info box 1604 contains data relating to the use of the track. For example, the fee for the license, the type of license use (e.g. Background Instrumentals 'BI', Background Vocal 'BV', Visual Vocal 'VV', Main Title 'MT', End Credits 'EC', Logo 'L', Visual Instrumental 'VI', etc. which default to settings the MXE/CMP chose during spotting), the duration of the use, and/or a description of the use (which defaults to the scene description but can be independently edited).

The contact box 1605 contains contact information for the master owner (recording) and sync owner (publisher) for the track in the cell. In an embodiment, the production management system populates, maintains, and updates this information from within the corresponding tables of the database 105. In addition, the contact box 1605 displays ownership information such as percentage ownership and fees. In some embodiments, the production management system accommodates different percentage splits based on country. Thus, the percentage split for one country can be modified or erased independently of another country's percentage splits. In the absence of specific information, the production management system defaults to an even split for master owners and publishers which can be updated by the user. Furthermore, in an embodiment, the production management system provides an option to update the defaults, so that a greater percentage can be associated with the sync owner over the master owner and vice versa. For more than two parties (e.g. cases where the master owner or sync owner represents more than one entity), the percentage split for the position may be further divided among the members of that position. The fee and percentage subtotals are displayed in the vicinity of the information pertaining to each position. In the event that the percentages do not add up to 100%, the production management system informs the user with a visual alert (e.g. tinting the entries red, displaying an exclamation mark, etc.).

The letter widgets 1606 provide the user with the option to create and track necessary correspondence for obtaining a license. In an embodiment, the letter widgets 1606 provide the ability to create a new (or view an existing) quote request letter, indicate that a quote request was approved, and/or create a new (or view an existing) confirmation letter. In an embodiment, the letter widgets 1606 change color depending on the status of communication. For example, grey may indicate no communication has been sent, yellow may indicate that a corresponding letter has been generated but not yet sent, and green may indicate that the corresponding letter has been sent or approval indicated. The colors thus allow the user to quickly infer the state of a license without needing to read through an extensive amount of text. In an embodiment, the letters are sent via electronic communication software or other communication mechanisms.

In the cue sheet information fields 1607, the MSP can enter composers and publishers for the currently selected cell's track. In some embodiments, the fields in the cue sheet information fields 1607 are automatically populated based on metadata embedded in the media containing the track. When the MXE generates the final queue sheet, the production management system may access the information in these fields in order to automatically fill in corresponding fields in the cue sheet layout 1000. In addition, in the event that the percentage splits imported by the cue sheet layout 1000 do not add up to 100%, the production management system may display an alert to the MXE or on the resulting cue sheet indicating that an error may have been introduced.

In the general notes area 1608, the user can enter information regarding batch processing and a workflow summary. In an embodiment, the general notes area 1608 contains a number of widgets for sending (or printing) all quote request letters, marking all quotes as being approved, and/or sending (or printing) all confirmation letters. In an embodiment, date stamps are added in the vicinity of the widgets (and can be changed by the user), and each contact's status icons 1603 are updated accordingly. In addition, the widgets may provide an option for the user to mark a scene as having an approved, final license. In an embodiment, the information area 1502 contains icons whose display is linked to the status icons 1603 of the extended track information layout 1600.

In an embodiment, the production management system tracks the overall license status 1609 through the use of icons. Thus, if all quote requests for all active tracks have been sent, the corresponding icon indicates such by turning a particular color (e.g. by turning green). However, if a letter for an active track has not been created or sent the icons indicate as such by turning a different color (e.g. yellow). The extended track information layout 1600 may also display similar icons related to queue approvals and confirmation letters. In addition, the overall license status 1609 may display an icon that indicates whether all the quote request letters, approvals, and confirmation letters have been confirmed or sent. Thus, the icon may display grey if no action has been taken in the cell, red if any activity has been taken in the cell to affect its licensing status, and green when the MSP has indicated that the license has been committed. In some embodiments, the extended track information layout 1600 includes the option for the MSP to indicate a license has been committed even in the absence of sending letters or indicating approval. For example, the MSP may want to use external software to send the letters, but still use the production management system for tracking license approvals and thus can bypass the checks ensuring that the letters were sent out and approvals obtained.

22.0 PRODUCT PLACEMENT LAYOUT

In an embodiment, the production management system provides a product placement layout for members of the production team involved with supplying products or services which may be candidates for product placement advertising. For example, members of this sort may include the prop director, costume director, advertising agents, special effects coordinator, vehicle supplier, or any other individual whose job it is to supply an item used in a production or to procure a product or service for use in the show. Thus, the users who enter product/service data as described below need not be actively involved in product placement or procurement; they may be involved only in issues such as set decoration, costuming, props, or other production values without having a direct role in product placement. However, the data they contribute can be usefully applied in other contexts when entered using the production management system as described herein and bound to timecode data.

In an embodiment, the product placement layout contains fields specifying information such as the scene the product/service will appear in, a description of the product/service, manufacturer or supplier of the product/service, and make/model/version of the product/service. In some embodiments, the production management system automatically correlates the products entered into the product placement layout with the scene begin and scene end times that were entered by the VDE during the creation of the continuity. Thus, in response to a user entering a scene number and product/service information, the production management system automatically determines the timecode start time and timecode end time for the associated scene. As a result, the product/service information is automatically supplemented with and authoritatively bound to timecode data, and the production management system maintains an accurate listing of windows of time closely approximating the times when the product/service is visible within the production. This information remains current even if the VDE later edits the time codes for the scene. Consequently, the value of the product placement data increases substantially because other production management systems can use the data for ancillary purposes, for example, to determine when to make product sales offers at the time that the audiovisual program is played, broadcast or exhibited, based upon detecting the then-current timecode position of the program at playback, broadcast or exhibition and which product/service data is associated with that position.

The product placement layout, or any layout previously mentioned, may be displayed with a widget configured to cause communicating a report (organized by scene and/or time frame) of each product and service appearing in the production as indicated by the product placement layout. For example, the product placement report may be sent to an advertiser to allow for targeted impulse advertisements to the added during the production's commercial breaks or provided as notifications to the user during playback of the production.

In some cases the product placement layout may be utilized by many different users with many different roles. Thus, in an embodiment, the product placement layout filters product placement information entered into the layout to only those entries supplied by the current user to avoid unnecessary clutter. However, when it comes time to produce a product placement report, the production management system may include all product placement information entered by any user. In some embodiments, the production management system may organize the products and services listed in the report based on the description (e.g. keyword searches) or based on the job of the user entering the information. For example, the report may organize the products or services displayed in each scene by subject matter (a category for costumes, cars, food, video games, etc.).

In some embodiments, the product placement layout may be implemented by a set of layouts specific to each user's role.

In one embodiment, the production management system provides a $1^{st}$ assistant director (AD) with a layout for creating scene breakdowns. Before the VDE creates the continuity report, much of the information is taken from a form known as a "Scene Breakdown" (aka 'Day out of Days' or 'One liner'). The $1^{st}$ AD is responsible for creating and maintaining this document. The scene breakdown layout is a tool similar in function and design to the VDE continuity layout 1200 described above. The scene breakdown layout includes fields for scene description and location, which can be automatically populated into the continuity layout 1200. Additionally, there are fields for other scene relation information, including but not limited to: character list, wardrobe list (populated from wardrobe log), make-up & hair list (populated from make-up & hair log), prop/product placement list (populated from prop/product log), specific scene location information, and production music notes (on set production music, when applicable). The logs are produced via layouts associated with other user roles, examples of which will be described below. The logs serve to inform the $1^{St}$ AD which shots need to be captured. For example, a deal could require that a specific shot of a car's sun roof appear in the cut and would show up in the scene breakdown layout. As a result, the $1^{St}$ AD is reminded to get the correct shot, and may appear in the VDE's layout so the shot can be properly represented in the cut.

In one embodiment, the production management system provides a wardrobe designer layout. The wardrobe department in practice often has a lot of inventory to manage. The production management system thus provides tools to help keep track of the wardrobe department's inventory. Additionally, the wardrobe designer layout can perform other asset management tasks, such as maintaining photographs, scanned receipts, signed release forms, etc.

The overall functionality of the wardrobe department layout begins with a logging tool whereby each article of clothing is assigned an item number. Groups of items can be assigned unique group ids (for example, an entire wedding outfit would be a group, the shoes, dress, and veil would be separate items with separate item numbers). Each item and group has the ability to attach multiple photographic assets and tagged with user-defined descriptors. Source information such as website and store addresses, phone numbers, contact info, etc. is captured via the wardrobe designer layout. A dropdown list easily allows assignment to pre-defined characters appearing in the production. Other information obtained through various scripts executed by the production management system could also be presented as dropdown-like location descriptions.

To handle agreements and licenses between clothing designers and the production, the production management system models tools based on the same functionality of the MSP license tracking tools (e.g. status icons 1603). Form letters can be generated automatically using variable-data hash tagging template methods described earlier in reference to the letter template layout 1400. Software and other communication mechanisms may be used to send letters generated based on the fields of the letter template layout 1400.

A detailed sheet for each item or item group can be printed or emailed, detailing all of the metadata and photographic assets. Optionally, the detailed sheet may include pricing/licensing information. A full report with thumbnail images can be generated showing item and group uses by act, scene, character location, or any other metric captured by the production management system. Software and other communication mechanisms may be used to send report.

In some embodiments, the production management system provides a make-up & hair layout. The make-up & hair layout provides logging tools similar to the wardrobe designer layout described above and can be used to capture products used, styles, photos, continuity notes, and other data related to important props. In addition, for inventory tracking of props and products used, the make-up & hair layout functions similar to the wardrobe designer layout. Photographic assets can be captured within the make-up & hair layout as well. In some embodiments, props and products that have been included due to product placement deals will be covered by other special tools and layouts. During pre-production and early stages of production, when many of these deals are made, these tools help to assist the negotiation between the product placement team (or whoever at the studio-level is assigned this role) and the products to be included in the production. A layout similar to the MSP licensing tool described earlier can be used to track the status of negotiations with potential placements, and generate any necessary agreements. As with other layouts, any data captured is contextualized within the production management system and, where possible, is assigned frame-accurate timing data upon picture edit creation and completion by supplementing the data with information from other layouts.

Figure 2:
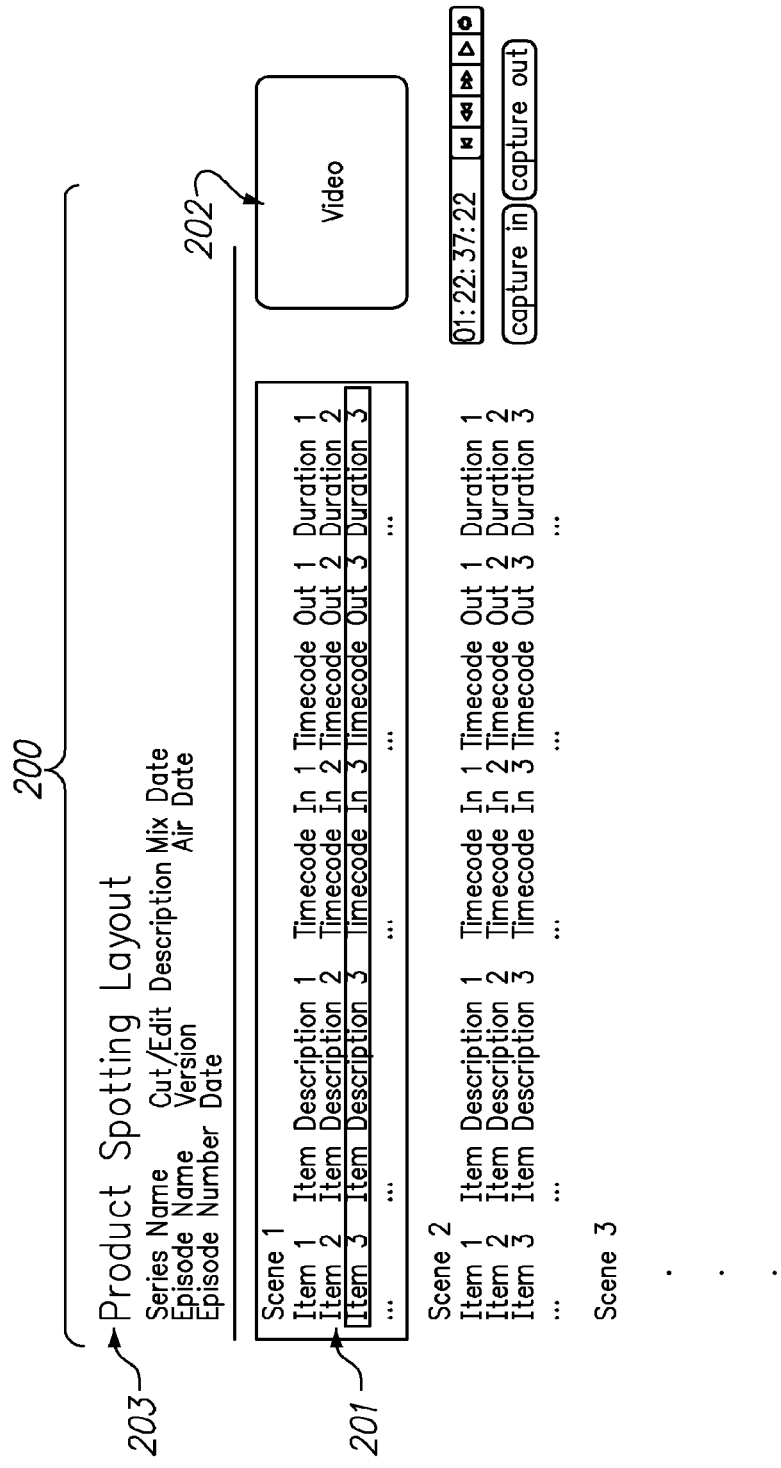
FIG. 2 illustrates a product spotting layout according to an embodiment.

In some embodiments, the product management system provides a product spotting layout. FIG. 2 illustrates a product spotting layout 200 according to an embodiment.

Production assets tracked through the production management system (licensed or 'fair use') gain act and scene-specific context, tying it to all other relevant data stored in the database 105. For frame-accurate description of when products appear and disappear from view, a member of the product placement team or editorial staff will, in practice, require timecode values. As a result, the production management system can provide a tool similar to the spotting layout 600 described earlier, but specific to tracking the timecodes associated with products. Just like cues in the spotting layout 600, products are identified by 'start' and 'end' timecode values. Furthermore, the products can be organized based in order of appearance, scenes, product types, etc. Information from the various production logs can be utilized by the production management system to automatically populate the corresponding information in the product spotting layout 200. Within each scene, products appear as line items. The fields 201 for the start timecodes and end timecodes can be entered manually, or captured in real time by pressing a key command or selecting a widget as video playback begins in the video playback window 202. As the cut evolves, the production management system automatically adjusts the timings in the product spotting layout 200. For example, if a scene is modified using the offset layout 700, corresponding changes are performed in the product spotting layout for affected scenes. In addition to the spotting information, the product spotting layout 200 may also display general information related to the series/episode/version such as series name, episode name, episode number, cut/edit description, version number, date, mix date, air date, etc. which can be automatically populated from other layouts.

In some embodiments, the production management system utilizes object recognition technology to identify objects in a frame. For example, the production management system may run an object recognition algorithm on a clip of the production's video and identify individual objects along with the start and end timecodes for when those objects are visible. The production management system may then automatically populate the fields 201 for a given scene with a general descriptor for each object and the start and end timecodes for when those objects appear.

In an embodiment, once product spotting is complete (e.g. the user selects a widget that locks product spotting), the production management system has access to frame-accurate timing information (in addition to other context the database 105 provides). For example, other context that the production management system may provide includes (but is not limited to) what character is involved, where the scene is taking place (e.g. a particular restaurant, hotel, or vacation destination), where a product is from (i.e. a website that was captured by logging during creation of the production), what music is playing while the product is on screen, which commercial break is coming up after the product's appearance (allowing an advertiser to buy a commercial slot after their product appears), etc. Since all of this data is captured by the product management system during production by the people who have the greatest stake in getting the information correct, the product management system can provide advertisers with quick and efficient access to accurate product placement details even prior to initial release or broadcast.

23.0 MUSIC SEARCH PORTAL

In an embodiment, the production management system provides a 'B2B' (business to business) music search portal that serves as a single destination where users can go to find music to license or add as temporary music for a production. Example users include all those defined herein as PUB. Music obtained through the music search portal passes relevant tagging information and equivalent (e.g. iTunes tags via Gracenote or other metadata provider) but once chosen is also given any available context from within the database 105. For example, the track may be associated with an episode name/number, act number, scene number, CueLinks, and any other relevant data. Additionally, non-publicly available, dynamically changing data on current ownership and royalty splits stored in the database 105 may also be made available.

One reason music publishers and record labels may find the music search portal useful is that they retain control at all times of when certain non-public ownership information and high-quality assets themselves are released. For example, they can decide to publish license rates for each track, or identify tracks which require a negotiation. As ownership information changes, the publishers and labels may choose when to update the database with the changes. Further, they are 'on the desk' and embedded in the workflow of those in the best position to choose licensed music. Music supervisors, on the other hand, find utility because the forensic research that traditionally would need to be done to find those who own the track and split amounts can be discovered automatically if the information is available in the database 105 or via a searchable database provided by the PUB. Furthermore, the music editor may find utility because the music search portal can automatically populate cue sheet information upon the grant of a license and automatically obtain the media itself for inclusion in the final mix of the production.

In some embodiments, the music search portal provides a feature for VDEs where any originally composed music on a production will, at the composer's and/or publisher's discretion, become available for search via the portal. The music may or may not be licensable, but would be available to VDEs looking to choose temporary scores. Thus, the VDE becomes able to choose temporary music from sources not traditionally available. For example, the VDE may be able to search by score-oriented or context descriptions such as "action", "romance", "car chase", etc. in addition to standard musical terminology such as 'jazz' or 'pop rock'. In practice, composers tend to prefer the VDE to choose temporary music composed by themselves since that can lead to being hired to score original music for the production.

Figure 18:
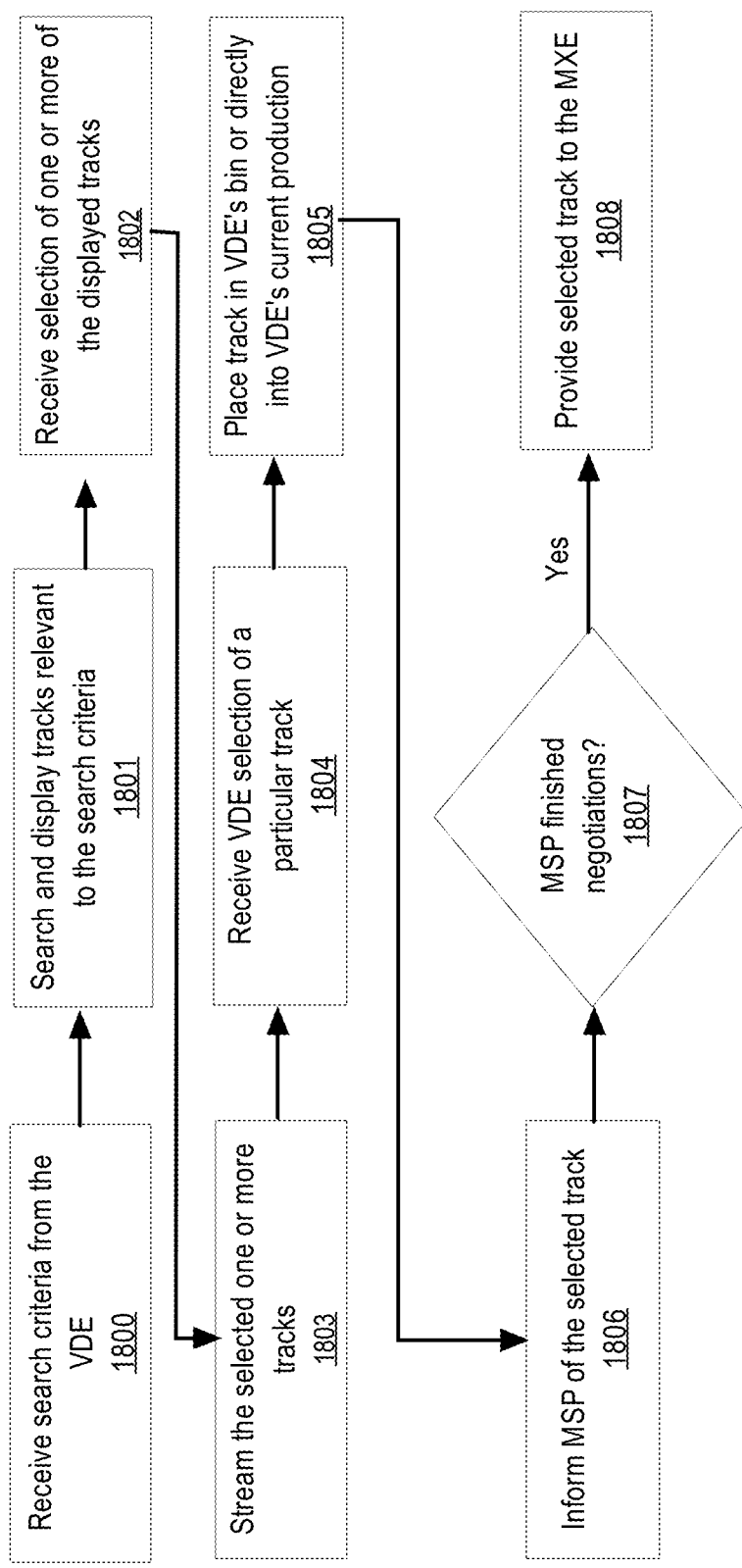
FIG. 18 illustrates an example workflow for the music search portal according to an embodiment.

FIG. 18 illustrates an example workflow for the music search portal according to an embodiment.

At block 1800, the production management system receives search criteria from the VDE (or other user). For example, the VDE may specify to search for music with a certain name, length, media format, context descriptor, composer, publisher, etc.

At block 1801, the production management system searches the database 105 and displays results to the VDE which match the criteria received at block 1800. In some embodiments, the production management system may also search external databases outside the production management system (e.g. databases belonging to PROs or publishers) when searching for music to display.

At block 1802, the production management system receives user input indicating selection by the VDE of one or more tracks from the tracks displayed at block 1801. In an embodiment, the tracks selected at block 1802 represent tracks that the VDE intends to preview before selecting a track to add to a collection bin or to insert as temporary music into a continuity report.

At block 1803, the production management system streams one or more tracks for the VDE. In some embodiments, rather than streaming one or more tracks, the production management system may send the media container as one unit. In some embodiments, in order to save bandwidth, the tracks streamed by the production management system may be lower quality (e.g. subject to heavier compression, lower rate, etc.), than when the track is sent using a non-streaming mechanism.

At block 1804, the production management system receives selection of a particular track from the VDE. In some embodiments, the VDE previews tracks via block 1802 and block 1803 and block 1804 represents selection of a particular track to add to a collection bin or to insert into the continuity report for a production.

At block 1805, the production management system places the user's selected track in a music bin for the VDE or directly into the current production. For example, if a VDE had been searching for temporary music, the production management system may allow the VDE to specify (via a temp music cell) where the music should be inserted in the continuity layout 1200. In response, the production management system automatically adds the fields necessary to add the temporary music. Furthermore, tracks selected via the production management system can be made "context aware", as the production management system can correlate the selected track with act and scene numbers through information provided by the various layouts. Additionally, with video editing platform integration, the VDE can replace a piece of music directly with a new selection from the music search portal.

At block 1806, the production management system alerts the MSP to obtain licensing for the track. For example, the production management system may ultimately update the MSP's worksheet layout 1500 and extended track information layout 1600 with licensing and/or track information obtained from the database 105 (or potentially external databases). MSP can then contact the licensing entity via internal communication or outside (e.g. sending an ordinary email) to obtain license to use the track. In some embodiments, the database 105 contains an extensive archive of licensing information for tracks (e.g. how much the track was licensed for, contact information for the licensor, etc.), that the production management system can use to populate the fields in the MSP layouts. In some cases the pertinent information may not be available and the MSP will need to perform research outside the production management system to obtain the contact information. However, when the information is added to by the MSP during the process of negotiation, that information is automatically stored in the database 105 for referencing when the same track is licensed by another user or during another production. In some embodiments, the storing operation described herein is permitted when the user has appropriate security privileges. In some embodiments, the production management system provides an interface or layout for publishers which allow them to dynamically update licensing information for tracks which they own and the types of licensing information that makes available to its users. In some embodiments, the licensing information for each track is stored in the database 105 with a time-to-live timestamp which, when exceeded, causes the production management system to inform (e.g. via email) the licensing entity to update or confirm the information provided by the production management system. In other embodiments, the licensing entity may maintain an external database of licensing information with which the production management system can interface with when the time-to-live timestamp is exceeded to extract the information.

At block 1807, the production management system determines that the MSP has completed licensing for the track (e.g. via the MSP worksheet layout 1500 or extended track information layout 1600). In response, at block 1808, the production management system provides a mix of the track to the MXE for inclusion in the final deliverables, and ownership/licensing information is automatically supplied to the appropriate fields of the cue sheet layout 1000. In various embodiments, the mix of a track may be provided directly from the production management's database 105, or via an API to a licensor's database.

In some embodiments, the production management system provides a publisher layout that provides detailed licensing history, status, and comparative information to publishers, subject to appropriate security checks. For example, the publisher layout may provide a listing of all tracks owned by the publisher with markers distinguishing the tracks which are currently under negotiations. Further, each track can be selected by the publisher to bring up detailed information regarding the current and previous negotiations, such as the type of production the negotiation is for, the parties involved, the licensing fees negotiated and/or rejected, concurrent negotiations that may conflict, whether pre-approved licensing fees for the track exists, etc. Furthermore, the production management system may collect scrubbed anonymous data from the negotiations performed by users to compile general comparative statistics, such as averaging licensing fees for tracks in a given category (e.g. music in the top 50 hits, music more than ten years old, etc.), which can be displayed via the publisher layout. Furthermore, the publisher layout can provide overview statistics to the publisher, such as total number of tracks owned, being negotiated, average/max/min/median license fees, and most popular licensed tracks.

In an embodiment, the music search portal allows for 1) non-publicly available master and sync owner information to be automatically pushed to user layouts upon a license agreement, 2) assets and metadata can be maintained and controlled by the content owners, 3) the content owners can decide when to release ownership information and cue sheet data on a case-by-case basis, 4) the content owners can choose to show license rates or negotiate on a track-by-track basis from within the production management system, 5) Ownership information can be prevented from going 'stale' since the latest, most current ownership and split information from the content owner is pushed through the search portal on request, and 6) temporary music can be automatically searched for and included in continuities to streamline the scoring process.

24. ALTERNATIVE LAYOUTS

In some embodiments, the production management system provides alternatives for the layouts discussed previously that may be displayed instead of the previously described layouts or provided to the user as an option. The following serve as examples of alternative layouts.

Figure 21:
FIG. 21 illustrates an alternative series setup layout according to an embodiment.

FIG. 21 illustrates an alternative series setup layout 2100 according to an embodiment. The series setup layout 2100 is displayed with a banner containing navigation widgets 2101, which performs the same function as and replaces the episode widgets 303 and series widgets 304 found in the general layout 300. In some embodiments, the navigation widgets 2101 style can replace the episode widgets 303 and series widgets 304 style in other layouts as well, not just in series setup layout 2100. Further, the series setup layout 2100 includes a series picture widget 2102 for upload/updating the logo for the series.

Figure 22:
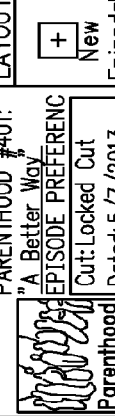
FIG. 22 illustrates an alternative episode setup layout according to an embodiment.

FIG. 22 illustrates an alternative episode setup layout 2200 according to an embodiment. The episode setup layout 2200 includes a CueLinks tab 2201 (or other widget) for accessing the CueLinks layout discussed previously.

Figure 23:
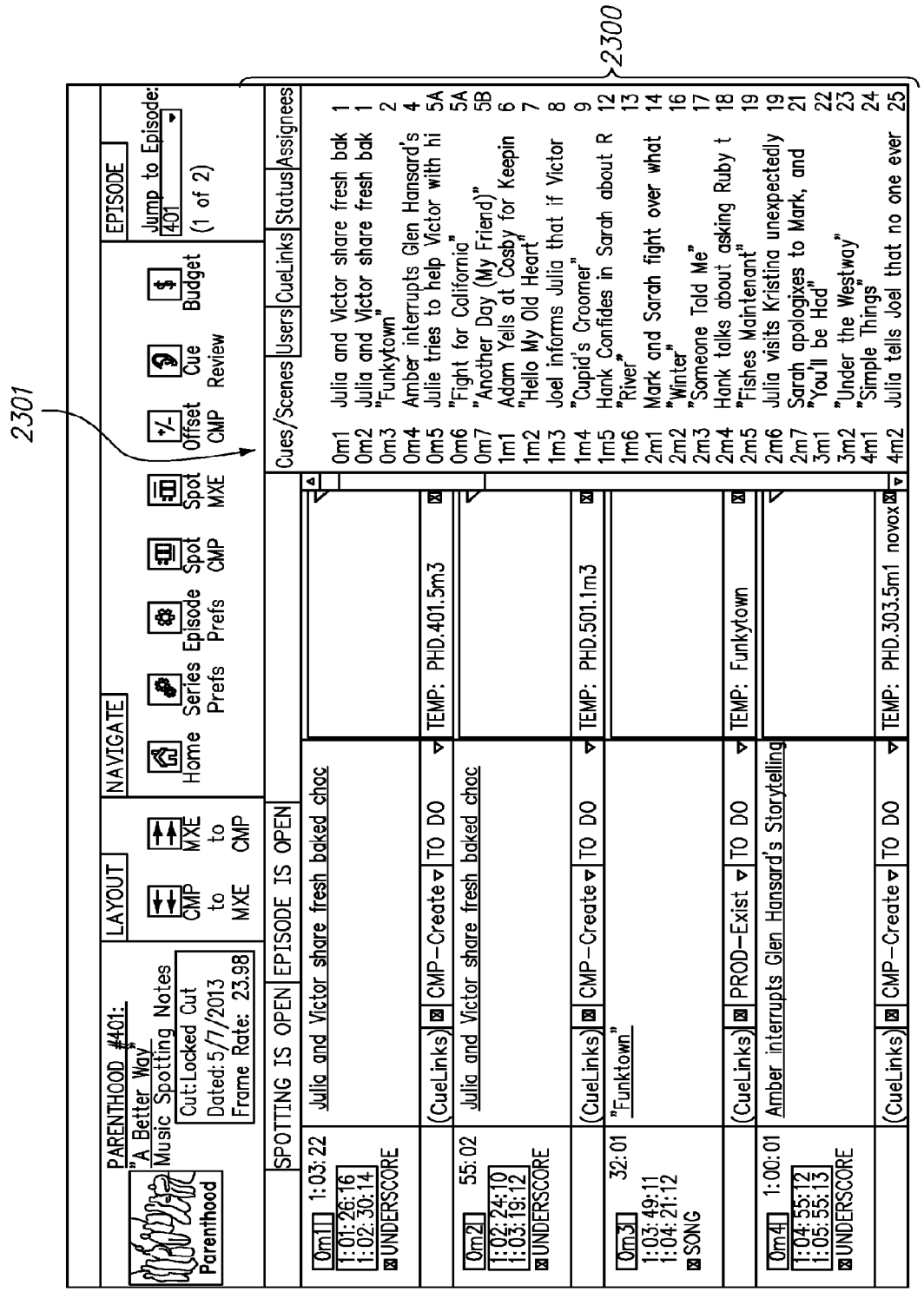
FIG. 23 illustrates an alternative spotting layout according to an embodiment.

FIG. 23 illustrates an alternative spotting layout 2300 according to an embodiment. The spotting layout 2300 includes a cues/scenes tab 2301 (or other widget) for concurrently viewing the cue numbers and corresponding scene numbers, along with the name of each cue. For example the MXE may use the cues/scenes tab 2301 to translate cue numbers to scene numbers and vice versa.

Figure 24:
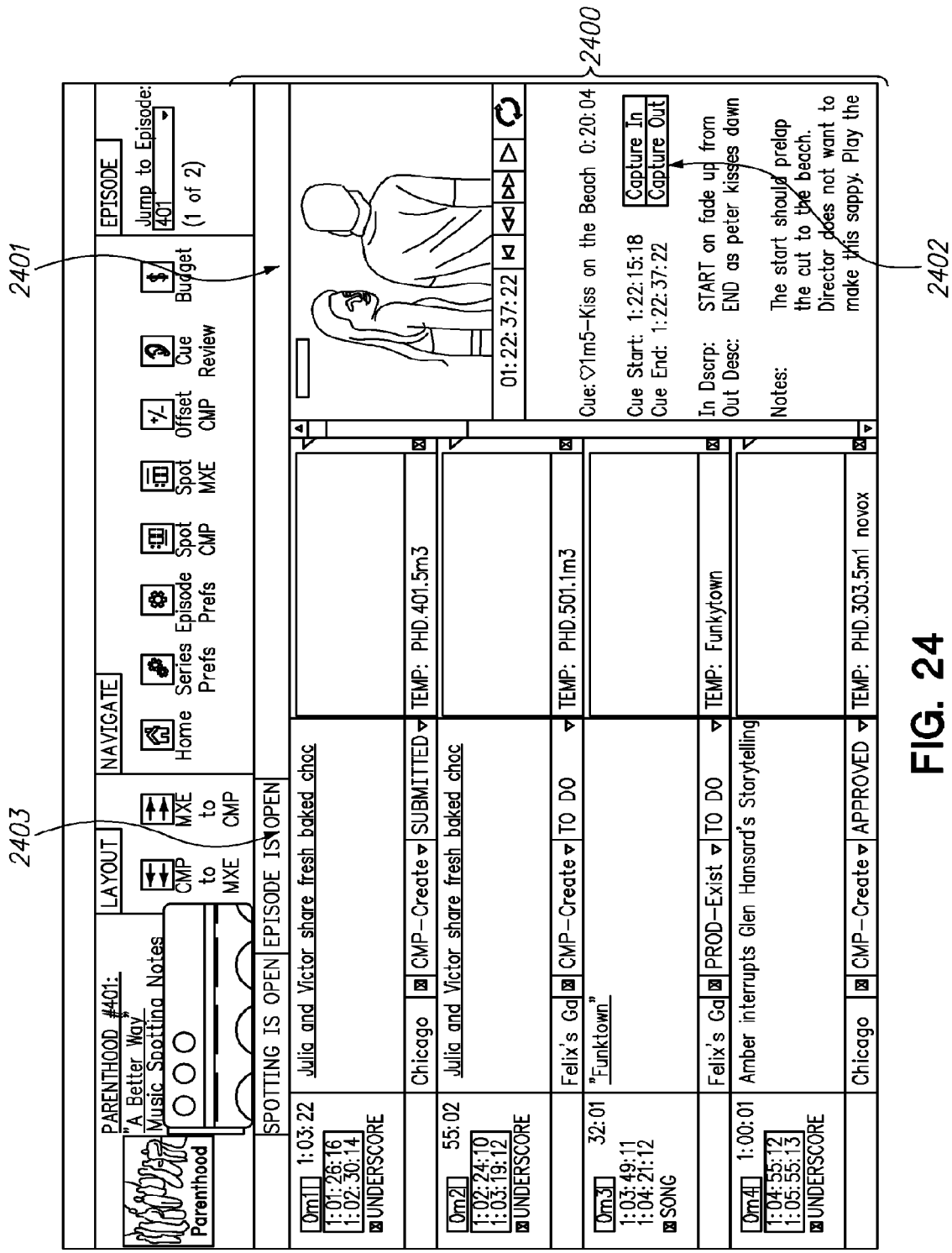
FIG. 24 illustrates a video spotting layout according to an embodiment.

FIG. 24 illustrates a video spotting layout 2400 according to an embodiment. The video spotting layout 2400 includes a video playback area 2401 which allows playback of a video and capture widgets 2402 which allow timecodes of the video to be captured (e.g. capture in, capture out, etc.). In some embodiments, the production management system can automatically export the timecodes captured in this fashion to the start and end timecodes of the currently selected cue. In an embodiment, when a user selects a cue from within the cue information area 2402, the production management system updates the video playback area 2401 to a clip of the video corresponding to the selected cue. In an embodiment, the video spotting layout 2400 allows the CMP (or other user) to create a preview of the movie containing one or more cues and send the movie to other users (or external entities) for review and/or approval. Additionally or alternatively, a reference to the movie is sent. In some embodiments, similar to the spotting layout 600, the video spotting layout 2400 provides the option for the CMP to view both the CMP's and the MXE's comments together in a hybrid layout.

Figure 25:
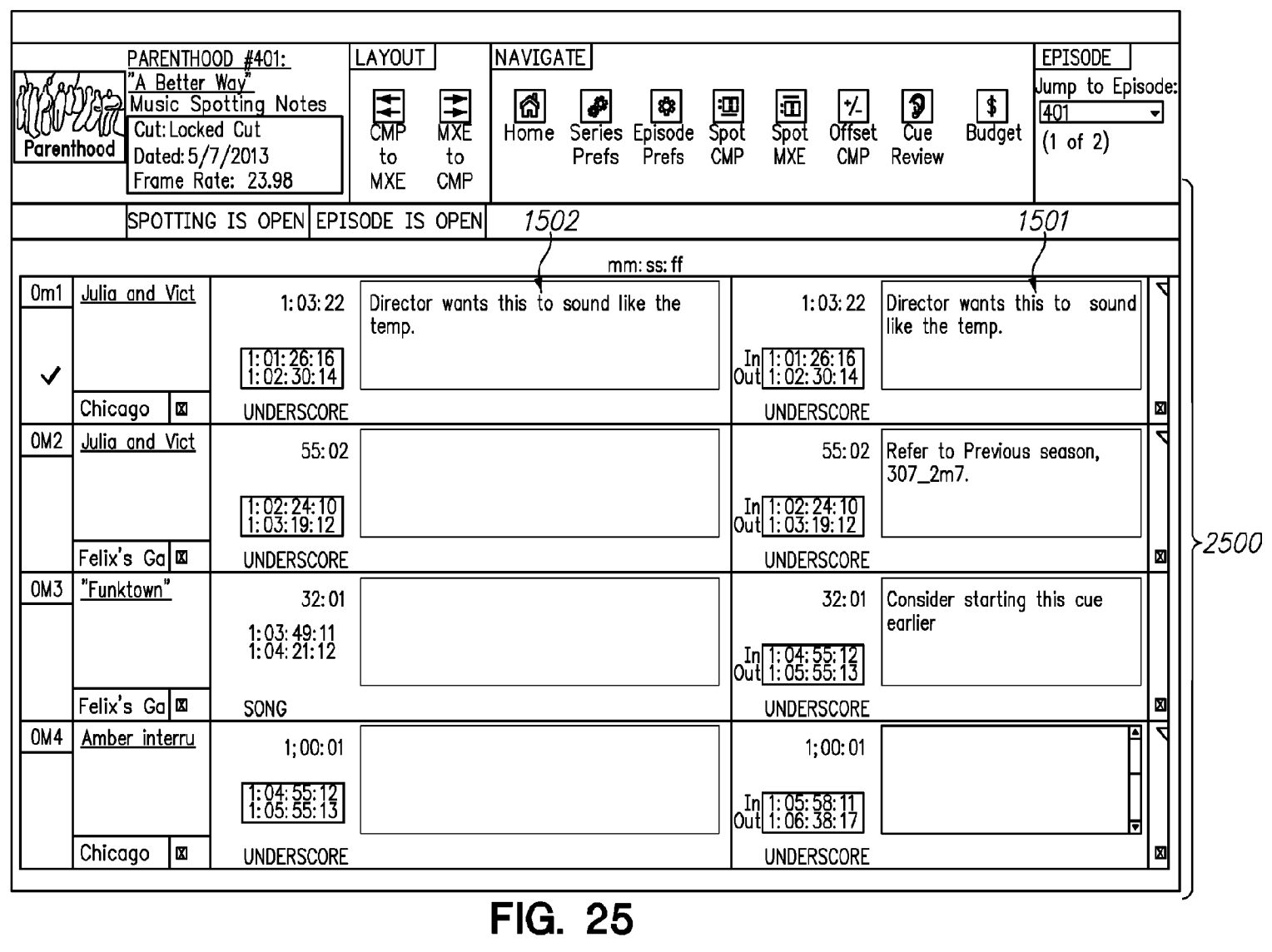

FIG. 25 illustrates a hybrid spotting layout 2500 according to an embodiment. In the hybrid spotting layout 2500, a CMP notes and timings area 2501 is displayed concurrently with a MXE notes and timings area 2502. As a result, the CMP is able to view his/her own notes and timings, alongside the MXE's notes and timings, in order to determine which notes and timings should be imported or exported between the MXE's and CMP's version of the layout.

Figure 26:
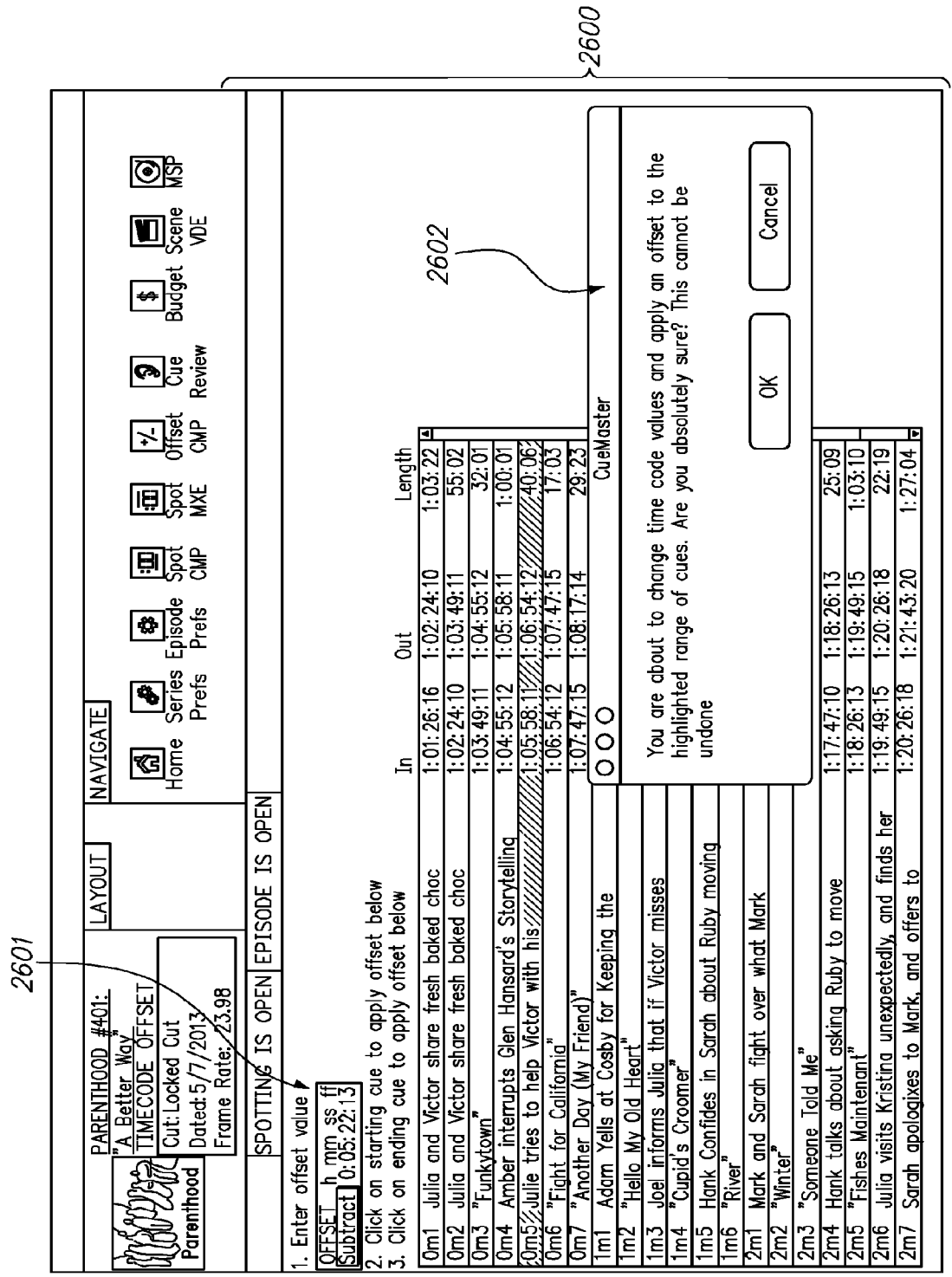
FIG. 26 illustrates an alternative offset layout according to an embodiment.

FIG. 26 illustrates an alternative offset layout 2600 according to an embodiment. In the offset layout 2600, when a user attempts to change a timecode via the offset modifier widget 2601, the production management system provides a confirmation box 2602 asking the user whether the changes should be saved. Upon receiving confirmation, the production management system saves the changes made to the cue offsets using the offset modifier widget 2601.

Figure 27:
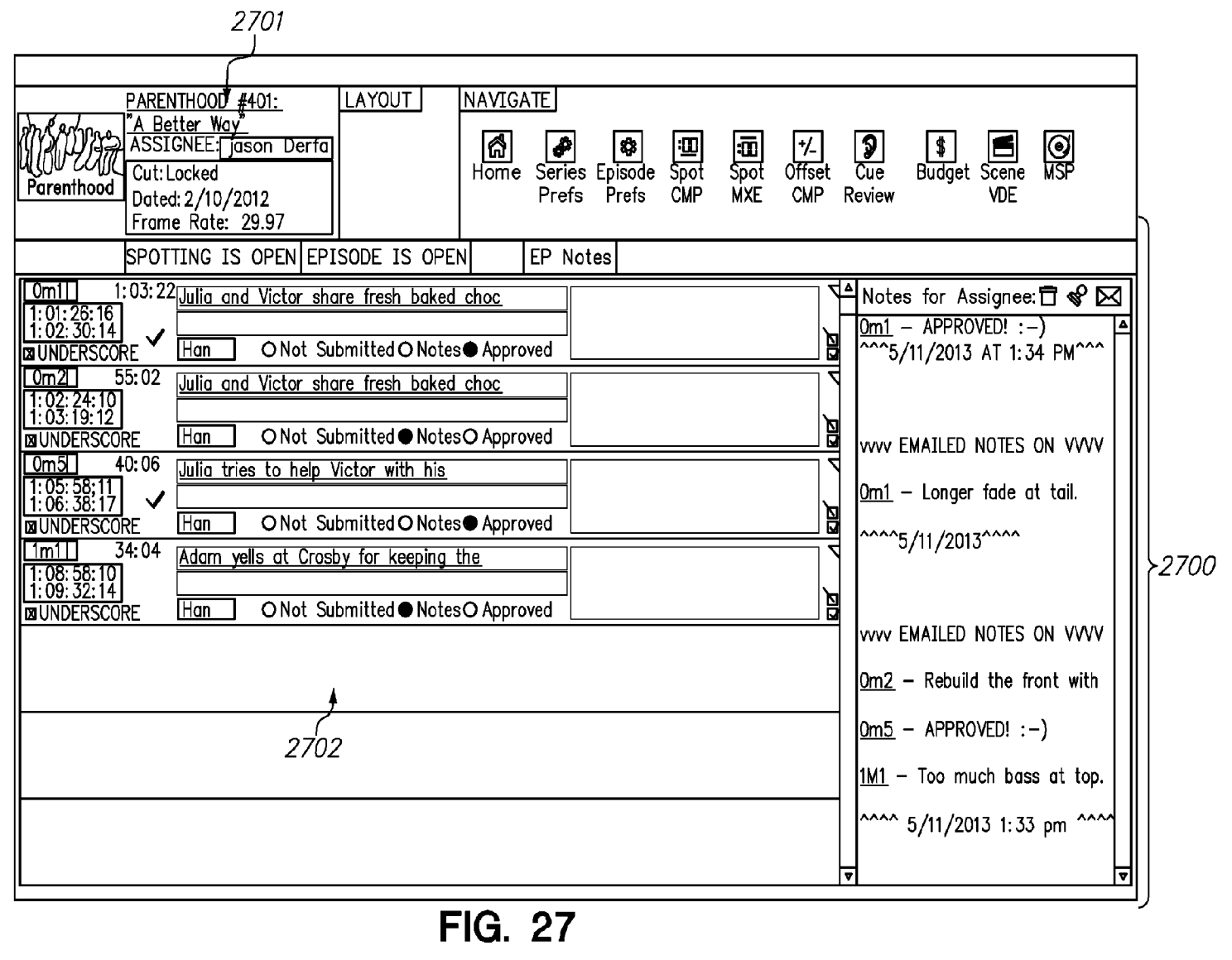

FIG. 27 illustrates an alternative cue review layout 2700 according to an embodiment. In the cue review layout 2700, the user is provided with an assignee dropdown menu 2701 for filtering the cues displayed in the cue information 2702 to only those cues assigned to the selected assignee. In other embodiments, instead of a dropdown menu, the production management system may provide a search field performing keyword matches to locate cues belonging to a given assignee.

Figure 28:
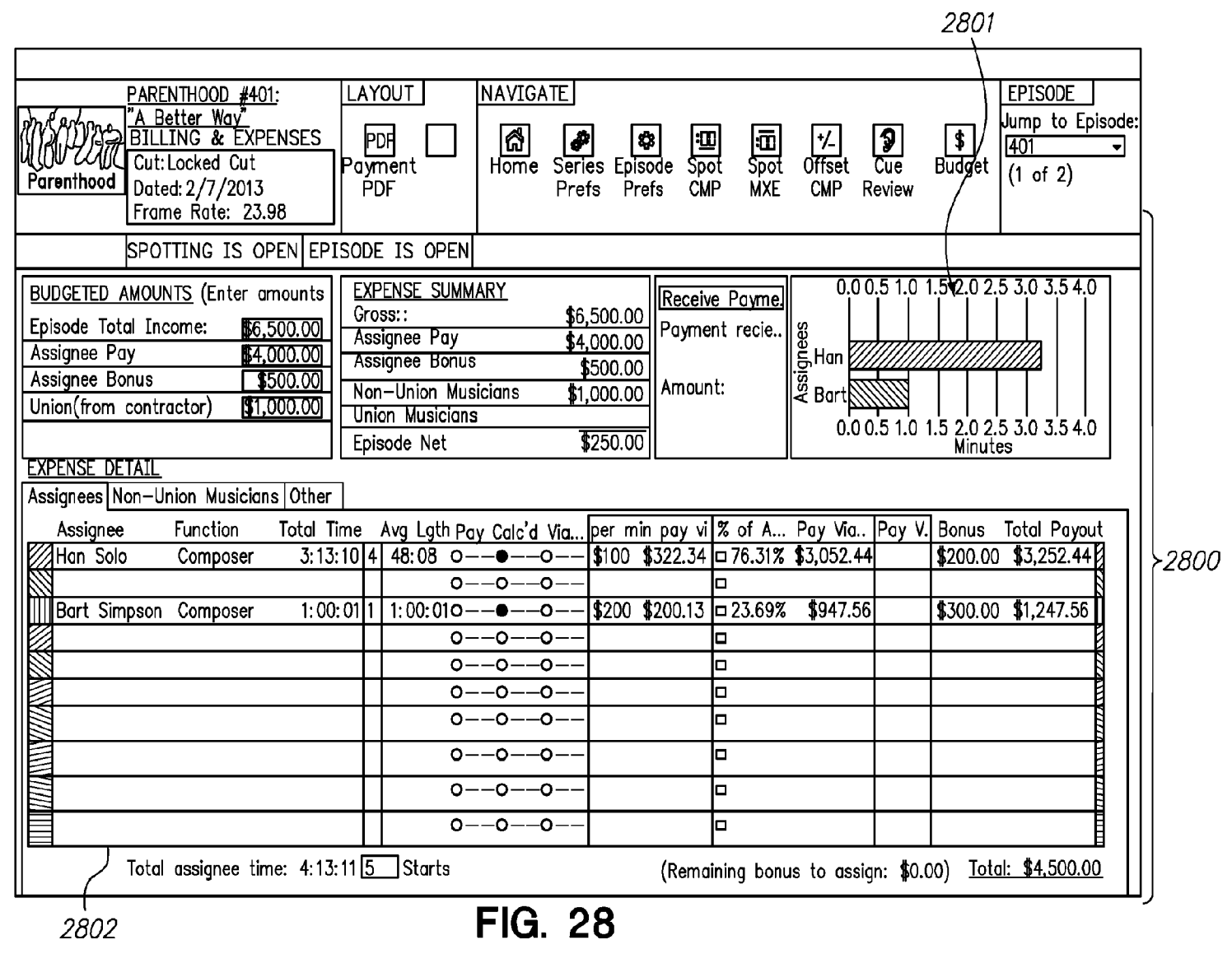

FIG. 28 illustrates an alternative billing & expenses layout 2800 according to an embodiment. In the billing & expenses layout 2800, the production management system provides a comparative chart 2801 for viewing the comparative expenses by category or assignee. In some embodiments, widgets in the expenses information area 2802 allow the user to decide which assignees or categories are included in the comparative chart 2801. Further, the widgets allow the user to select a color for each category/assignee which is used to display the fields pertaining to the category/assignee and represented within the comparative chart 2801. In other embodiments, the colors may be automatically populated from other layouts, such as the assignee colors that can be set within the series setup layout 306. Although the comparative chart 2801 is represented as a bar chart, in other embodiments the comparative chart 2801 may be a pie chart, line chart, or any other type of chart.

Figure 29:
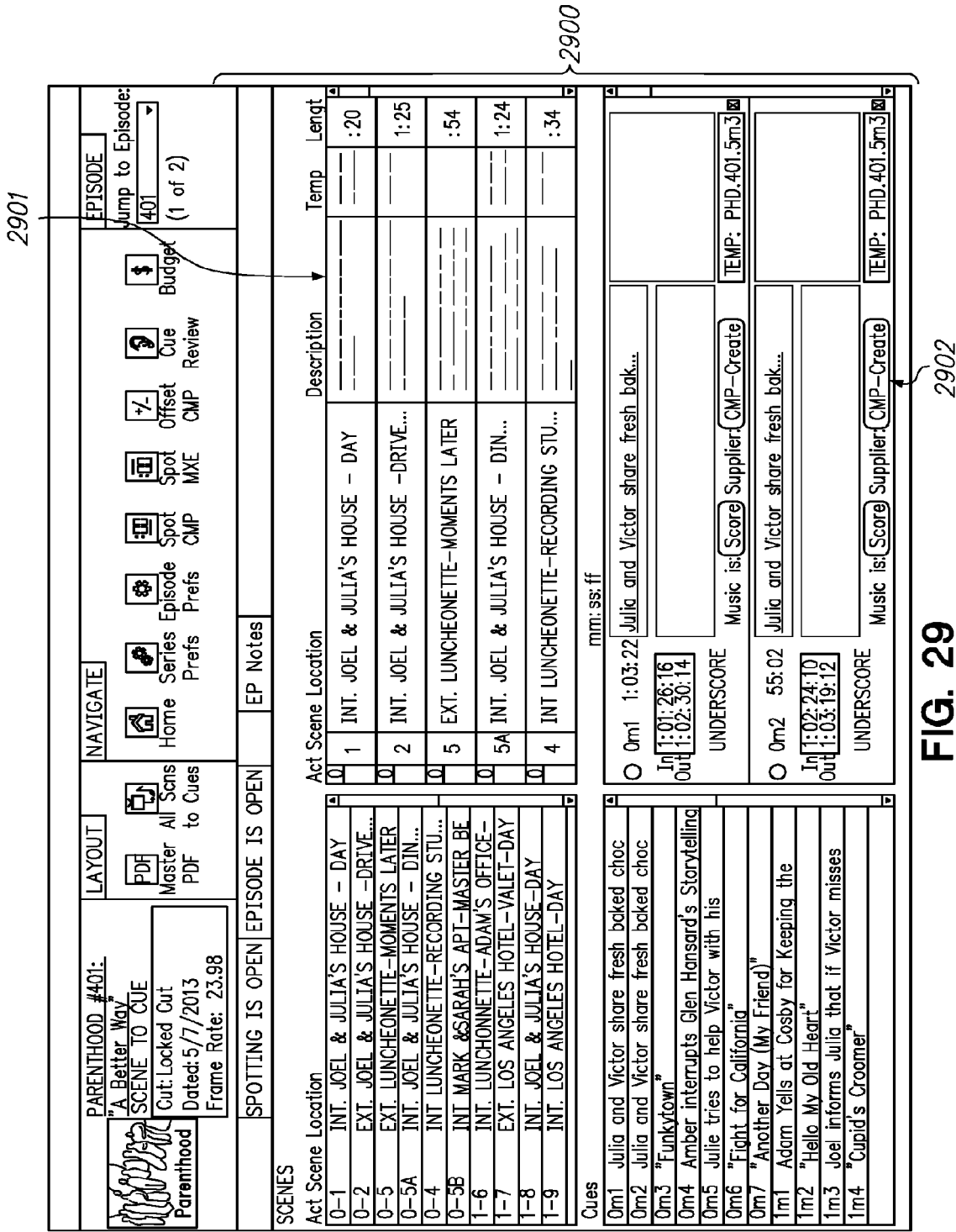
FIG. 29 illustrates a cue creation and assignment layout according to an embodiment.

FIG. 29 illustrates a scene-to-cue translation layout 2900 according to an embodiment. In some embodiments, the production management system separates the temporary music to scene assignment and conversion features discussed above in reference to the continuity layout and the spotting layout into its own separate layout (e.g. scene-to-cue translation layout 2900). In the scene-to-cue translation layout 2900 the user can assign temporary music to scenes in the temp music assignment area 2901. In response, the production management system automatically converts the temporary music into cues in the cue information area 2902 and can be exported as defaults into the spotting layout 600. In some embodiments, the scenes depicted in the temp music assignment area 2901 and the cues depicted in the cue information area 2902 are automatically imported from the continuity layout 1200 and the spotting layout 600 respectively. The scene-to-cue translation layout 2900 then provides the user with the capability of adding temporary music and converting that temporary music into cues with cue names, start and end timecodes, cue length, attributes, etc.

Figure 30:
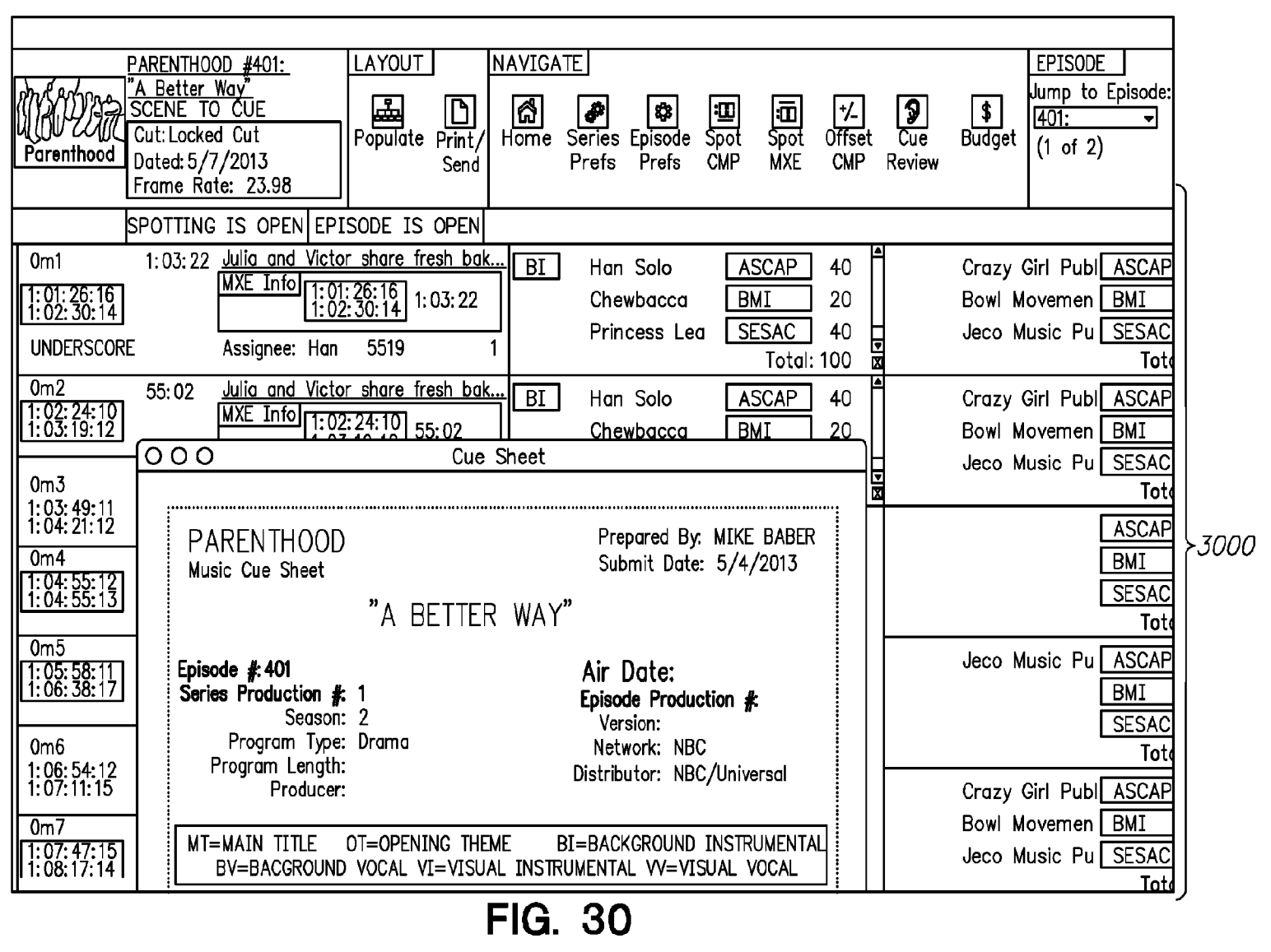

FIG. 30 illustrates an alternative cue sheet layout 3000 according to an embodiment.

Figure 31:
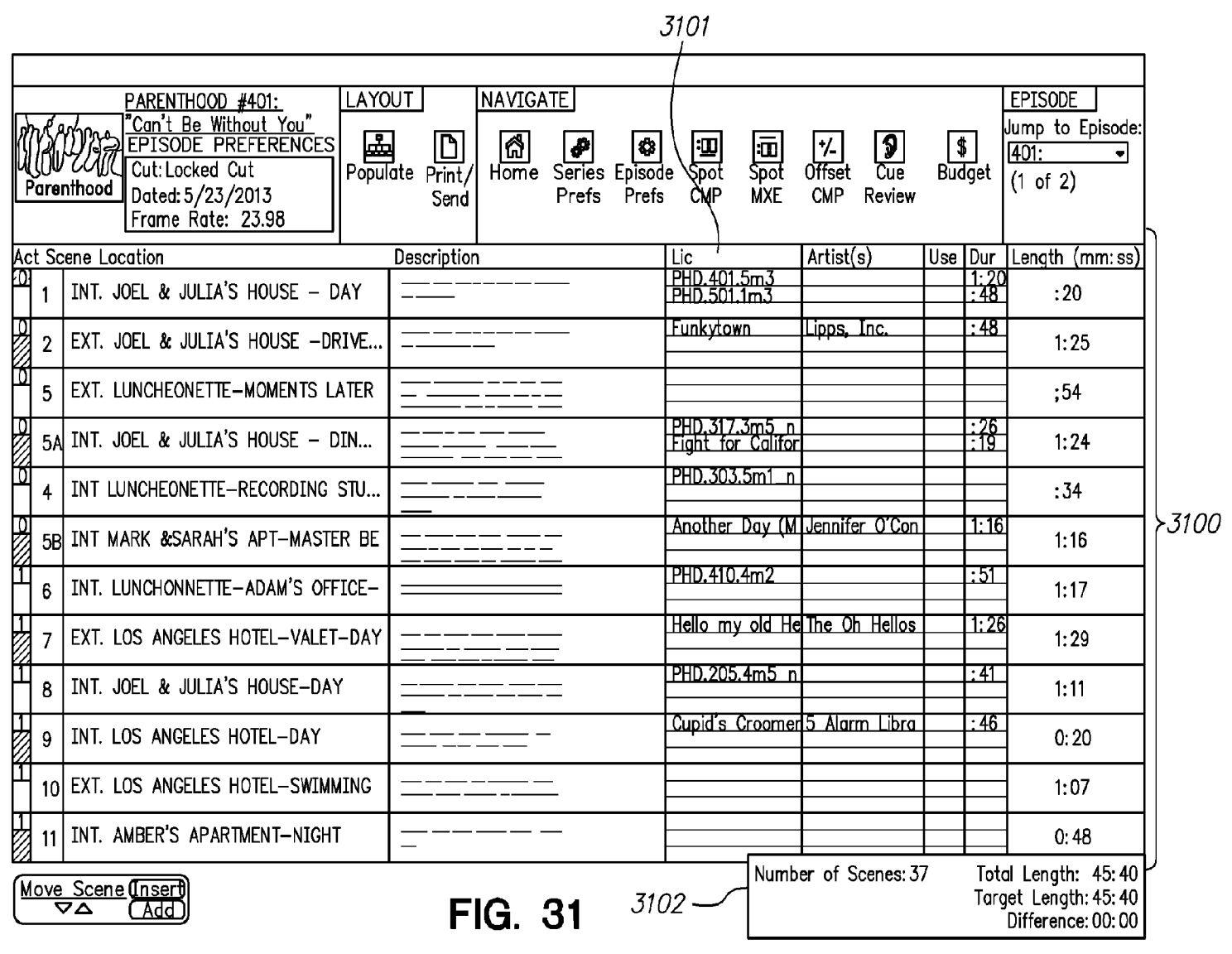

FIG. 31 illustrates an alternative continuity layout 3100 according to an embodiment. In the alternative continuity layout 3100, the temp music information area 3101 allows users to set temporary music for each scene (e.g. name, length, start/end timecodes, etc.). In some embodiments, one or more fields in the temp music information area 3101 may be populated by importing data directly from the media containing the track. In addition, the continuity layout 3100 includes a summary area 3102 for displaying summary information (e.g. total temporary music length, total number of temporary music tracks, number of scenes, etc.).

Figure 32:
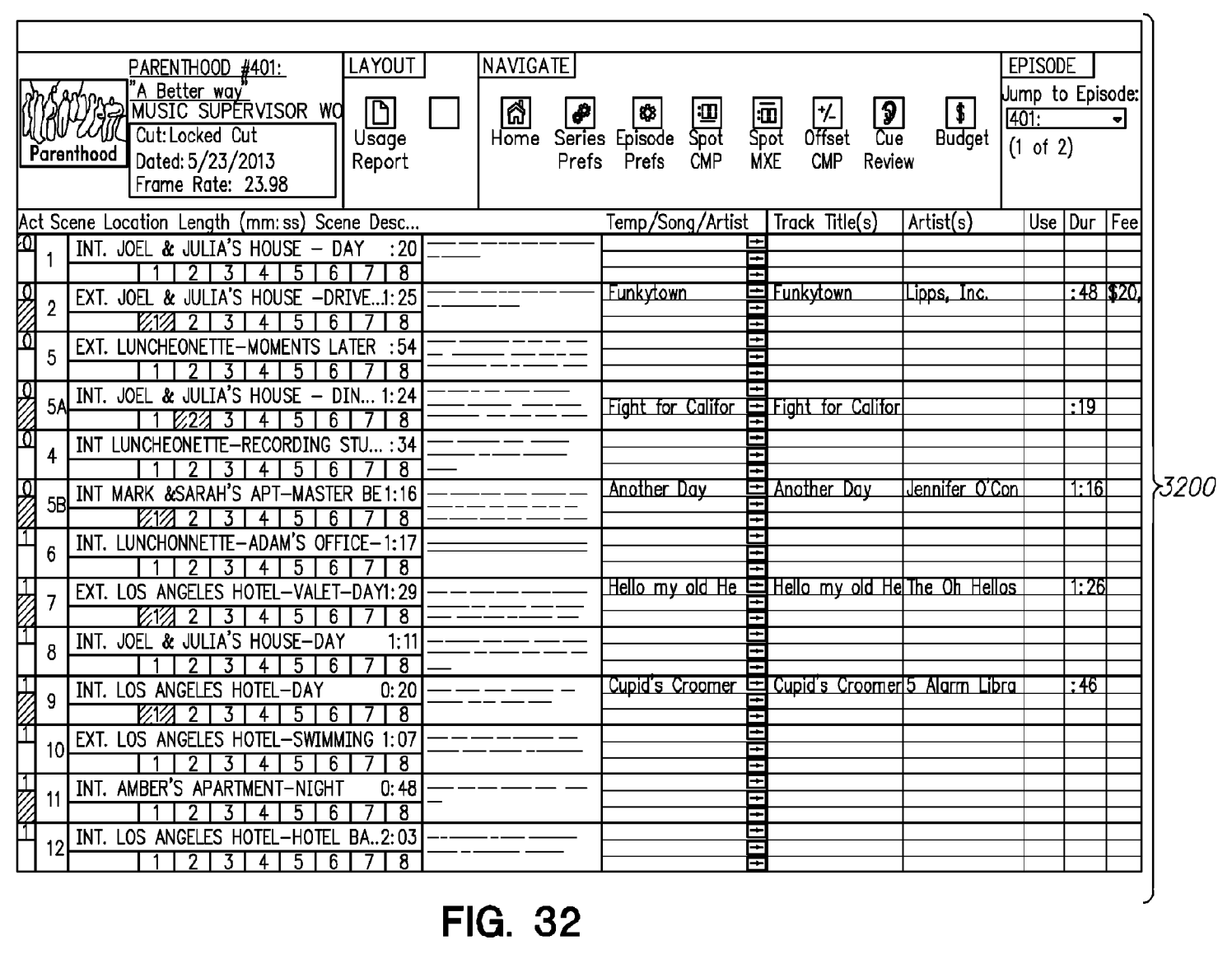

FIG. 32 illustrates an alternative MSP worksheet layout 3200 according to an embodiment.

Figure 33:
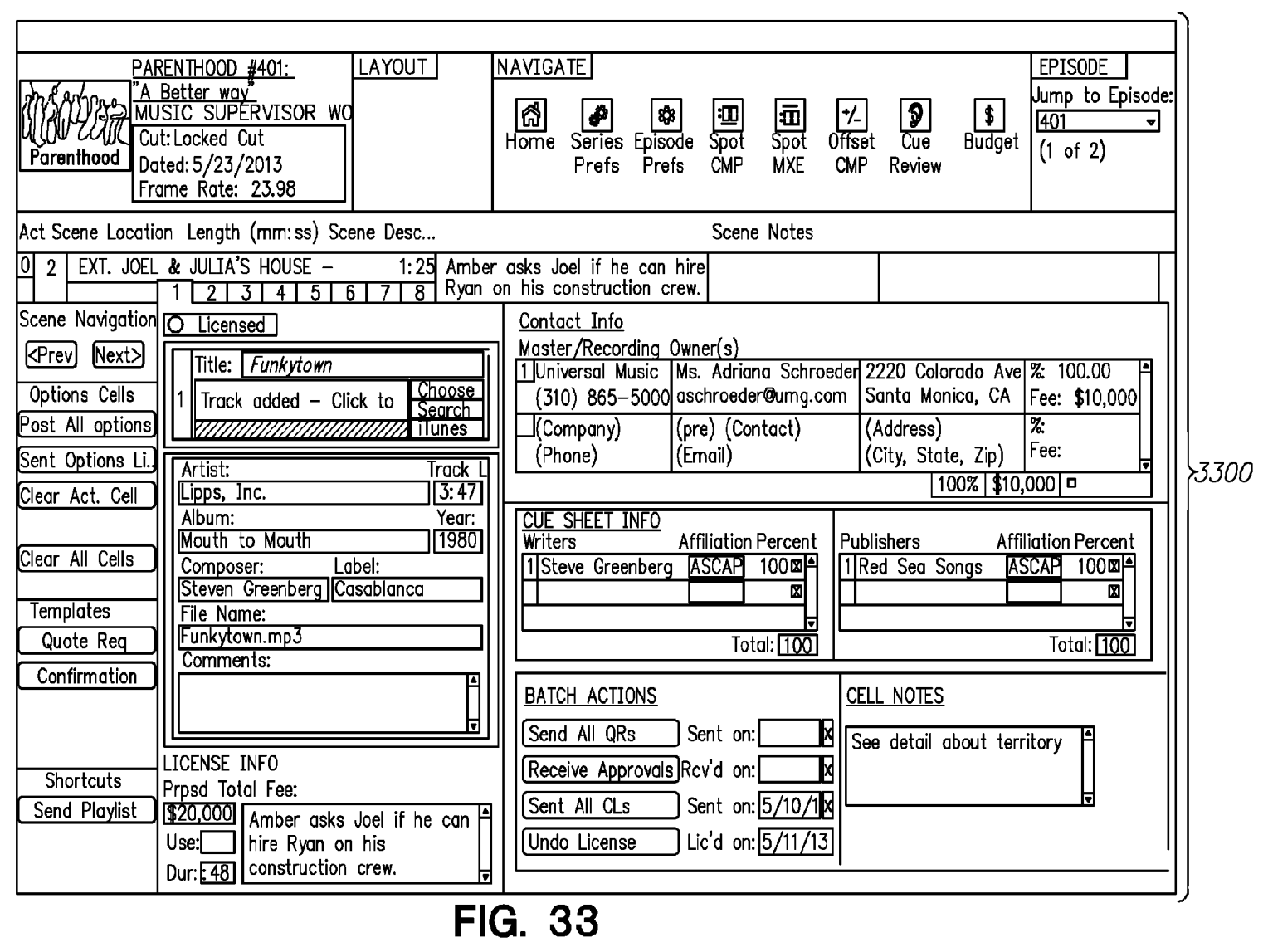

FIG. 33 illustrates an alternative extended track worksheet layout 3300 according to an embodiment.

25.0 LIVE SESSION TOOLS

In some embodiments the production management system provides a variety of tools for specific user groups that allow specific management of details pertaining to live sessions (recording of actual musicians, can range from a single player to a full one hundred person orchestra or more).

In an embodiment, the production management system provides a musician group tool for defining and utilizing groups of musicians. FIG. 34 illustrates a musicians group tool layout 3400 according to an embodiment. In an embodiment, the musicians group tool layout 3400 indicates specific instruments needed, number of instruments, and corresponding players. In addition, the musicians group tool layout 3400 ties into the musician budgeting/expenses and union-required contracts/forms provided by other layouts to populate the appropriate fields. Furthermore, the musicians group tool layout 3400 allows the user to assign musician groups to cues and allows the user to sort cues by musician group or instrument type(s).

In an embodiment, the production management system provides a scheduling and viewing tool. The scheduling and viewing tool cross references musician groups and budgets, and pushes data to the union contracts and populates appropriate fields of other layouts and forms. In addition, the scheduling and viewing tool displays information regarding which cues and versions to record, mix, orchestrate, etc. Furthermore, the scheduling and viewing tool displays groups by a variety of metrics supplied by users of the production management system. For example, the metrics may include information provided by the CueLinks layout 1700.

Figure 35:
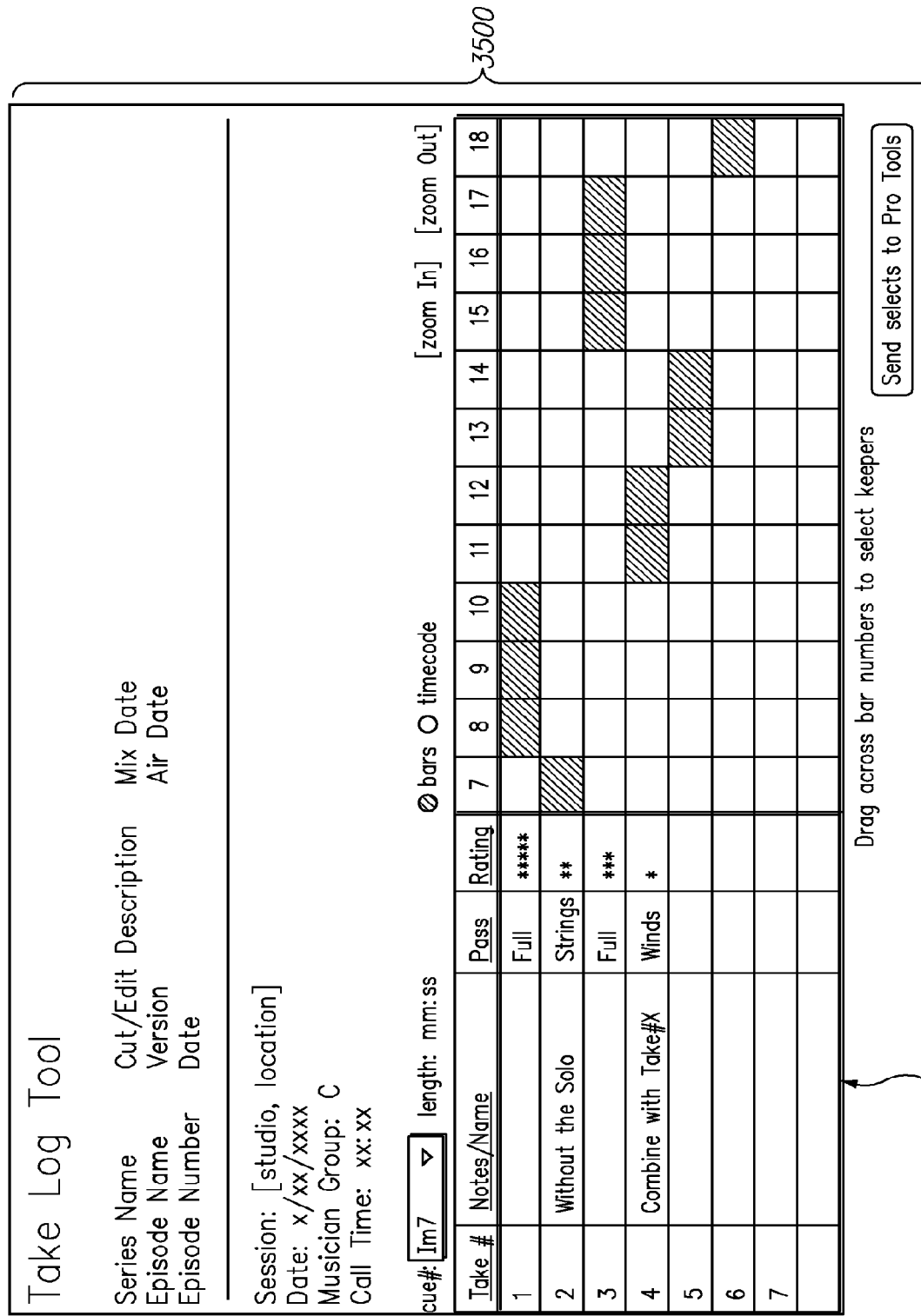
FIG. 35 illustrates a take tool layout according to an embodiment.

In an embodiment, the production management system provides a take tool. FIG. 35 illustrates a take tool layout 3500 according to an embodiment. The take tool layout 3500 keeps track of each recorded pass and allows notes to be entered in the note information area 3501. Further, the take tool layout 3500 may indicate which parts of a take are usable, via bar numbers, timecodes, ratings, or other methods. In an embodiment, the take tool layout 3500 provides a link to information in other industry standard recording platforms (e.g. Avid Pro Tools, Apple Logic, MOTU Digital Performer, etc.) to allow for seamless integration of recording and logging takes without having to rekey data. In some embodiments, the take tool layout 3500 provides a grid view that shows bars and takes, with static or sectional markers allowing the user to swipe across any number of bars to indicate usable parts of a take.

In an embodiment, the production management system provides a progress tracking tool. The progress tracking tool keeps track of each task as it applies to each cue (for example: recording, mixing, orchestration, composing, etc.). In addition, the progress tracking tool provides subtotals and sorting based on the progress of the tasks. In some embodiments, the progress tracking tool provides a graphical view (e.g. pie chart, bar chart, etc.) showing how many minutes of music have been recorded, how many minutes are left to record, and how much time is left in the recording session. Furthermore, the progress tracking tool allows for filtering based on any number of criteria, such as cues to record in a given day, assignees, engineers, etc.

26.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 19:
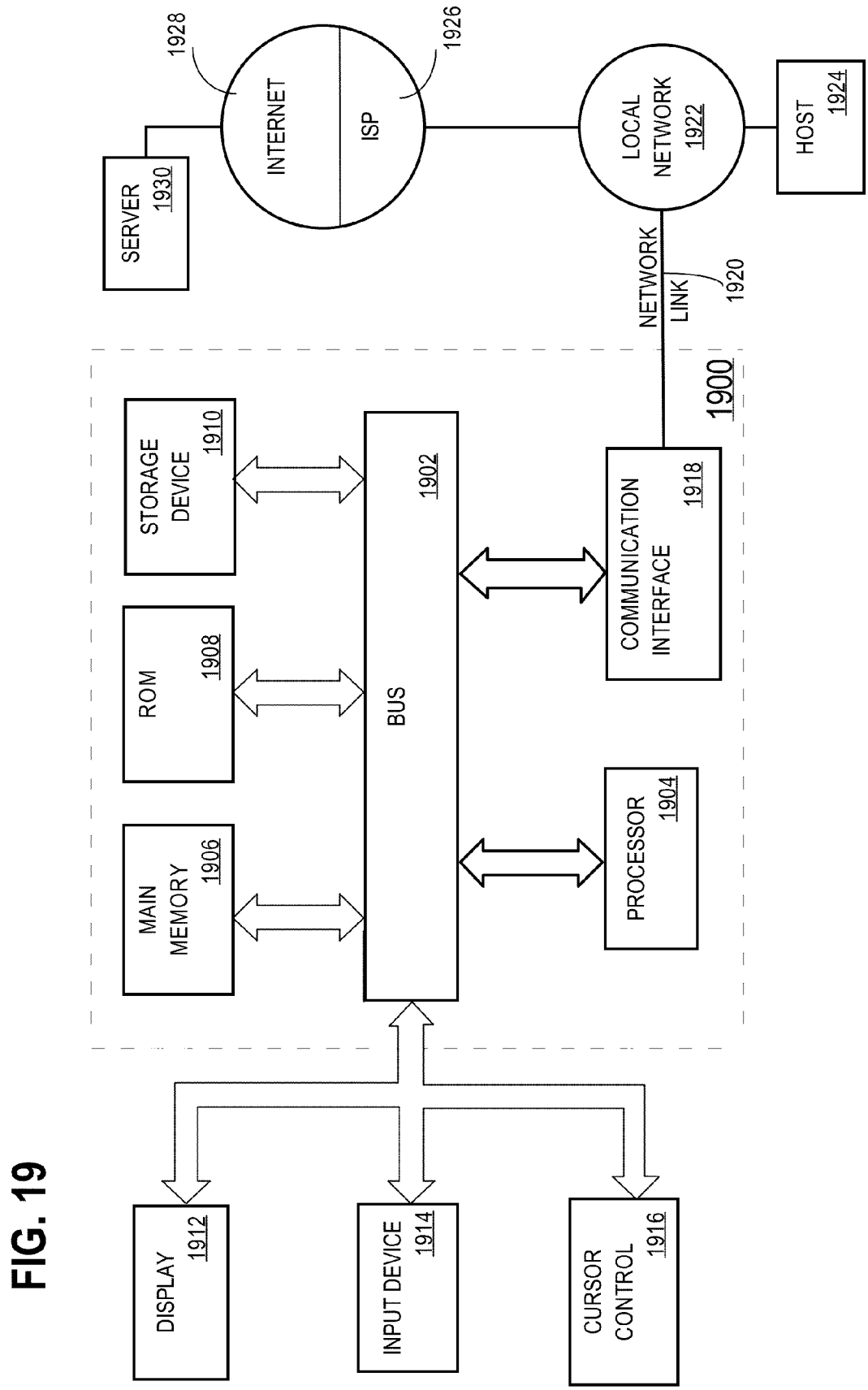
FIG. 19 is a block diagram that illustrates a computer system upon which an embodiment of the invention may be implemented.

For example, FIG. 19 is a block diagram that illustrates a computer system 1900 upon which an embodiment of the invention may be implemented. Computer system 1900 includes a bus 1902 or other communication mechanism for communicating information, and a hardware processor 1904 coupled with bus 1902 for processing information. Hardware processor 1904 may be, for example, a general purpose microprocessor.

Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Such instructions, when stored in non-transitory storage media accessible to processor 1904, render computer system 1900 into a special-purpose machine that is customized to perform the operations specified in the instructions.

Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a cathode ray tube (CRT), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

Computer system 1900 may implement the techniques described herein using customized hard-wired logic, one or more ASICs or FPGAs, firmware and/or program logic which in combination with the computer system causes or programs computer system 1900 to be a special-purpose machine. According to one embodiment, the techniques herein are performed by computer system 1900 in response to processor 1904 executing one or more sequences of one or more instructions contained in main memory 1906. Such instructions may be read into main memory 1906 from another storage medium, such as storage device 1910. Execution of the sequences of instructions contained in main memory 1906 causes processor 1904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1910. Volatile media includes dynamic memory, such as main memory 1906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1902. Transmission media can also take the form of acoustic or light waves, such as those generated during radio-wave and infra-red data communications.

Various forms of media may be involved in carrying one or more sequences of one or more instructions to processor 1904 for execution. For example, the instructions may initially be carried on a magnetic disk or solid state drive of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card, cable modem, satellite modem, or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are example forms of transmission media.

Computer system 1900 can send messages and receive data, including program code, through the network(s), network link 1920 and communication interface 1918. In the Internet example, a server 130 might transmit a requested code for an application program through Internet 1928, ISP 1926, local network 1922 and communication interface 1918.

The received code may be executed by processor 1904 as it is received, and/or stored in storage device 1910, or other non-volatile storage for later execution.

25. A non-transitory computer-readable data storage media coupled to the one or more processors, wherein the data storage media store one or more sequences of instructions which, when executed by the one or more processors, cause the one or more processors to perform a method as recited in any of clauses 1 to 22.

27.0 ADDITIONAL DISCLOSURE

The disclosure further includes and encompasses the subject matter of the following numbered clauses: 1. A method of spotting music for a motion picture comprising: receiving music editor (MXE) cue data defining a plurality of MXE cues each having a start timecode value and an end timecode value; based on the MXE cue data, creating and storing an MXE timecode path, a composer (CMP) timecode path, and a cue sheet timecode path; copying one or more of the MXE cues to CMP cues in the CMP timecode path in a CMP spotting dataset; receiving one or more changes to the CMP cues without also modifying the MXE cues; applying an editing lock to the CMP cues; auto-populating the CMP cues to cue sheet cues in the cue sheet timecode path; receiving one or more changes to the cue sheet cues without also modifying the CMP cues; finalizing and distributing a cue sheet based on the cue sheet cues; wherein the method is performed by one or more computing devices.

2. A method comprising: receiving user input specifying one or more products and a scene when the product will be presented during a production; receiving video editor (VDE) continuity data specifying timecodes for the scene; generating a report based on the VDE continuity data, wherein the report indicates the timecodes during which the product will be presented during a production; wherein the method is performed before the production has been closed and the method is performed by one or more computing devices.

3. A method comprising: receiving user input representing search criteria for music attributes of interest to a video editor (VDE); retrieving and sending one or more music tracks based on the search criteria; receiving user input representing selection of a particular track of the one or more music tracks by the VDE; notifying a music supervisor (MSP) that the VDE has selected the particular track and populating fields in a MSP layout based on information related to the particular track; in response to a determination that the MSP has concluded negotiations for the particular track, adding the particular track to a music editor (MXE) layout for review by a MXE; wherein the method is performed by one or more computing devices.

4. A data processing method comprising: receiving in a computer, from any of a music composer or a music publisher, metadata specifying attributes of an original music composition; receiving a selection authorizing availability of the metadata in a data search system and, in response thereto, providing the metadata to the data search system, wherein without the selection the metadata is unavailable in the data search system; receiving, from a motion picture editor, a search query directed at locating an item of temporary music for use in an editing phase of production of an audiovisual program, wherein the search query includes one or more score-oriented descriptor terms; determining that the metadata satisfies the search query, and in response thereto, providing a search response that identifies the original music composition and includes information about how to obtain, download, or license a copy of the original music composition for use as the temporary music; wherein the method is performed by one or more computing devices.

5. A data processing method comprising: receiving metadata identifying a music track based on a selection of the music track from among a plurality of music tracks; storing the metadata in association with project data indicating an act number and scene of an audiovisual program; receiving a request to provide ownership data for the music track; sending a copy of the request to a music publisher computer associated with a music publisher of the music track; receiving an authorization message from the music publisher computer that includes one or more music ownership data items of master owner data, sync owner data, and royalty split data relating to the music track, wherein without the authorization message the music ownership data items are unavailable for use in response to the request to provide ownership data; providing the music ownership data items in response to the request to provide ownership data; in response to a signal indicating completion of a music licensing transaction, receiving one or more mixes of the music track and storing the one or more mixes in association with the audiovisual program, and automatically storing the music ownership data items in a cue sheet associated with the audiovisual program; wherein the method is performed by one or more computing devices.

6. The method of clause 5, further comprising performing sending the copy of the request to the music publisher computer associated with a music publisher of the music track in response to every request over time to provide ownership information for the music track.

7. The method of clause 5, further comprising receiving the authorization message only for one music track that is controlled by the music publisher and not receiving another authorization message for one or more other music tracks that the music publisher also controls.

8. A data processing method comprising: receiving music editor (MXE) cue data defining a plurality of MXE cues each having a start timecode value and an end timecode value; based on the MXE cue data, creating and storing an MXE timecode path, a composer (CMP) timecode path, and a cue sheet timecode path; copying one or more of the MXE cues to CMP cues in the CMP timecode path in a CMP spotting dataset; auto-populating the CMP cues to cue sheet cues in the cue sheet timecode path; receiving one or more descriptors and storing the descriptors in association with the cues, wherein the descriptors are based upon any one or more of story, location, character, costume, prop, or other production values associated with an audiovisual production; finalizing and distributing a cue sheet based on the cue sheet cues; wherein the method is performed by one or more computing devices.

9. The method of clause 8 further comprising generating one or more reports that identify a music composition associated with one of the music cues, and including each of the descriptors that is associated with that music composition.

10. The method of clause 1, further comprising automatically determining a cue length of each of the MXE cues based on the start timecode value and end timecode value of each of the MXE cues.

11. The method of clause 1, further comprising: receiving scene data identifying scene numbers for scenes in the audiovisual program; determining whether each of the scenes, based on the scene data, contains a music item, and in response thereto: determining whether the music item is a temporary score or is requiring a license; creating and storing cue data relating to the music item; storing, in association with the cue data, a starting scene number and an ending scene number for a first scene in which the cue starts and a second scene in which the cue ends; causing display of a user interface layout that includes the cue data, the music item, the starting scene number and the ending scene number.

12. The method of clause 11 wherein the first scene and the second scene are a same scene.

13. The method of clause 1, wherein the cue sheet cues comprise at least a first cue and a second cue, and further comprising: determining that the second cue starts within a specified time of the first cue; generating a notification message identifying the first cue and the second cue.

14. The method of clause 1, further comprising: generating a spot-composer hybrid user interface display that comprises a first region displaying the CMP cues and a second region displaying the MXE cues, wherein the first region and second region are adjacent.

15. The method of clause 14 wherein the first region and second region comprise parallel adjacent columns.

16. The method of clause 14, further comprising:
receiving the MXE cue data from a first computer at a first time; receiving the one or more changes to the CMP cues from a second computer at a second time that is close to the first time; performing the copying, applying, and auto-populating; based upon the MXE cue data, changes, and the copying, applying and auto-populating, causing updating both the first region and the second region in first and second graphical user interface displays of both the first computer and the second computer at approximately a same time.

17. The method of clause 1, further comprising: receiving assignee data that identifies a plurality of different assignees each of whom is associated with one or different music items of an audiovisual production; determining, for each particular assignee among all the assignees, a workload value based upon a proportional contribution to all the music items in the audiovisual production of that particular assignee; obtaining a budget amount applicable to all assignees; determining an optional pay amount based upon the budget amount and the workload value of each of the assignees; causing generating a computer screen display that indicates the optional pay amount for one or more of the assignees.

18. The method of clause 1 further comprising excluding, from the optional pay amount, one particular assignee in response to receiving a selection of an opt-out option that identifies that particular assignee.

19. The method of clause 17 wherein the determining the optional pay amount is based upon a percentage of the music items that the particular assignee contributed.

20. The method of clause 17 wherein the determining the optional pay amount is based upon a number of minutes of each music item contributed by the particular assignee.

21. The method of clause 1, further comprising: receiving scene data identifying scene numbers for scenes in the audio-visual program; determining whether each of the scenes, based on the scene data, contains a music item, and in response thereto: determining whether the music item is a temporary score or is requiring a license; creating and storing cue data relating to the music item; determining a cue name for a cue represented in the cue data, wherein the cue name is based upon an act number of the first scene and optionally based upon one or more of: a number of other cues that precede the current cue, and whether the music item is a temporary score or is requiring a license; automatically determining and storing, in association with the cue data, one or more scene numbers for a scene in which the cue starts; causing display of a user interface layout that includes the cue data, the music item, and the one or more scene numbers.

22. The method of clause 21, wherein the one or more scene numbers comprise a starting scene number of a first scene in which the cue starts and an ending scene number of a second scene in which the cue ends.

23. A special-purpose computer system comprising one or more processors, and one or more non-transitory computer-readable data storage media coupled to the one or more processors, wherein the data storage media store one or more sequences of instructions which, when executed by the one or more processors, cause the one or more processors to perform a method as recited in any of clauses 1 to 22.

24. A computer program product one or more sequences of instructions which, when executed by the one or more processors, cause the one or more processors to perform a method as recited in any of clauses 1 to 22.

What is claimed is:

1. A method comprising:
receiving, by a production manager computer, at a time before closing a media production, cue metadata defining a plurality of music cues for the media production, wherein a first part of the cue metadata is received from a first computer and a second part of the cue metadata is received from a second computer that is different than the first computer, wherein the first part of the cue metadata includes a first plurality of timecodes for the plurality of music cues and the second part of the cue metadata includes a second plurality of timecodes for the plurality of music cues, wherein the first part of the cue metadata is received by the first computer via a first graphical user interface displayed by the first computer and the second part of the cue metadata is received by the second computer via a second graphical user interface displayed by the second computer;
storing, by the production manager computer, one or more records in a database based on the cue metadata, wherein the database stores both the first plurality of timecodes for the plurality of music cues and the second plurality of timecodes for the plurality of music cues;
generating, by the production manager computer, a cue data set based on the one or more records;
causing, by the production manager computer, display of the cue data set;
wherein the method is performed by one or more computing devices.

2. The method of claim 1, further comprising comparing the cue metadata to one or more error conditions and, if an error condition of the one or more error conditions is met, displaying a warning that identifies the error condition.

3. The method of claim 2, wherein the error condition specifies that a particular value of the cue metadata cannot exceed a particular threshold.

4. The method of claim 1, wherein the first part of the cue metadata defines a starting time and an ending time of a particular cue of the plurality of cues and the second part of the cue metadata includes information pertaining to one or more assignees of the particular cue.

5. The method of claim 4, wherein the information pertaining to the one or more assignees includes one or more of: one or more names of one or more rights holders, one or more societies to which the one or more rights holders belong, or payment information for the one or more rights holders.

6. The method of claim 1, further comprising the production management computer sending the cue data set to a third party computer.

7. The method of claim 1, further comprising the production management computer generating the cue data set at a time after the media production has closed.

8. The method of claim 1, wherein the cue metadata specifies at least a starting time and an ending time for each music cue of the plurality of music cues.

9. The method of claim 1, further comprising the production manager computer preventing modification of the one or more records when the media production is closed.

10. The method of claim 1, wherein the cue data set includes one or more of: one or more cue names for the plurality of music cues, one or more cue numbers for the plurality of music cues, a duration of each music cue of the plurality of music cues, usage information for the plurality of music cues, one or more writers of the plurality of music cues, one or more affiliations of each writer of the one or more writers, a percentage share for each writer of the one or more writers, one or more publishers of the plurality of music cues, one or more affiliations of each publisher of the one or more publishers, a percentage share for each publisher of the one or more publishers, character information or story information associated with the plurality of music cues, recording information associated with the plurality of music cues, musicians associated with the plurality of music cues, artists or performers associated with the plurality of music cues, a starting time and a stopping time into the media production of each music cue of the plurality of music cues, ownership information for the plurality of music cues, or licensing information for the plurality of music cues.

11. A non-transitory computer-readable storage media storing one or more instructions which, when executed by one or more processors, cause the one or more processors to perform steps comprising:
receiving, by a production manager computer, at a time before closing a media production, cue metadata defining a plurality of music cues for the media production, wherein a first part of the cue metadata is received from a first computer and a second part of the cue metadata is received from a second computer that is different than the first computer, wherein the first part of the cue metadata includes a first plurality of timecodes for the plurality of music cues and the second part of the cue metadata includes a second plurality of timecodes for the plurality of music cues, wherein the first part of the cue metadata is received by the first computer via a first graphical user interface displayed by the first computer and the second part of the cue metadata is received by the second computer via a second graphical user interface displayed by the second computer;
storing, by the production manager computer, one or more records in a database based on the cue metadata, wherein the database stores both the first plurality of timecodes for the plurality of music cues and the second plurality of timecodes for the plurality of music cues;

generating, by the production manager computer, a cue data set based on the one or more records;

generating, by the production manager computer, a cue data set based on the one or more records;

causing, by the production manager computer, display of the cue data set.

12. The non-transitory computer-readable storage media of claim 11, wherein the steps further comprise comparing the cue metadata to one or more error conditions and, if an error condition of the one or more error conditions is met, displaying a warning that identifies the error condition.

13. The non-transitory computer-readable storage media of claim 12, wherein the error condition specifies that a particular value of the cue metadata cannot exceed a particular threshold.

14. The non-transitory computer-readable storage media of claim 11, wherein the first part of the cue metadata defines a starting time and an ending time of a particular cue of the plurality of cues and the second part of the cue metadata includes information pertaining to one or more assignees of the particular cue.

15. The non-transitory computer-readable storage media of claim 14, wherein the information pertaining to the one or more assignees includes one or more of: one or more names of one or more rights holders, one or more societies to which the one or more rights holders belong, or payment information for the one or more rights holders.

16. The non-transitory computer-readable storage media of claim 11, wherein the steps further comprise the production management computer sending the cue data set to a third party computer.

17. The non-transitory computer-readable storage media of claim 11, wherein the steps further comprise the production management computer generating the cue data set at a time after the media production has closed.

18. The non-transitory computer-readable storage media of claim 11, wherein the cue metadata specifies at least a starting time and an ending time for each music cue of the plurality of music cues.

19. The non-transitory computer-readable storage media of claim 11, further comprising the production manager computer preventing modification of the one or more records when the media production is closed.

20. The non-transitory computer-readable storage media of claim 11, wherein the cue data set includes one or more of: one or more cue names for the plurality of music cues, one or more cue numbers for the plurality of music cues, a duration of each music cue of the plurality of music cues, usage information for the plurality of music cues, one or more writers of the plurality of music cues, one or more affiliations of each writer of the one or more writers, a percentage share for each writer of the one or more writers, one or more publishers of the plurality of music cues, one or more affiliations of each publisher of the one or more publishers, a percentage share for each publisher of the one or more publishers, character information or story information associated with the plurality of music cues, recording information associated with the plurality of music cues, musicians associated with the plurality of music cues, artists or performers associated with the plurality of music cues, a starting time and a stopping time into the media production of each music cue of the plurality of music cues, ownership information for the plurality of music cues, or licensing information for the plurality of music cues.

* * * * *